(12) United States Patent
Elder et al.

(10) Patent No.: US 12,319,143 B2
(45) Date of Patent: Jun. 3, 2025

(54) VEHICLE ENTERTAINMENT APPARATUS

(71) Applicant: Rivian IP Holdings, LLC, Plymouth, MI (US)

(72) Inventors: Christian V. Elder, Irvine, CA (US); Elizabeth K. Steenwyk, Detroit, MI (US); Austin Simpson, Huntington Beach, CA (US); William Thomas Wanstall, Huntington Beach, CA (US); Eric Butler, Fullerton, CA (US); Robert Holiday, Irvine, CA (US); Rex Martin, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 357 days.

(21) Appl. No.: 18/046,276

(22) Filed: Oct. 13, 2022

(65) Prior Publication Data
US 2023/0373301 A1    Nov. 23, 2023

Related U.S. Application Data

(60) Provisional application No. 63/343,684, filed on May 19, 2022.

(51) Int. Cl.
| | |
|---|---|
| G03B 21/14 | (2006.01) |
| B60K 35/00 | (2006.01) |
| G03B 21/58 | (2014.01) |
| B60K 35/22 | (2024.01) |
| B60K 35/53 | (2024.01) |
| B60K 35/60 | (2024.01) |

(52) U.S. Cl.
CPC ............ *B60K 35/00* (2013.01); *G03B 21/145* (2013.01); *G03B 21/58* (2013.01); *B60K 35/22* (2024.01); *B60K 35/53* (2024.01); *B60K 35/60* (2024.01); *B60K 2360/334* (2024.01); *B60K 2360/66* (2024.01); *B60K 2360/682* (2024.01); *B60K 2360/797* (2024.01)

(58) Field of Classification Search
CPC .............................. G03B 21/145; G03B 21/58
See application file for complete search history.

(56) References Cited

U.S. PATENT DOCUMENTS

| | | | | |
|---|---|---|---|---|
| 7,413,312 B2 * | 8/2008 | Engle | ................... | G03B 21/145 |
| | | | | 348/E5.143 |
| 2004/0189947 A1 * | 9/2004 | Hattori | ................... | G03B 21/58 |
| | | | | 353/13 |

OTHER PUBLICATIONS

Gill, "Cinema Vroom Volkswagen ID Life review: Electric car offers a glimpse into the future with projector & cinema seating," The Sun, retrieved from https://www.the-sun.com/news/3626017/vw-id-life-concept-car-projector-screen-cinema-seating/, 20 pages (2021).

(Continued)

*Primary Examiner* — Ryan D Howard
(74) *Attorney, Agent, or Firm* — Foley & Lardner LLP

(57) ABSTRACT

Disclosed are systems and methods for a vehicle and projector module. The vehicle can include a compartment. The vehicle can include a projector module configured to extend from the compartment to provide light to a projector screen.

20 Claims, 57 Drawing Sheets

(56) References Cited

OTHER PUBLICATIONS

Prigg, "The drive-in you can watch anywhere: Smart unveils car that comes with its own cinema projector," Daily Mail, retrieved from https://www.dailymail.co.uk/sciencetech/article-2209850/The-ultimate-drive-Mercedes-unveils-car-built-cinema-projector.html, 5 pages (2012).

Smith, "Pimp my Jeep: integrated rear-screen projector for movies at camp", thksmith, retrieved from https://theksmith.com/hobbies-interests/jeep-rear-screen-projector-for-camping/, 16 pages (2014).

\* cited by examiner

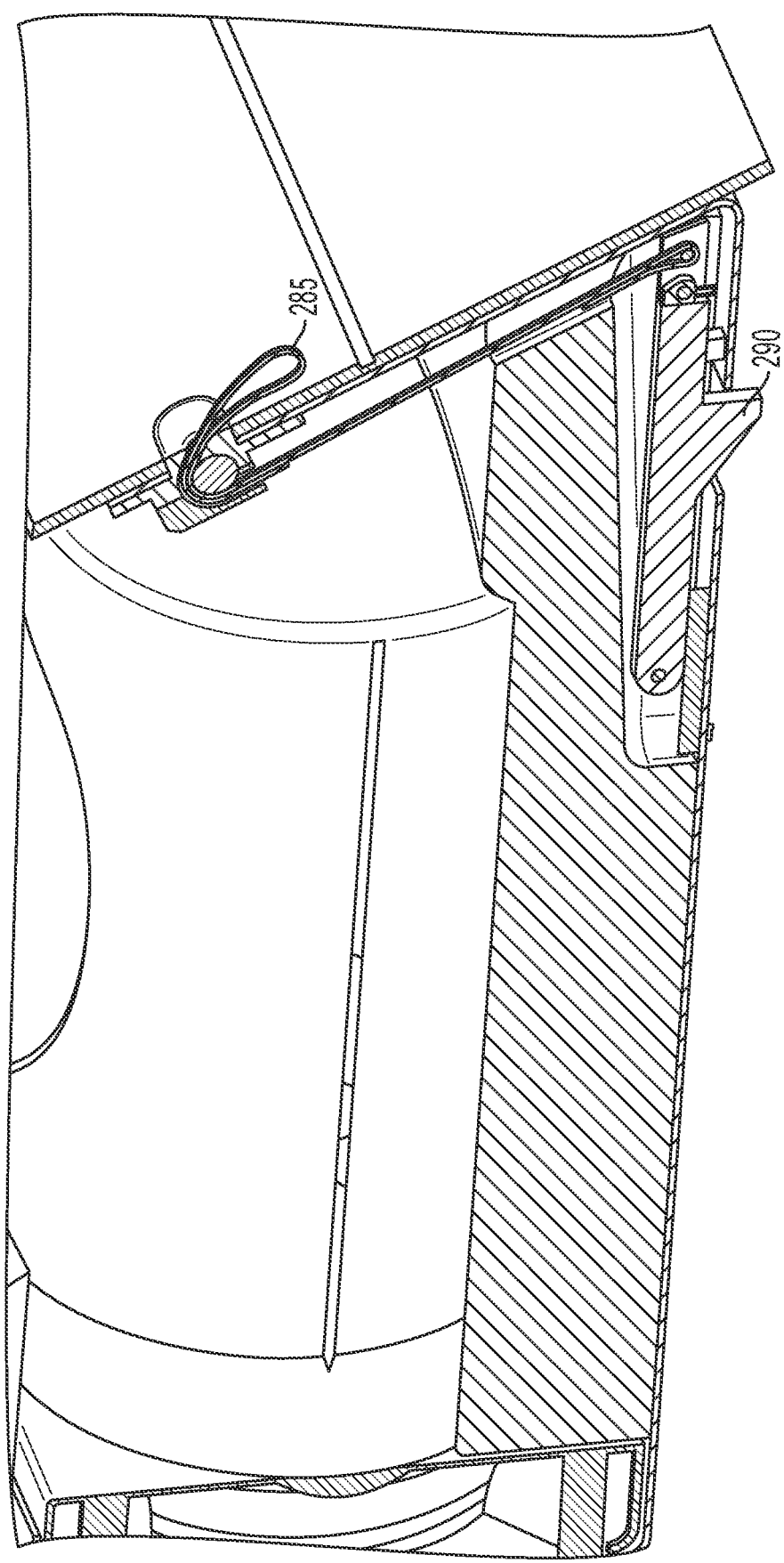

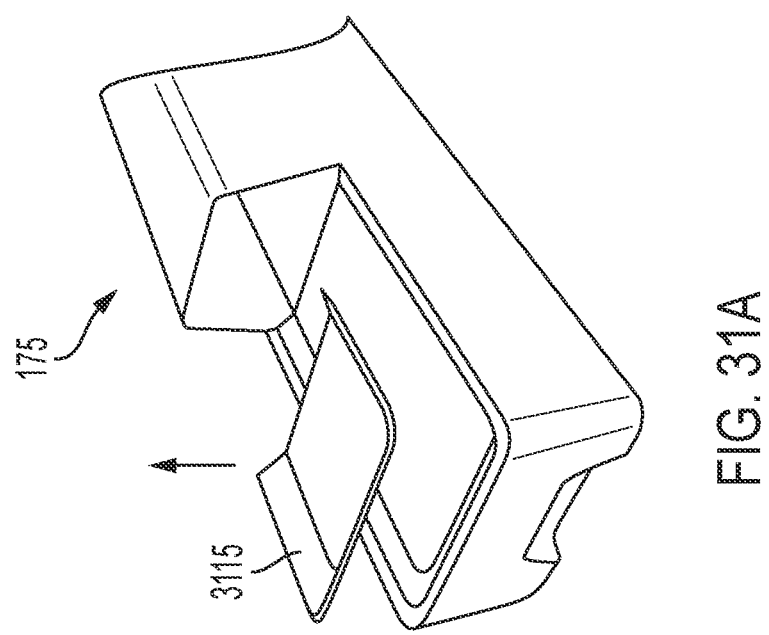

VEHICLE ENTERTAINMENT APPARATUS

CROSS-REFERENCE TO RELATED PATENT APPLICATION

The present application claims the benefit of and priority to U.S. Provisional Patent Application No. 63/343,684, filed May 19, 2022, the disclosure of which is incorporated herein by reference in its entirety.

INTRODUCTION

A vehicle, such as an electric vehicle, can be powered by batteries. The vehicle can include components that operate the vehicle based on power provided by the batteries.

SUMMARY

This disclosure is generally directed to an entertainment apparatus for a vehicle, such as an entertainment apparatus. The entertainment apparatus can include entertainment components. For example, the entertainment apparatus can include at least one projector, at least one projector screen, or at least one speaker. A vehicle can store or include at least one entertainment apparatus. The entertainment apparatus can be fixed to a shuttle (e.g., a sled) that extends out of a tunnel (e.g., a gear tunnel or other storage compartment) of a vehicle. The vehicle can include a tunnel that extends from at least one side of the vehicle into the vehicle. A shuttle can be stored within the tunnel and can extend out of the tunnel. The entertainment apparatus can be fixed to a top surface of the shuttle and extend out of the tunnel along with the shuttle. Because the entertainment apparatus can be stored within the tunnel, which can be sealed by doors, electronic components of the entertainment apparatus, such as a projector or speaker, can be protected from wind, rain, mud, snow, dust or other environmental conditions. To deploy the entertainment apparatus, the shuttle can be extended out of the tunnel, a platform of the entertainment apparatus that holds the projector can rotate the projector from the storage compartment to an operational position, and the pole of the frame of the projector screen can be inserted into, and secured within, a receiving member of the entertainment apparatus. This setup process can greatly reduce or eliminate any time needed to position the projector and projector screen, adjust the lens of the projector, or perform other set-up tasks such that the resulting image is a proper size and orientation. The projector can be fixed to the entertainment apparatus in an orientation to project light in direction away from the projector screen. The projector can project light towards or onto the mirror of the entertainment apparatus. The mirror can reflect the light from the projector back towards the projector screen. This can extend the length of the optical path of light between the lens of the projector and the projector screen. This extension of the optical path can increase the size of the image that results on the projector screen and allow the size of the entertainment apparatus to be reduced without reducing, or without substantially reducing, the resulting projected image.

At least one aspect is directed to a vehicle. The vehicle can include a compartment. The vehicle can include a projector module configured to extend from the compartment to provide light to a projector screen.

At least one aspect is directed to a method. The method can include disposing a projector module within a compartment of a vehicle. The method can include extending the projector module from the compartment of the vehicle to provide light to a projector screen.

At least one aspect is directed to an apparatus. The apparatus can include a component configured to extend the apparatus from a compartment of a vehicle. The apparatus can include a projector to provide light to a projector screen.

At least one aspect is directed to a vehicle. The vehicle can include an occupant seating area. The vehicle can include a tunnel, located between the occupant seating area and a rear portion of the vehicle, that extends from an opening on at least one side of the vehicle into the vehicle. The vehicle can include a projector apparatus configured to extend from the tunnel, the projector apparatus including a projector configured to direct light towards a mirror and the mirror configured to reflect the light onto a projector screen.

At least one aspect is directed to a method. The method can include disposing a projector apparatus within a tunnel of a vehicle, the tunnel extends from an opening on at least one side of the vehicle into the vehicle. The tunnel can be located between an occupant seating area of the vehicle and a rear portion of the vehicle. The method can include extending the projector apparatus from the tunnel. The method can include directing, via a projector of the projector apparatus, light towards a mirror of the apparatus. The method can include reflecting, via the mirror of the apparatus, the light onto a projector screen.

At least one aspect is directed to an apparatus. The apparatus can include a housing configured to extend from an opening of a tunnel on at least one side of the vehicle into the vehicle. The tunnel can be located between an occupant seating area of the vehicle and a rear portion of the vehicle. The apparatus can include a projector configured to direct light towards a mirror. The Apparatus can include the mirror configured to reflect the light onto a projector screen.

At least one aspect is directed to a vehicle. The vehicle can include a tunnel that extends from an opening on at least one side of the vehicle into the vehicle. The vehicle can include a shuttle configured to dispose within the tunnel and to extend out of the tunnel. The vehicle can include an apparatus including at least one component, the apparatus fixed to a top surface of the shuttle that extends out of the tunnel via the shuttle.

At least one aspect is directed to an apparatus. The apparatus can include a top surface, a first lateral side, a second lateral side, and a bottom side. The apparatus can include a projector, at least a portion of the projector disposed within the apparatus. The apparatus can include a projector screen including a pole, the pole fixed to the apparatus. The projector can project light onto the projector screen.

At least one aspect is directed to an apparatus. The apparatus can include a top surface, a first lateral side, a second lateral side, and a bottom side. The apparatus can include a projector disposed on a platform within the apparatus under the top surface. The apparatus can include a rotating member that rotates the platform from a position horizontal with the top surface to a position angled relative to the top surface exposing at least a portion of the projector.

At least one aspect is directed to an apparatus. The apparatus can include a projector screen fixed to a receiving member of the apparatus. The apparatus can include a projector fixed to a platform of the apparatus, the projector projects light away from the projector screen. The apparatus can include a mirror fixed to a surface of the apparatus that projects the light onto the projector screen.

At least one aspect is directed to an apparatus. The apparatus can include at least one component. The apparatus can include the component supported by a shuttle that extends out of a tunnel of a vehicle on the shuttle. The apparatus can include the tunnel, the tunnel extends from an opening of the vehicle on at least one side of the vehicle into the vehicle. The apparatus can include the shuttle disposed within the tunnel that extends out of the tunnel.

At least one aspect is directed to a method. The method can include providing a vehicle. The vehicle can include a tunnel that extends from an opening on at least one side of the vehicle into the vehicle. The vehicle can include a shuttle disposed within the tunnel that extends out of the tunnel. The vehicle can include an apparatus including at least one component, the apparatus fixed to a top surface of the shuttle that extends out of the tunnel via the shuttle.

At least one aspect is directed to a method. The method can include providing a tunnel that extends from an opening on at least one side of a vehicle into the vehicle. The method can include extending, a shuttle disposed within the tunnel out of the tunnel. The method can include powering at least one component of an apparatus fixed to a top surface of the shuttle that extends out of the tunnel on the shuttle.

At least one aspect is directed to a data processing system. The data processing system can include one or more processors, coupled with memory, to receive a data stream comprising a stream of image data and a stream of audio data. The data processing system can transmit, via a network, the stream of image data to a projector, the projector fixed to an apparatus that is fixed to a shuttle. The shuttle can be configured to dispose within a tunnel of a vehicle and to extend out of the tunnel. The data processing system can transmit, via the network, the stream of audio data to a speaker, the speaker configured to dispose within the apparatus.

At least one aspect is directed to a system. The system can include a shuttle configured to dispose within a tunnel and to extend out of the tunnel, the tunnel extends from an opening on at least one side of a vehicle into the vehicle. The shuttle can include a first electrical component to receive power from a battery pack of the vehicle and deliver the power to an apparatus. The apparatus can include at least one component, the apparatus fixed to a top surface of the shuttle, the apparatus extends out of the tunnel via the shuttle. The apparatus can include a second electrical component to receive the power from the shuttle and deliver the power to the component.

At least one aspect is directed to a vehicle. The vehicle can include a tunnel that extends from an opening on at least one side of the vehicle into the vehicle. The vehicle can include a shuttle configured to dispose within the tunnel and to extend out of the tunnel. The vehicle can include an apparatus fixed to a top surface of the shuttle that extends out of the tunnel via the shuttle. The apparatus can include a projector screen. The apparatus can include a projector that projects light onto the projector screen.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2I depicts an example latch mechanism for a drawer that stores speakers.

FIG. 31A depicts an example entertainment apparatus including a protection mat.

DETAILED DESCRIPTION

Figure 1A:
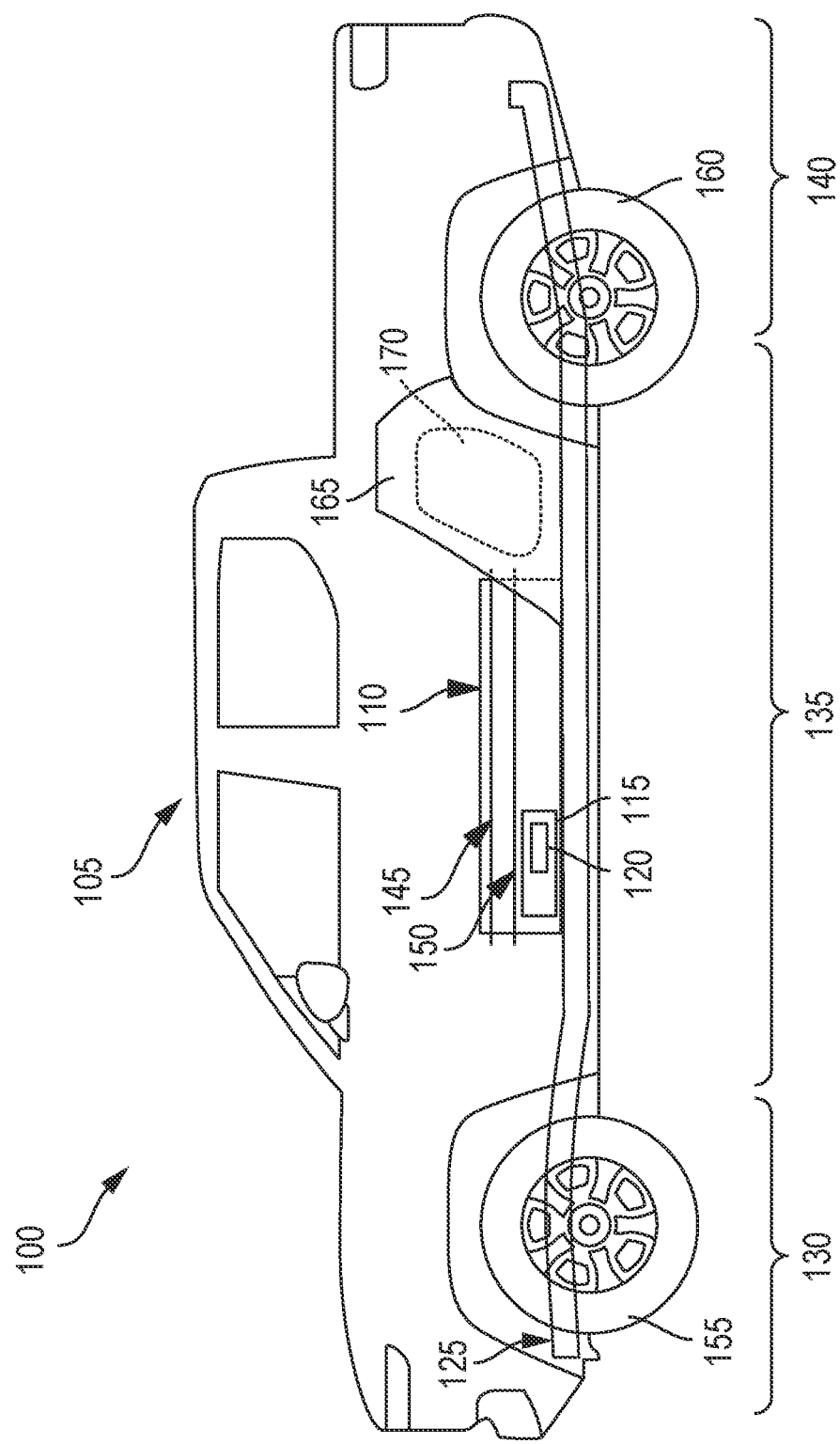
FIG. 1A depicts an example vehicle.

Following below are more detailed descriptions of various concepts related to, and implementations of, methods, apparatuses, and systems of an apparatus such as an entertainment apparatus for a vehicle. The various concepts introduced above and discussed in greater detail below may be implemented in any of numerous ways.

This disclosure is generally directed to an apparatus such as an entertainment apparatus for a vehicle, such as an entertainment apparatus that includes entertainment components. The entertainment components can include at least one projector, at least one projector screen, and at least one speaker. A vehicle can store or include at least one entertainment apparatus. An owner or driver of the vehicle can transport the entertainment apparatus within the vehicle and deploy and utilize the entertainment apparatus when the vehicle is parked at a home, in a parking lot, at a camp site, at a rest stop, on a trail, in an off road location. However, setting up the projector and projector screen can require a significant amount of time due to a configuration of the projector and projector screen that is performed each time the projector and projector screen are set up. For example, every time a projector system is set-up, the projector and projector screen may need to be positioned at a proper distance from each other such that the resulting size of an image projected by the projector properly fits the projector screen. Furthermore, a lens of a projector may need to be adjusted until the proper image is projected. When the vehicle is at a camp site, at a rest stop, or in an off-road or remote location, it may be difficult to angle the projector or projector screen on an uneven surface. Power cables or extension cables may need to be plugged into a power source and connected to the projector or speaker to provide power to the projector or speaker each time the entertainment apparatus is used.

The projector and the projector screen can be fixed to the entertainment apparatus such that the projector or projector screen have definite locations for operational or storage modes. To fit and store the entertainment apparatus in the vehicle, the entertainment apparatus can be a reduced or compact size. However, this reduction in size can reduce an optical path from a lens of the projector to the projector screen. The length of an optical path can be proportional to the size of the resulting projected image. An optical path along a length of the entertainment apparatus between the lens of the projector and the projector screen may not be long enough for the projected image to be a proper size, e.g., be large enough to cover the projector screen.

To solve these and other technical problems, the technical solution described herein can include an entertainment apparatus that is fixed to a shuttle, such as a sled, that extends out of a tunnel of a vehicle. The vehicle can include a tunnel that extends from at least one side of the vehicle into the vehicle. A shuttle can be stored within the tunnel and can extend out of the tunnel. The entertainment apparatus can be fixed to a top surface of the shuttle and extend out of the tunnel along with the shuttle. At least one door can be fixed to the vehicle on an end of the tunnel. Another door can be fixed to the vehicle on the other end of the tunnel. The doors can close and seal the tunnel. Because the entertainment apparatus can be stored within the tunnel, which can be sealed by the doors, electronic components of the entertainment apparatus, such as a projector or speaker, can be protected from wind, rain, mud, snow, dust or other environmental conditions. This can allow the vehicle to be driven off-road or in harsh environments while protecting the entertainment components from the environment.

The entertainment apparatus can store the projector in a storage compartment of the entertainment apparatus. The entertainment apparatus can store the projector on a platform. The platform can rotate between an orientation where the projector is included within the storage compartment to an orientation where the projector is positioned to project light to the projector screen. Furthermore, the entertainment apparatus can include a receiving member for receiving and securing a pole of a frame of the projector screen. To deploy the entertainment apparatus, the shuttle can be extended out of the tunnel, the platform can rotate the projector from the storage compartment to an operational position, and the pole of the frame of the projector screen can be inserted into, and secured within, the receiving member. This can reduce or eliminate any time needed to position the projector and projector screen, adjust the lens of the projector, or perform other set-up tasks such that the resulting image is the correct size and orientation. A first time the entertainment apparatus is used, the projector can be positioned on the platform and the lens of the projector can be adjusted. Because the projector is fixed to the platform and does not move, during subsequent deployments of the entertainment apparatus, the positioning of the projector or adjusting of the lens may not be need to be repeated. The shuttle can include electrical connections that connect with a power source of a vehicle, e.g., a battery cell, battery module, battery pack, alternator. The projector or speakers can connect to the power source through the electrical connections of the shuttle. The projector or speaker can charge or be powered by the power source of the vehicle. This can reduce or eliminate the need to setup power cables or extension cables. This can further allow the projector and speaker to operate in remote locations, for example, off-road locations where an external power source is not present.

To extend the optical path between the projector and the projector screen, the entertainment apparatus can include a mirror. The projector can be fixed to the entertainment apparatus in an orientation such as to project light in direction away from the projector screen. The projector can project light onto the mirror. The mirror can face towards the projector screen. The mirror can reflect the light from the projector back towards the projector screen. This can extend the length of the optical path of light between the lens of the projector and the projector screen. This extension of the optical path can increase the size of the image that results on the projector screen and allow the size of the entertainment apparatus to be reduced without reducing, or without substantially reducing, the resulting projected image.

FIG. 1A depicts an example cross-sectional view 100 of a vehicle 105 installed with at least one battery pack 110. The vehicle 105 can be an electric vehicle. Electric vehicles 105 can include electric trucks, electric sport utility vehicles (SUVs), camper vans, electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. The vehicle 105 can be a gas or diesel powered vehicle. Electric vehicles 105 can be human operated or non-autonomous. Electric vehicles 105 such as electric trucks or automobiles can include on-board battery packs 110, battery modules 115, or battery cells 120 to power the electric vehicles. The vehicle 105 can include a chassis 125 (e.g., a frame, internal frame, or support structure). The chassis 125 can support various components of the vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the vehicle 105. For example, the battery pack 110 can be installed on the chassis 125 of the vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the vehicle 105 to provide electrical power to various systems or components of the vehicle 105.

The vehicle 105 can include at least two front wheels 155 and at least two rear wheels 160. The vehicle 105 can include one or multiple motors. The motors can drive at least one axle connected to the two front wheels 155 or an axle connected to the two rear wheels 160. A single motor can drive an axle of the two front wheels 155. A single motor can drive an axle of the two rear wheels 160. Each wheel of the wheels 155 and 160 can be driven by an individual motor. For example, each of the four wheels 155 and 160 can be driven by one of four motors. The battery pack 110 can discharge stored energy to power the motors of the front wheels 155 and the rear wheels 160. The battery pack 110 can discharge stored energy to generate power that the motors receive. Operating the motors of the wheels 155 and 160 can cause the vehicle 105 to drive forward, reverse, or turn. Although not shown in FIG. 1, the vehicle 105 can include the various storage compartments, e.g., the cargo bed or the gear tunnel described elsewhere herein. The vehicles described herein can be service vehicles, electric vehicles, electric service vehicles, trail vehicles, government vehicles, camping vehicles.

The vehicle 105 includes a compartment or tunnel 170 that extends into the vehicle 105 on at least one side of the vehicle. The tunnel 170 can be located between a cab of the vehicle 105 and the rear portion 140, e.g., a truck bed. The tunnel 170 can include an opening on at least one side of the vehicle 105. The tunnel 170 can include an opening on a driver side of the vehicle 105 and another opening on a passenger side of the vehicle 105. The vehicle 105 can include at least one door 165.

The door 165 can rotate on an apparatus, e.g., a hinge between an open position exposing the opening of the tunnel 170 to a closed position covering the opening of the tunnel 170. The hinge can be fastened to a bottom side of the door 165 and to the vehicle 100. The hinge can rotate a top side of the door 165 downwards towards a surface under the vehicle 100. When in the open position, the door 165 may be parallel to a floor of the vehicle 100 or perpendicular to a side of the vehicle 100. Components, such as an apparatus 175, can extend out of the tunnel 170 over the door 165 when the door 165 is opened. The components, such as the apparatus 175 can extend over the shuttle 195. The shuttle 195 or the door 165 in the open position can support the weight of the apparatus 175. The various electronic components of the apparatus 175, e.g., projector, speakers, electronics, etc. can have a weight that the door 165 can support. The door 165 can support a maximum of 290-310 pounds of weight. The door can support a maximum of 280-320 pounds of weight. The door can support a maximum weight less than 280 pounds. The door can support a maximum weight more than 320 pounds.

The compartment 170 can be accessible to a user from an exterior of the vehicle 105. The compartment 170 can be accessible to a user in an interior of the vehicle 105. The compartment 170 can be located between an occupant seating area (e.g., a front seating area, a rear seating area, a passenger side seating area, a driver side seating area) and the rear portion 140 of the vehicle. The compartment 170 can be included under a front hood of the vehicle 105. The compartment 170 can be included within a rear trunk of the vehicle 105. The compartment 170 can be included within a truck bed of the vehicle 105.

Figure 1B:
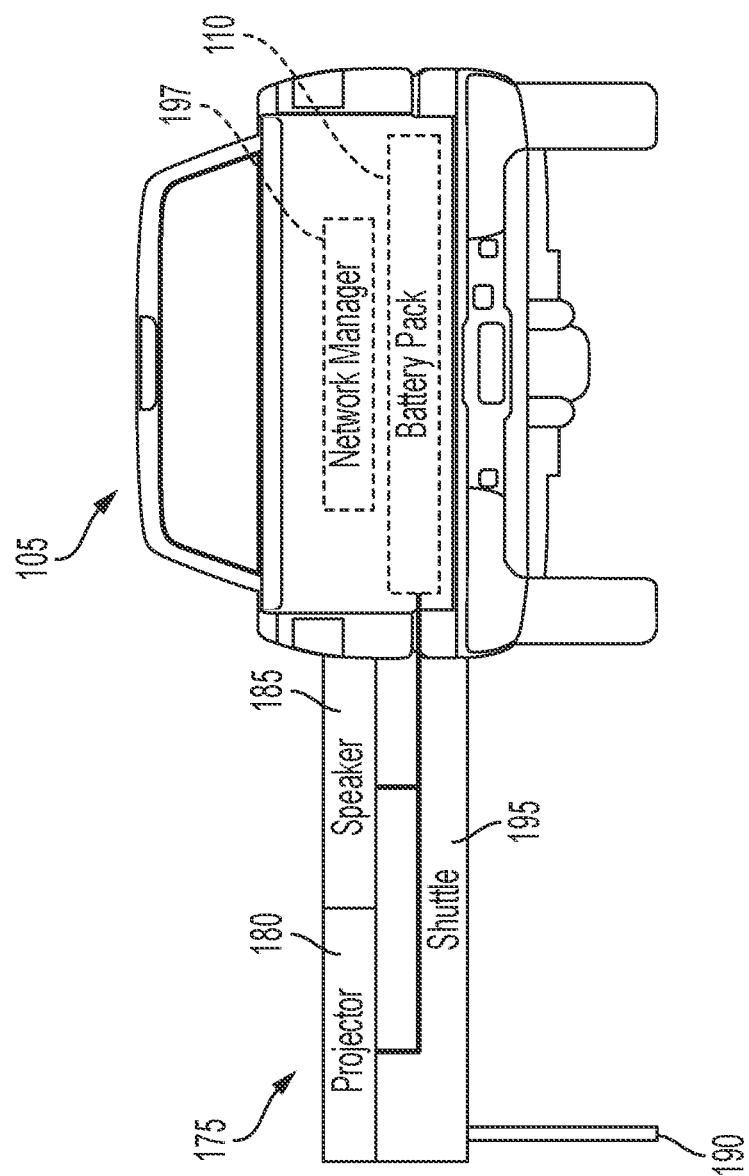
FIG. 1B depicts an example vehicle including an entertainment apparatus.

FIG. 1B depicts an example vehicle 105 including at least one apparatus 175, such as an entertainment apparatus. The apparatus 175 can be or include an entertainment apparatus or module, a projector apparatus or module, or any other apparatus, module, device, or system. The apparatus 175 can be configured to extend from the compartment 170. The apparatus 175 can be configured to stow or store within the compartment 170. For example, the apparatus 175 can retract from an extended position into a stowed or stored position within the compartment 170. The vehicle 105 can include at least one shuttle 195. The entertainment apparatus 175 can be directly or indirectly fixed to the shuttle 195. The shuttle 195 can be or include a sled or flat portion. The shuttle 195 can be stored within a tunnel, such as a gear tunnel for storing gear, of the vehicle 105. The shuttle 195 can extend from the gear tunnel and be supported by at least one support 190. The support 190 can include a leg, multiple legs, at least one pipe, wheel, or box. The apparatus 175 can include a component, such as an entertainment component. The entertainment component can be or include a projector, a projector module, a mirror, a projector screen, a speaker, a television, a smartphone, a radio, a steaming box, a laptop computer, a desktop computer, a virtual reality (VR) headset, VR gloves. The component can be equipment, tools, camping equipment, cooking equipment. The apparatus 175 can include a mixture of components of a variety of types, e.g., entertainment components, camping supplies, groceries.

The entertainment apparatus 175, or a housing 199, of the entertainment apparatus 175, can be fixed to a top surface of the shuttle 195 and supported by the shuttle 195. The housing 199 can include a bottom side, lateral sides, a top side, storage compartments, cavities. Various connectors or components, such as one or more screws, bolts, rivets, snaps, connectors can fix the housing 199, or a bottom side of the housing 199, to the top surface of the shuttle 195. The shuttle 195 can be configured to transport, extend, or move the entertainment apparatus or the housing 199 of the entertainment apparatus out of the tunnel 170. The shuttle 195 can be 60-70 inches long. The shuttle 195 can be 55-75 inches long. The shuttle 195 can be less than 55 inches long. The shuttle 195 can be more than 75 inches long. The shuttle 195 can be 18-19 inches wide. The shuttle 195 can be 17-20 inches wide. The shuttle 195 can be less than 18 inches wide. The shuttle 195 can be more than 20 inches wide. The shuttle 195 can be 0.5-1.5 inches thick. The shuttle 195 can be 0.2-2 inches thick. The shuttle 195 can be more than 2 inches thick. The shuttle 195 can be less than 0.2 inches thick. The shuttle 195 can include a top portion, a bottom portion, at least one lateral wall, and at least one end. The shuttle 195 can be a rectangular solid or a prismatic shape.

The entertainment apparatus 175 includes at least one projector 180. The projector 180 can be or include a digital light processing (DLP) projector, a liquid crystal display (LCD) projector, a light emitting diode (LED) projector, a lead computing optical sight (LCOS) projector, or a laser projector. The projector 180 can project an image or video onto a surface. The surface can be or include a projector screen. The surface can be or include a flat surface or a curved surface. The projector 180 can be powered by power received from the battery pack 110 through at least one electrical connection of the shuttle 195. The projector 180 can be a battery powered projector. The projector 180 can charge from power received from the battery pack 110. The projector 180 can be a portable projector that can be removed from the shuttle 195 and powered via a battery of the projector 180. The projector 180 can include radio modules to perform wireless communication.

The entertainment apparatus 175 can include at least one speaker 185. The speaker 185 can be fixed to the shuttle 195, included within a compartment of the shuttle 195, set on top of the shuttle 195. The speaker 185 can be powered by power received from the battery pack 110 through the electrical connections of the shuttle 195. The speaker 185 can be or include a battery powered speaker. The speaker 185 can charge from power received from the battery pack 110. The speaker 185 can be a portable speaker that can be removed from the shuttle 195 and powered via a battery of the speaker 185. The speaker 185 can include radio modules to perform wireless communication.

The shuttle 195 can include at least one electrical connection. The electrical connections of the shuttle 195 can be a hot connection and a ground connection. The electrical connections of the shuttle 195 can be a positive connection and a negative connection. The shuttle 195 or the vehicle 105 can include a transformer or converter. For example, the transformer or converter can convert power received from the battery pack 110 between alternative current (AC) power and direct current (DC) power. For example, the power provided by the battery pack 110 may be DC power. A converter can convert the power to AC power. The projector 180 or the speaker 185 may be powered via AC power. The electrical connections of the shuttle 195 can connect with at least one electrical connection of the entertainment apparatus 175. The electrical connections of the entertainment apparatus 175 can be a hot connection and a ground connection. The electrical connections of the entertainment apparatus 175 can be a positive connection and a negative connection. The electrical connections of the entertainment apparatus 175 can convey power received from the battery pack 110 and the electrical connections of the shuttle 195 to the components of the entertainment apparatus 175, e.g., the projector 180 and the speaker 185.

The electric vehicle 105 can include at least one network manager 197. The network manager 197 can generate or manage a Wi-Fi network, a mobile hot spot, a Bluetooth connection. The network manager 197 can wirelessly communicate with the projector 180 or the speaker 185 via a wireless radio. The wireless radio can include at least one antenna, transceiver, data processing system, filter, amplifier. The network manager 197 establish network connections with various networks, e.g., Internet connections to the Internet. The network manager 197 can provide Internet access to components of the vehicle 105 or devices connected to the network manager 197. The network manager 197 can connect to the Internet via cellular communication (e.g., 3G, 4G, 5G, 6G) or via another Wi-Fi network. The network manager 197 can communicate via one or more wires or electrical connections of the shuttle 195 with the projector 180 and the speaker 185. The network manager 197 can stream entertainment data to the projector 180 or the speaker 185. The entertainment data can be a video stream, a movie, a television stream, an AM radio broadcast, a FM radio broadcast, a satellite radio broadcast, an image. The projector 180 can project visual data received from the network manager 197. The speaker 185 can play audio data received from the network manager 197.

A computing system of the vehicle 105, a cellphone, a smartphone, a laptop computer, a streaming box, can access the Internet via the network manager 197. The computing system can stream audio, video, or images from a streaming service or database via the Internet. The computing system, or the network manager 197, can provide audio of the stream to the speaker 185 via the network manager 197 or an audio cable or audio/video cable. For example, the shuttle 195 could include audio/video cables to provide audio and video data to the projector 180 and the speaker 185. The computing system or the network manager 197 can provide video or images of the stream to the projector 180 via a local network generated or managed by the network manager 197 or a video cable or an audio/video cable.

Figure 2A:
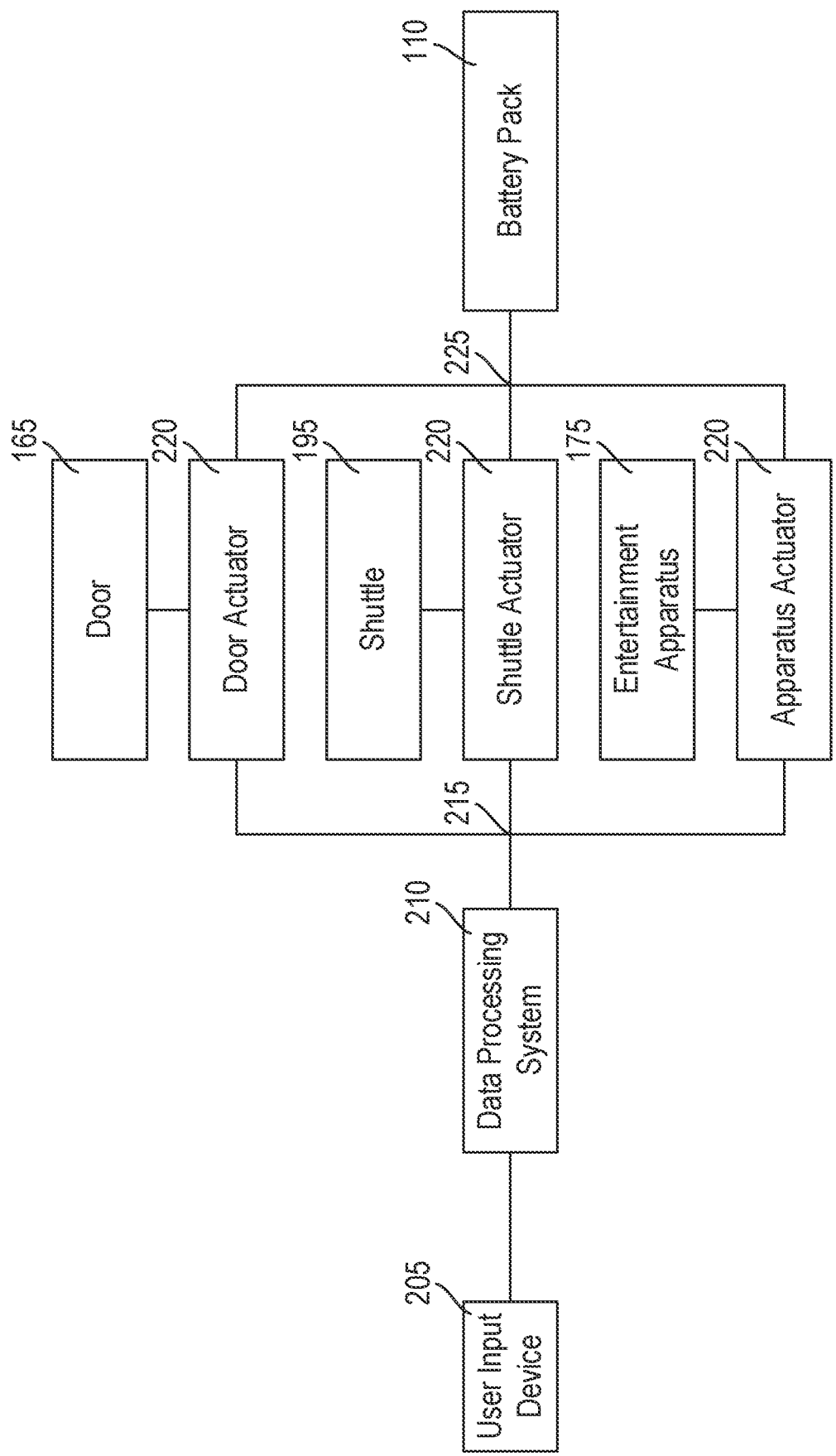
FIG. 2A depicts a data processing system for deploying an entertainment apparatus of a vehicle.

FIG. 2A depicts an example data processing system 210 that controls the gear tunnel 170 of the vehicle 105. The data processing system 210 can be a component of the vehicle 105, e.g., included as part of an infotainment system and can be located in the vehicle 105. The data processing system 210 can be located outside the vehicle 105 and communicate with computing systems of the vehicle 105. The data processing system 210 can be a cloud-based system, a server system, a smartphone, a laptop computer, a desktop computer. The data processing system 210 can connect with at least one actuator 220 of the vehicle 105. The actuators 220 can include a door actuator 220 to open or close the door 165. The actuators 220 can include a shuttle actuator 220 to transport the shuttle 195 into or out of the gear tunnel 170. The actuators 220 can include an apparatus actuator 220 to actuate an entertainment apparatus 175, e.g., deploy the projector 180. The components or actuators 220 can be included within the entertainment apparatus 175, included within the vehicle 105, included within the shuttle 195, included within the tunnel 170. The components or actuators 220 can be configured to extend the entertainment apparatus 175 from the tunnel 170. The components or actuators 220 can be configured to stow or retract the entertainment apparatus 175 within the tunnel 170. The components or actuators 220 can be operated by a user, an occupant, an electronic controller, the data processing system 210, the vehicle 110. The components can include fastening components (e.g., bolts, screws, clips, nails) that fasten the apparatus 175 to the shuttle 195 such that the apparatus 175 extends from the compartment 170 on the shuttle 195. The components can be rolling components, sliding components, telescoping members, or any other component that can allow for the apparatus 175 to extend out of the compartment 170 or to store within the compartment 170.

The actuators 220 can include various motors, electrically actuated locking assemblies, electrically actuated spring or piston assemblies, solenoids, or other components. The data processing system 210 can provide signals to the actuators 220 via electrical connections 215. The electrical connections 215 can be electrical wires, electrical traces, electrical connectors. The data processing system 210 can communicate with at least one data processing system of the actuators 220 via a communication protocol such as a controller area network (CAN), a wireless network such as a Wi-Fi network, a serial communication protocol, a Bluetooth network, a cellular network.

The actuators 220 can be powered via power received from the battery pack 110. The battery pack 110 can provide power to the actuators 220 via electrical connections 225. The electrical connections 225 can convey power from the battery pack 110 to the actuators 220. The electrical connections 225 can include busbars, power distribution boxes, high-voltage distribution boxes, electrical connections, wires, cables. At least one component of the vehicle 105 can prepare power for the actuators 220. The components can transform power from alternating current (AC) power to direct current (DC) power, convert power from DC power to AC power, adjust voltage levels. The actuators 220 can be powered by the battery pack 110 and actuate responsive to receiving a signal from the data processing system 210.

The data processing system 210 can receive a signal and deploy or retract the entertainment apparatus 175 responsive to receiving the signal. The signal can be received from at least one user input device 205. For example, a console of the vehicle 105 can include one or more touch-screens, buttons, keyboards, microphones for voice control. A user can provide an input via the console to cause the data processing system 210 to deploy the entertainment apparatus 175. The signal can be received from an access control device of the vehicle 105, e.g., a key or dongle. A user can press a button on the access control device causing the access control device to send the signal to the data processing system 210 via at least one wired or wireless communications protocol. A user can send the signal to the data processing system 210 from a smartphone running an application, a laptop, a desktop computer, a voice assistant, or another personal device. The user input device 205 can receive a user input via a touch screen, a microphone, a keyboard, a mouse, or any other input device. The user input device 205 can send the signal to the data processing system 210 via a wired or wireless communications protocol responsive to receiving the user input.

Responsive to receiving a signal to deploy the entertainment apparatus 175, the data processing system 210 can cause at least one door 165 to be actuated from a closed position to an open position by communicating a signal to the door actuator 220 causing the door actuator 220 to actuate the door 165. The data processing system 210 can cause the door 165 to be unlocked and to move between a closed position and an open position. The data processing system 210 can cause the shuttle 195 to extend from a position within the tunnel 170 to a position extended out of the tunnel 170 by communicating a signal to the shuttle actuator 220 causing the shuttle 195 and the entertainment apparatus 175 fixed to the shuttle 195 to transport out of the tunnel 170. The data processing system 210 can cause a component of the entertainment apparatus 175 to be actuated, for example, a platform holding the projector 180 can rotate from a storage location to a deployed location by the entertainment apparatus 175.

The data processing system 230 can cause the support 190 to extend from a storage location along a bottom side of the shuttle 195 to a deployed position resting on a surface outside the vehicle 105 (e.g., pavement, a trail, gravel, dirt, concrete). Responsive to receiving a signal to retract the entertainment apparatus 175, the data processing system 230 can cause the support 190 to retract to the storage location by communicating a signal to the shuttle actuator 220. The data processing system 210 can cause the projector 180 to return to the storage location. The data processing system 210 can cause the shuttle 195 to retract back into the tunnel 170. The data processing system 210 can cause the door 165 to move from the open position to the closed position. The data processing system 210 can cause the door 165 to lock by communicating a signal to the door actuator 220 causing the door actuator 220 to lock the door 165.

Figure 2B:
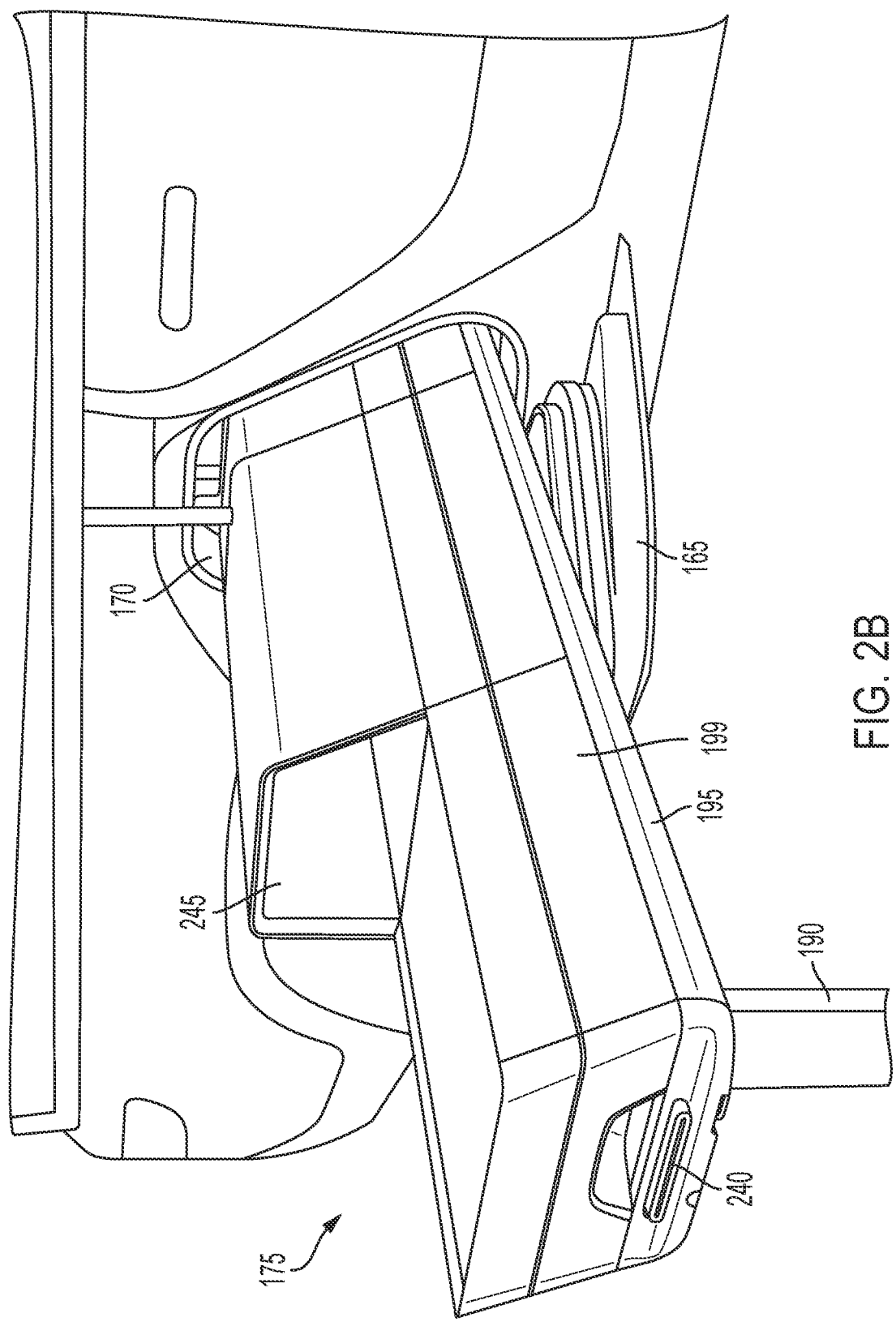
FIG. 2B depicts an example entertainment apparatus.

FIG. 2B depicts an example entertainment apparatus 175. The vehicle 105 is shown to include at least one compartment or tunnel 170, such as a gear tunnel. The gear tunnel 170 can include a tunnel, opening, compartment, chamber, cavity, or other area internal to the vehicle 105 that can store gear such as equipment or accessories for the vehicle or equipment use by the operator or passenger of the vehicle 105. The tunnel 170 can include a bottom side, a top side, a first lateral wall, a second lateral wall, a third lateral wall, and a fourth lateral wall. The tunnel 170 may only include one, two, or three lateral walls. The tunnel 170 can include one or multiple openings. The gear tunnel 170 can extend horizontally, vertically, or diagonally into, across, or through the vehicle 105. The gear tunnel 170 can extend into the vehicle 105 but not fully across the vehicle 105. The gear tunnel 170 can extend into the vehicle 105 fully or partially across the vehicle 105. The gear tunnel 170 can include at least one top portion, at least one bottom portion, at least one first side portion, and at least one second side portion. The first side portion can extend up from a bottom portion to a top portion at an oblique angle to the bottom portion. The first side portion and the second side portion can be oblique to each other. The first side portion and the second side portion can be parallel (e.g., parallel and oblique to the bottom portion or parallel and perpendicular to the bottom portion).

The first side portion and the second side portion can be slanted towards each other or away from each other. The first side portion can include an oblique sub-portion that extends from a bottom of the gear tunnel 170 and a perpendicular sub-portion that extends up to the top portion of the gear tunnel 170 from an end of the oblique sub-portion. The gear tunnel 170 can be disposed adjacent a cargo bed of the vehicle 105. The gear tunnel 170 can be disposed adjacent the rear passenger area of the vehicle 105. The gear tunnel 170 can be disposed between the cargo bed and the rear passenger area. The gear tunnel 170 can be 60-70 inches long. The gear tunnel 170 can be 55-75 inches long. The gear tunnel 170 can be less than 55 inches long. The gear tunnel 170 can be more than 75 inches long. The gear tunnel 170 can be 18-19 inches wide. The gear tunnel 170 can be 17-20 inches wide. The gear tunnel 170 can be less than 18 inches wide. The gear tunnel 170 can be more than 20 inches wide. The gear tunnel 170 can be 19-21 inches high. The gear tunnel 170 can be 18-22 inches high. The gear tunnel 170 can be less than 18 inches high. The gear tunnel 170 can be more than 22 inches high.

A first door 165 can cover a first end of the gear tunnel 170. A second door can cover a second end of the gear tunnel 170 (for example on an opposite end of the gear tunnel 170). The doors 165 can move between open and closed positions sealing or exposing an interior of the gear tunnel 170. The doors 165 can hinge on a bottom side, a top side, or a lateral side. The door 165 can be lowed (e.g., via a user pulling on the door 165, a compressed spring pushing the door 165 out, a compressed piston pushing the door 165 out, a motor that runs to transport the door 165).

The shuttle 195 can be included within the gear tunnel 170. The shuttle 195 can rest upon a bottom portion of the gear tunnel 170. The shuttle 195 can be completely enclosed within the gear tunnel 170 when in a retracted position. The shuttle 195 can be secured within the gear tunnel 170 by the doors 165. The shuttle 195 can extend out of the gear tunnel 170 and rest upon an end of the gear tunnel 170 or the door 165. The shuttle 195 can extend out of the gear tunnel 170 by a user pulling on the shuttle 195, a motor that transports the shuttle 195, a compressed spring that pushes the shuttle 195 out of the gear tunnel 170, a compressed piston that pushes the shuttle 195 out of the gear tunnel 170. The shuttle 195 can fix to an end of the gear tunnel 170 or the door 165 via a connector, a snap, a bolt, a strap. The shuttle 195 can ride on rails, grooves, wheels, to transport between a retracted position (within the gear tunnel 170) and an extended position (e.g., at least partially outside the gear tunnel 170). When the shuttle 195 is removed from the gear tunnel 170, the shuttle 195 may lock into place with an audible locking sound, clicking sound, or popping sound. A user can interact with a button 240 to unlock the shuttle 195 and a handle to retract the shuttle 195.

The entertainment apparatus 175 can connect with the shuttle 195 via an electrical connection to power the projector 180 or the speaker 185. The connection can be made automatically when the entertainment apparatus 175 is set onto the shuttle 195. A user may connect one or more cables from the shuttle 195 to the entertainment apparatus 175. The entertainment apparatus 175 can have a footprint or electrical connectors that allow the entertainment apparatus 175 to be installed on an existing shuttle 195 or fit within an existing gear tunnel 170 and integrate with the existing electrical system of the vehicle 105. This allows the entertainment apparatus 175 to work seamlessly with the shuttle 195 or the gear tunnel 170 without requiring a redesign or reconfiguration of the shuttle 195 or the gear tunnel 170.

The gear tunnel 170 can be sealed from external conditions. For example, the doors 165 can be sealed via rubber or plastic portions that surround the outer area of the door 165 or surround the opening of the gear tunnel 170. The gear tunnel 170 can protect the projector 180 or the speaker 185 from external conditions. External conditions can include rain, snow, dirt, mud, dust, wind, fire.

The opening of the gear tunnel 170 can be a pentagonal shape, a trapezoidal shape, or any other shape. The shape of the entertainment apparatus 175 can also be a pentagonal shape, a trapezoidal shape, or any other shape. The entertainment apparatus 175 can be a plastic material, metal material (e.g., aluminum, tin, steel), composite, or wooden material. The entertainment apparatus 175 can be a smaller pentagonal shape than the gear tunnel 170 allowing the entertainment apparatus 175 to fit within the gear tunnel 170. The entertainment apparatus 175 can fit within the gear tunnel 170 in a telescoping manner. The gear tunnel 170 and the entertainment apparatus 175 can be rectangular shapes, circular shapes, diamond shapes, triangular shapes, pentagonal shapes, trapezoidal shapes, etc. The entertainment apparatus 175 can include a compartment 245. The compartment 245 can store components such as a projector screen, poles of a projector frame, blankets, food, chairs. The compartment 245 can be a trapezoidal shape such that it can fit within the gear tunnel 170. The compartment 245 can include an open side, a top side, a bottom side, an end, and lateral sides. The compartment 245 can have a height of 16-17 cm. The compartment 245 can have a height of 15-18 cm. The compartment 245 can have a height of more than 18 cm. The compartment 245 can have a height less than 18 cm. The compartment 245 can include a bottom width. The bottom width can be 31-32 cm. The bottom width can be 30-33 cm. The bottom width can be more than 33 cm. The bottom width can be less than 30 cm. The compartment 245 can include a top width. The top width can be less than the bottom width. The top width can be 23-24 cm. The top width can be 22-25 cm. The top width can be more than 25 cm. The top width can be less than 22 cm.

At least a portion of the entertainment apparatus 175 can include, be in contact with, or be proximate to an insulative or vibration damping material. The material can be wrapped around the entertainment apparatus 175. The material can be disposed within the tunnel 170. For example, the material can cover at least a portion of an interior surface of the tunnel 170. The material can cover an entire surface of the tunnel 170. The material can wrap around the apparatus 175 when the apparatus 175 is retracted within the tunnel 170. The material can contact the apparatus 175 while the apparatus 175 is disposed in the tunnel 170. The material can shield the apparatus 175 from vibrations when the vehicle 104 is driving. The material can shield the apparatus 175 from moisture or other environmental conditions.

Figure 2C:
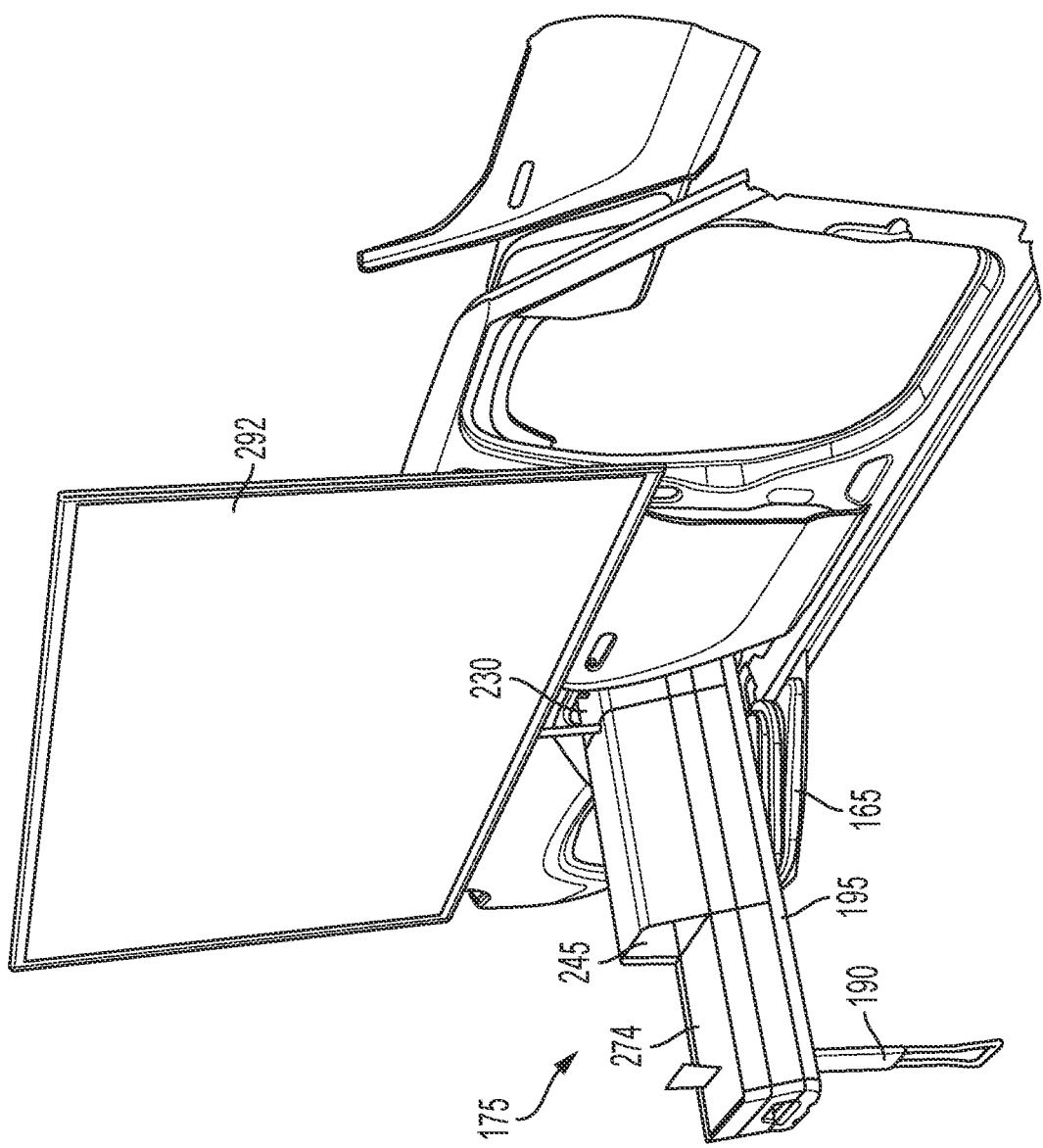
FIG. 2C depicts an example entertainment apparatus including a projector screen.
Figure 2D:
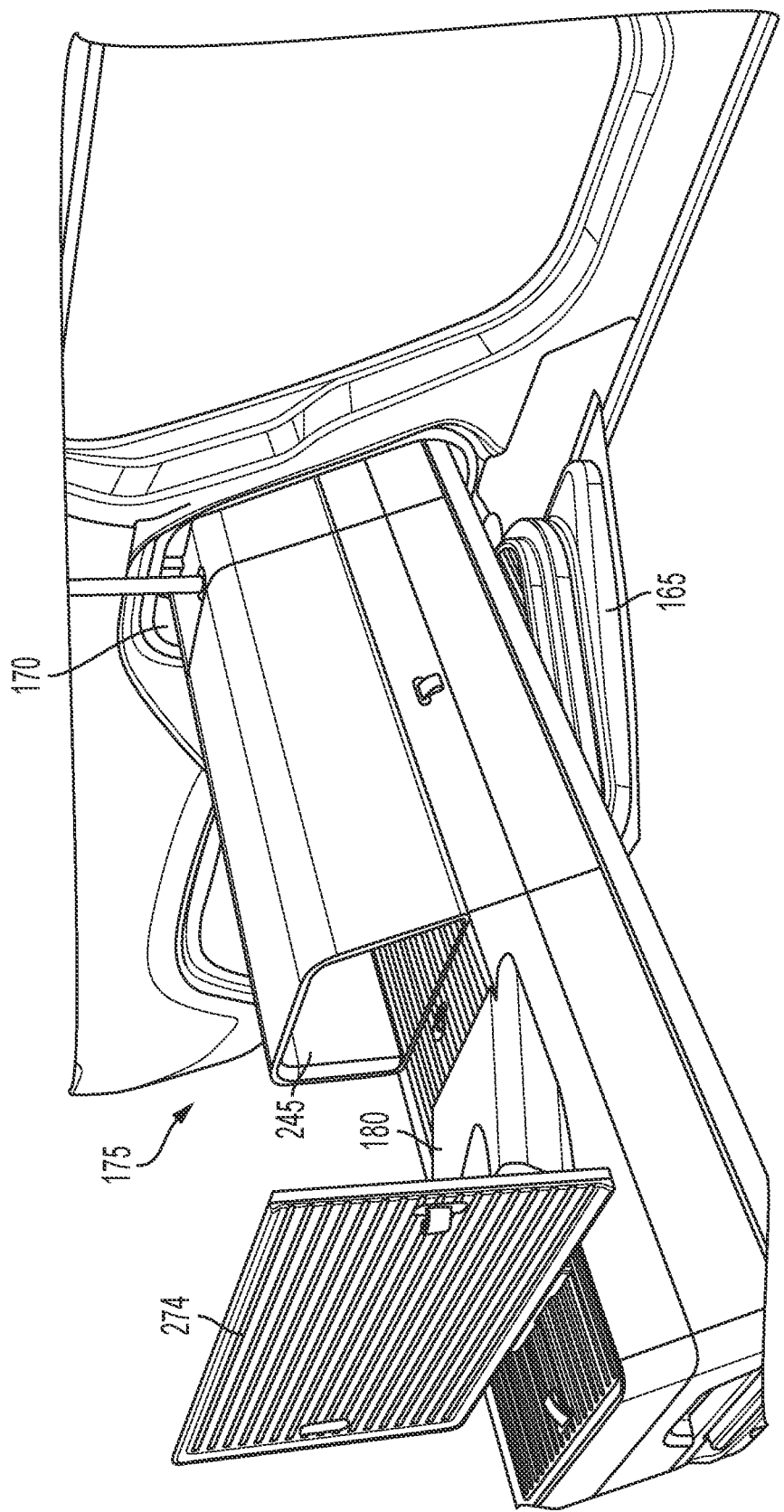
FIG. 2D depicts an example entertainment apparatus including a projector and a mirror.
Figure 2E:
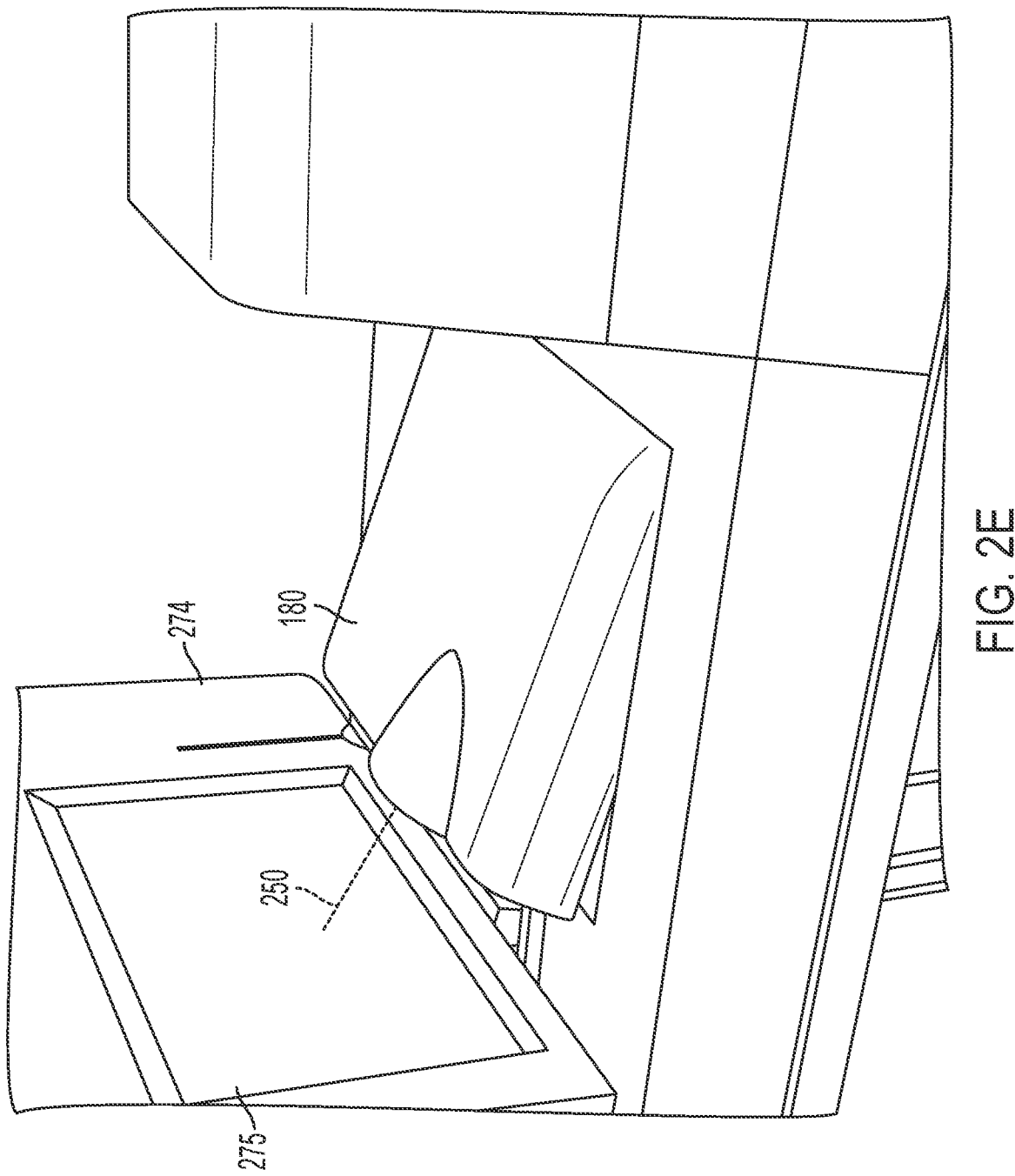
FIG. 2E depicts an example entertainment apparatus including a projector that includes a lens that projects light onto a mirror.

FIGS. 2C-2E depict an example entertainment apparatus 175 including a projector 180 and a cover 274 including a mirror 275. The projector 180 can be oriented at an angle within the entertainment apparatus 175. The angle can be 12-13 degrees. The angle can be 11-14 degrees. The angle can be more than 14 degrees. The angle can be less than 11 degrees. The projector 180 can be at an angle of 40-50 degrees relative to a surface of the entertainment apparatus 175. The projector 180 can be at an angle of 35-55 degrees relative to the surface of the entertainment apparatus 175. The projector 180 can project light onto the mirror 275. The mirror 275 can include a reflective material, e.g., glass with a reflective coating, metal with a reflective coating. The mirror 275 can reflect the light projected by the projector 180 back towards the vehicle 105 and onto a projector screen 292. At last one support for the mirror 275 can be fixed to a rotating projector mount and be deployed when the projector 180 is deployed.

The cover 274 can a cover a compartment of the entertainment apparatus 175. The cover 274 can be held down via magnets, snaps, connectors, latches, etc. The cover 274 can cover a cavity of the entertainment apparatus 175 that stores components, e.g., the projector 180. A user can remove the cover 274 from the entertainment apparatus 175 and can position in the cover 274 and the mirror 275 in a holding position to reflect light from the projector 180 to the projector screen 292. A back side of the cover 274 can be laid parallel to the entertainment apparatus 175 and cover the projector 180, a remote for the projector 180, a remote for the speakers 185, a remote for a streaming box. A user can remove the mirror 275 via one or more tabs. One side of the cover 274 can include a reflective coating while another side of the cover 274 can be an enclosure or housing 199 that covers the projector 180. In the holding position, the cover 274 can clip into clips of the entertainment apparatus 175, include pins that fit into holes of the entertainment apparatus 175, rest upon a support (e.g., the portion 260 or a top surface 263 in front of the portion 260) of the entertainment apparatus 175. The mirror 275 can be flat, concave, or convex. The mirror 275 can be designed to be flat, concave, or convex to control a distance or size of a projected image. The design of the mirror 275 can control the image to project properly onto a projector screen.

The mirror 275 can extend an optical path of the projector 180. For example, the mirror 275 can extend an optical path from a lens of the projector 180 to the projector screen 292. The longer the optical path, the larger the size of the projected image. Because both the projector 180 and a projector screen are included on the entertainment apparatus 175, the relative distance between the projector 180 and the projection screen may be short (e.g., 1-8 feet). The optical path can be increased by the mirror 275 to be a longer distance than the relative distance between the projector 180 and the projector screen 292. The projector 180 can project light away from the projector screen 292 towards the mirror 275 and the mirror 275 can reflect the light back towards the projector screen 292. A distance 250 between the lens of the projector 180 and the mirror 275 can be 2-4 inches, 1-5 inches, more than five inches, less than one inch.

The projector 180 can project light directly onto the projector screen 292. For example, the apparatus 175 may be structured without the mirror 275 (e.g., or any other mirror external to the projector 180). The projector 180 can be oriented to project light directly onto the projector screen 292. The projector 180 can rotate to project light onto the projector screen 292. For example, the projector 180 can be tilted upwards via a platform from a storage location to a projecting position. The platform can include a rotating component that rotates to position the projector 180 towards the projector screen 292 such that the projector 180 projects light directly onto the projector screen 292. The rotating component can include bearings, wheels, or other components. The rotating component can be rotated by a spring, piston, motor, or manually by a user.

Figure 2F:
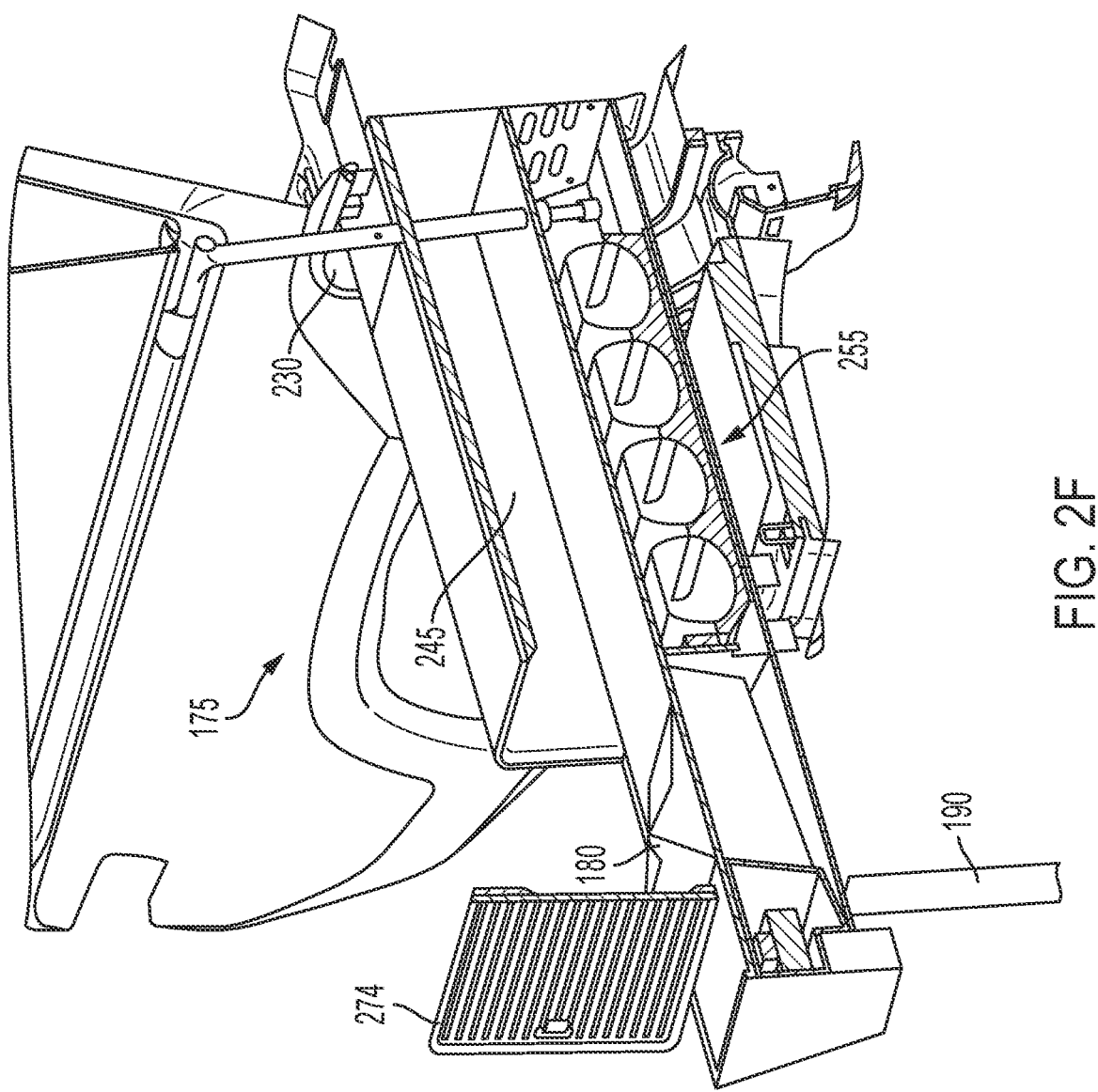
FIG. 2F depicts an interior of an example entertainment apparatus.

FIG. 2F depicts an example entertainment apparatus 175. The entertainment apparatus 175 is shown in an exposed view in FIG. 2F. The projector 180 is shown in two different positions, a horizontal position and an angled position (relative to a surface of the entertainment apparatus 175). The projector 180 can be located in the horizontal position for storage. The projector 180 can be located in the angled position to project light onto the mirror 242. The entertainment apparatus 175 can include a connector 255. The connector 255 can include one or more slots for docking the speakers 185 with the entertainment apparatus 175. The slots can be shaped to conform with an outer surface of the speakers 185. For example, each slot could be or include a cylindrical portion, a rectangular portion, spherical portion. The slots can include a cork material. The slots can hold the speakers 185 via friction. The speakers 185 can be held via a latch or other connector instead of, or in addition to, a cradle with friction. A speaker can be pulled upwards to release the speaker from the slot. The slots can make electrical connections with the speakers 185. Batteries of the speakers 185 can charge via the electrical connections via power received from the battery pack 110. The speakers 185 can be powered based on power received from the battery pack 110.

Figure 2G:
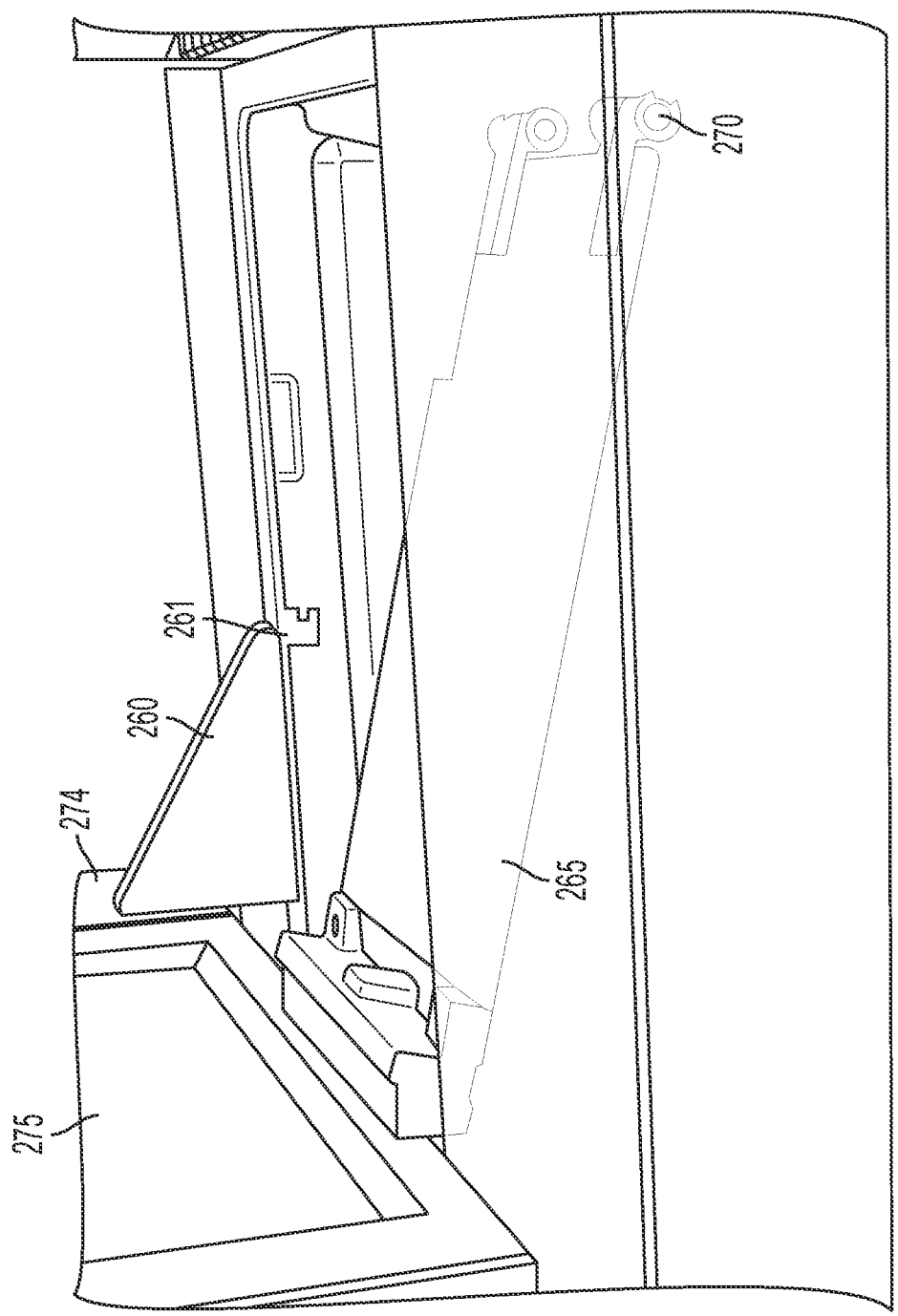
FIG. 2G depicts an example platform for a projector of an entertainment apparatus.

FIG. 2G depicts a platform 265 for the projector 180. The entertainment apparatus 175 can include at least one platform 265. The projector 180 can sit upon, or be fixed to, an upper surface of the platform 265. The projector 180 can be fixed to the platform 265 via screws, snaps, clamps, wing nuts, latches. The platform 265 can rotate on at least one component, such as a hinging component 270. The hinging component 270 can allow the platform 265 to move between a horizontal position for storing the projector 180 and an angled position for utilizing the projector 180. The hinging component 270 can include a compressed spring, a piston, a gas spring, a motor, or another component that pushes the platform 265 from the horizontal position to the angled position. A user can press a button or flip a switch causing the hinging component 270 to raise the projector. The support (e.g., the portion 260) for the mirror 275 can be deployed when the button is pushed. The portion 260 can move from a position parallel to the surface of the entertainment apparatus 175 to a position perpendicular to the surface of the entertainment apparatus 175 responsive to a user pressing the button or switch. The portion 260 can be actuated by a compressed spring, a piston, a gas spring, a motor, or another component. The projector 180 and the portion 260 can be connected by a wire to the platform 265 such that when the platform 265 raises or lowers, the portion 260 is raised or lowered. Furthermore, responsive to the button press, a side panel of the entertainment apparatus 175 can kick out providing more space for the projector 180. A user can press down on the projector 180 to unlock the platform 265 and the platform 265 can move the projector 180 from the storage position to the projecting position. The portion 260 can move from the vertical to the parallel position along with the projector 180 via one or more connecting parts. Pushing the projector down can compress a spring or piston. The platform 265 can be connected to a base of the entertainment apparatus 175 via a gas strut.

A portion 260 can hinge, via a hinge 261, with a side of the entertainment apparatus 175. When the platform 265 is pushed down into a horizontal position, this can compress the hinging component 270. The hinge 261 can be a first hinge and the hinging component 270 can be a second hinge. The portion 260 can be triangular shaped, square shaped, diamond shaped, circular shaped. The portion 260 can hinge between a first position to when the platform 265 is in the horizontal position and an upright position when the portion 260 and the platform 265 are released. The hinging component 270 can actuate causing the platform 265 and the projector 180 to rise into the angled position. When the portion 260 is positioned vertically, a side of the portion 260 can support a side of the projector 180. The portion 260 can be tied to the projector bracket (e.g., platform 265) via a steel cable. When the latch is released, a torsion spring included in the latch can drive the portion 260 upwards. There can be a rotary latch in the bottom of the apparatus 175 that catches a striker on the projector bracket (e.g., the platform 265).

The fixed location and angle of the projector 180, the mirror 275, and projector screen 292 in the entertainment apparatus 175 can allow for minimal configuration or calibration time. For example, a user can extend the shuttle, deploy the projector (e.g., release the platform 265 causing the projector 180 to move into the angled position for operation), and attach the cover 274 including the mirror 275. A user may not need to manually adjust the position of the projector 180, the zoom of the projector 180, the position of the projector screen 292. The configuration of the entertainment apparatus 175 can allow a user to quickly and efficiently set up the projector 180. In some cases, a user may set up the projector 180 a single time, e.g., configure the zoom of the projector 180. Since the projector 180, the mirror 275, and the projector screen may not move positions, the user only needs to setup the system once instead of multiple times.

The cover 274 can include a slot. The slot can be shaped as a t-slot. The mirror 267 can slide onto an edge of the portion 260 via the slot of the mirror 267 when the portion 260 is oriented perpendicular to a surface of the entertainment apparatus 175. The edge can be configured to fit into the slot of the mirror 267. The edge can be an "I" shape or "T" shape. Furthermore, the mirror 267 can include a pin hole. A pin of the entertainment apparatus 175 can be inserted into the pin hole securing the mirror 267 to the entertainment apparatus 175. A user can remove the mirror 267 and lower the slot of the mirror 267 onto the portion 260 and the pin hole onto a pin of the entertainment apparatus 175 (or the platform 265). This can secure the mirror 267 to the entertainment apparatus 175.

Figure 2H:
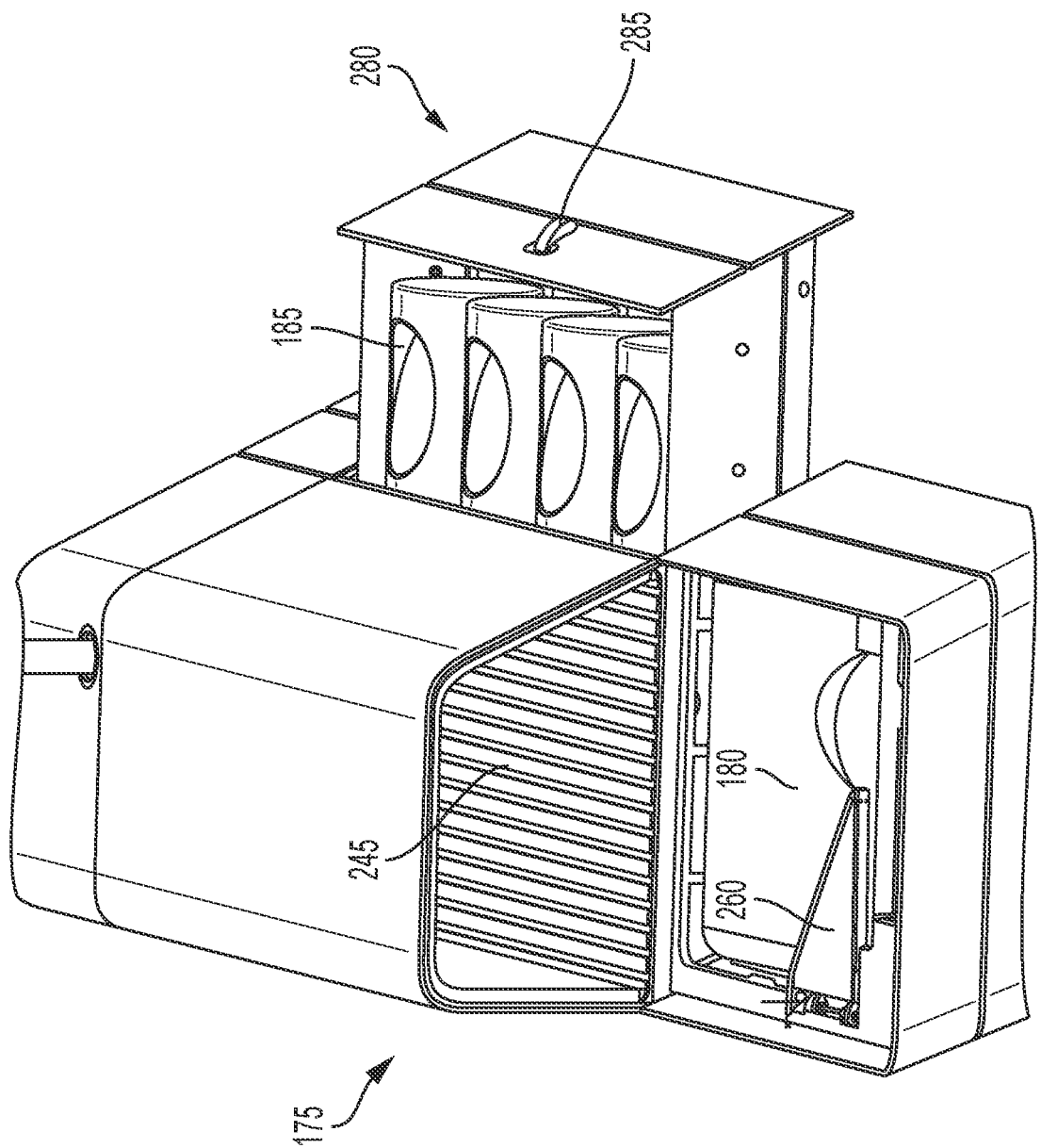
FIG. 2H depicts an example entertainment apparatus including a drawer that stores speakers.

FIGS. 2H-2I depict an entertainment apparatus 175 with a drawer 280 containing speakers 185. The drawer 280 can slide out of the entertainment apparatus 175. The drawer 280 can slide between a retracted position where the speakers 185 are stored within the entertainment apparatus 175 and an extended position where the speakers 185 are exposed. The drawer 280 can retract or extract on rails. A user can pull on a cord 285. The cord 285 can be webbing (rectangular shaped webbing), a cable, a piece of material, a rope. The cord 285 can unlock a latch 290 of the entertainment apparatus 175 allowing the drawer 280 to extend out of the entertainment apparatus 175. The latch 290 can hinge on a hinging member. Responsive to the cord 285 being pulled, the latch 290 can move upwards. A triangular portion of the latch 290 can catch on a member of the entertainment apparatus 175 preventing the drawer 280 from extending out of the entertainment apparatus 175. Responsive to the cord 285 being pulled, the latch 290 can move upwards on the hinging member and the triangular portion can move free of the member. This can unlock the drawer 280 allowing the drawer 280 to be pulled outwards.

Figure 2J:
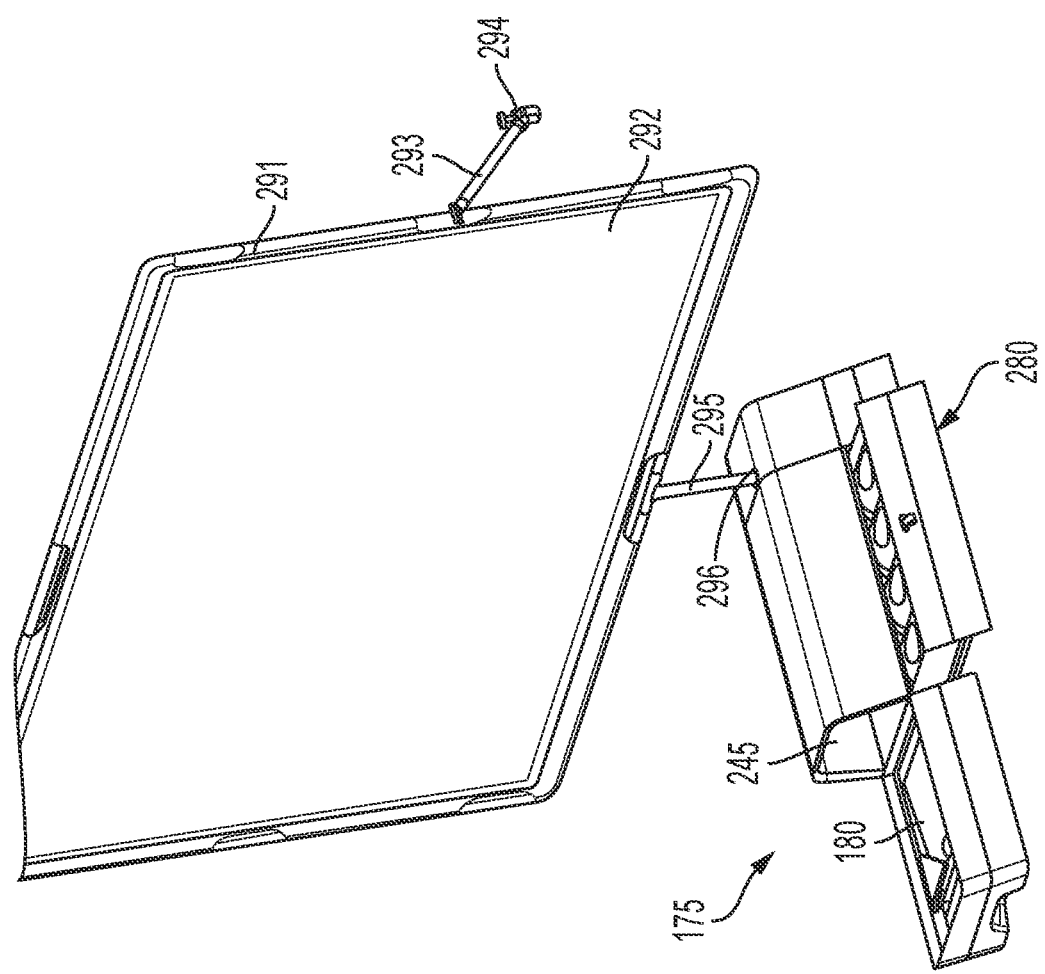
FIG. 2J depicts an example entertainment apparatus including a projector screen.
Figure 2K:
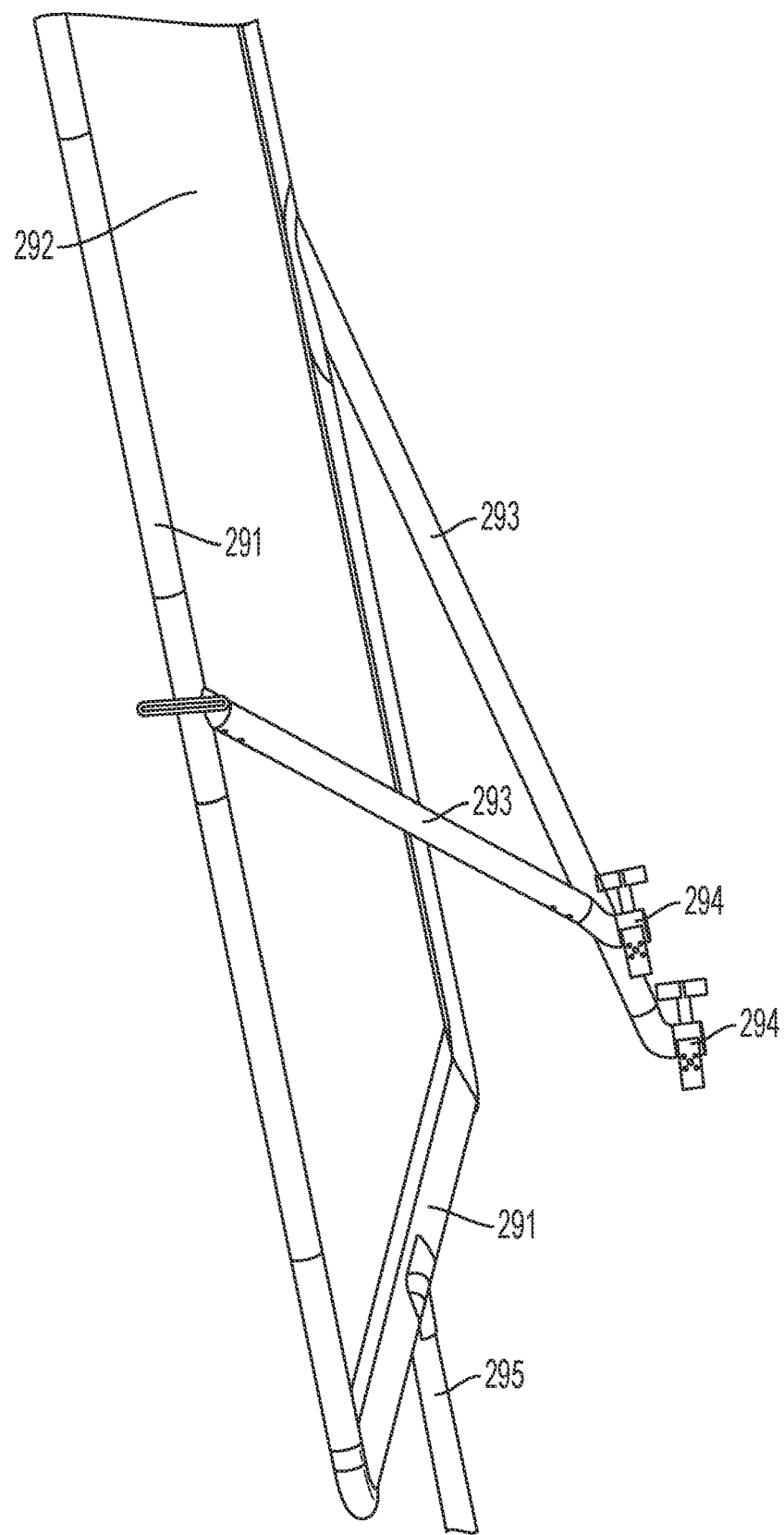
FIG. 2K depict an example projector screen including a frame.
Figure 2L:
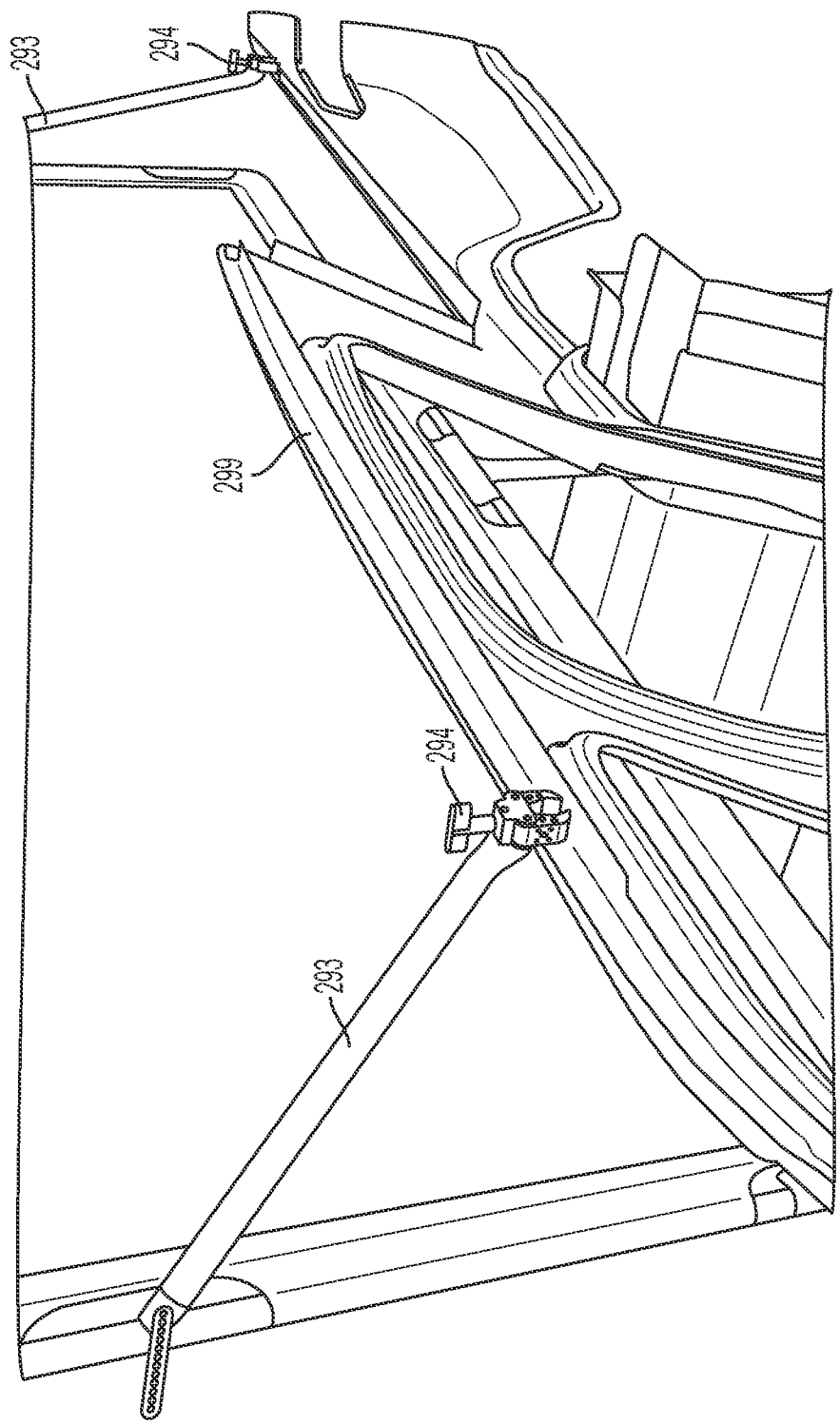
FIG. 2L depicts an example projector screen including a frame fixed to a frame of a vehicle.

FIGS. 2J-2L depicts an example entertainment apparatus 175 including a projector screen 292. The projector screen 292 can be stretched across a frame 291. The projector screen 292 can be fixed to the frame 291 via snaps, adhesive, bolts, screws, tape, clasps, nuts, belts, fabric loops. The frame 291 can include members forming a square, rectangle, circle. The frame 291 can include poles. The poles can telescope and snap together. The poles can include right angle members. The poles can surround at least one of a top side, a bottom side, a left side, or a right side of the projector screen 292. The frame 291 can be supported by a member such as at least one pole 295. The pole 295 can be inserted through an opening 296 into the entertainment apparatus 175 where the pole 295 can be fastened.

The frame 291 can be connected to at least one support member 293. The support member 293 can include poles, beams, telescoping members. An end or other portion of the support member 293 can include at least one connector 294. The connector 294 can include a clamp and a rotatable member. The rotatable member, when rotated, can tighten or loosen the clamp based on the direction that the rotatable member is turned. The connectors 294 can be attached to members of a frame of the vehicle 105. For example, a top of a cab, a side of a door, a tailgate, a bumper, a truck bed, a wall of a truck bed, can include a member that the connector 294 can connect to and support the projector screen 292. The support member 293 can be connected to the frame 291 by a strap. The strap can hold the frame 291 to the support member 293 via friction. The strap can be a rubber strap.

Figure 2M:
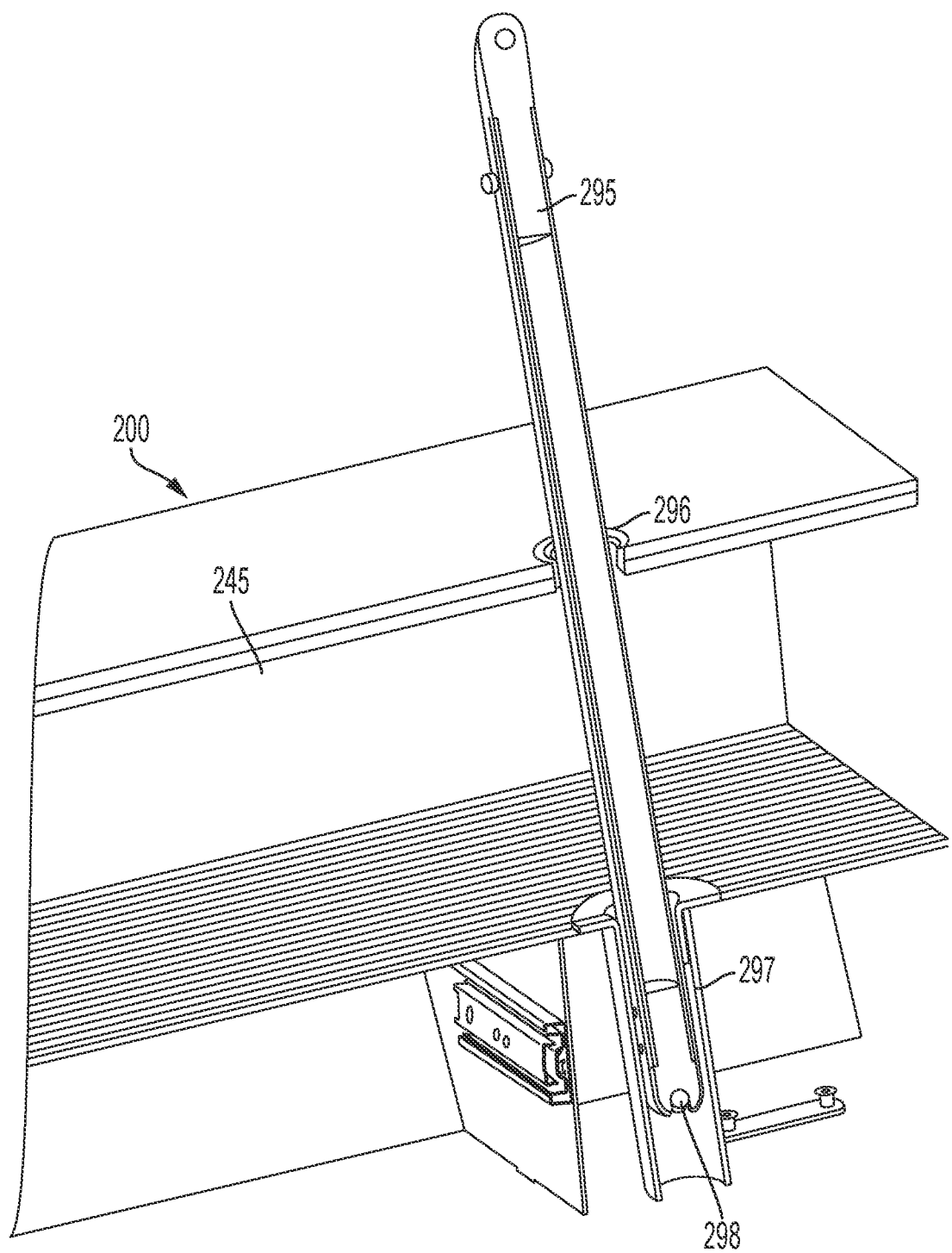
FIG. 2M depicts an example mechanism to fix a pole of a projector screen to an entertainment apparatus.
Figure 2N:
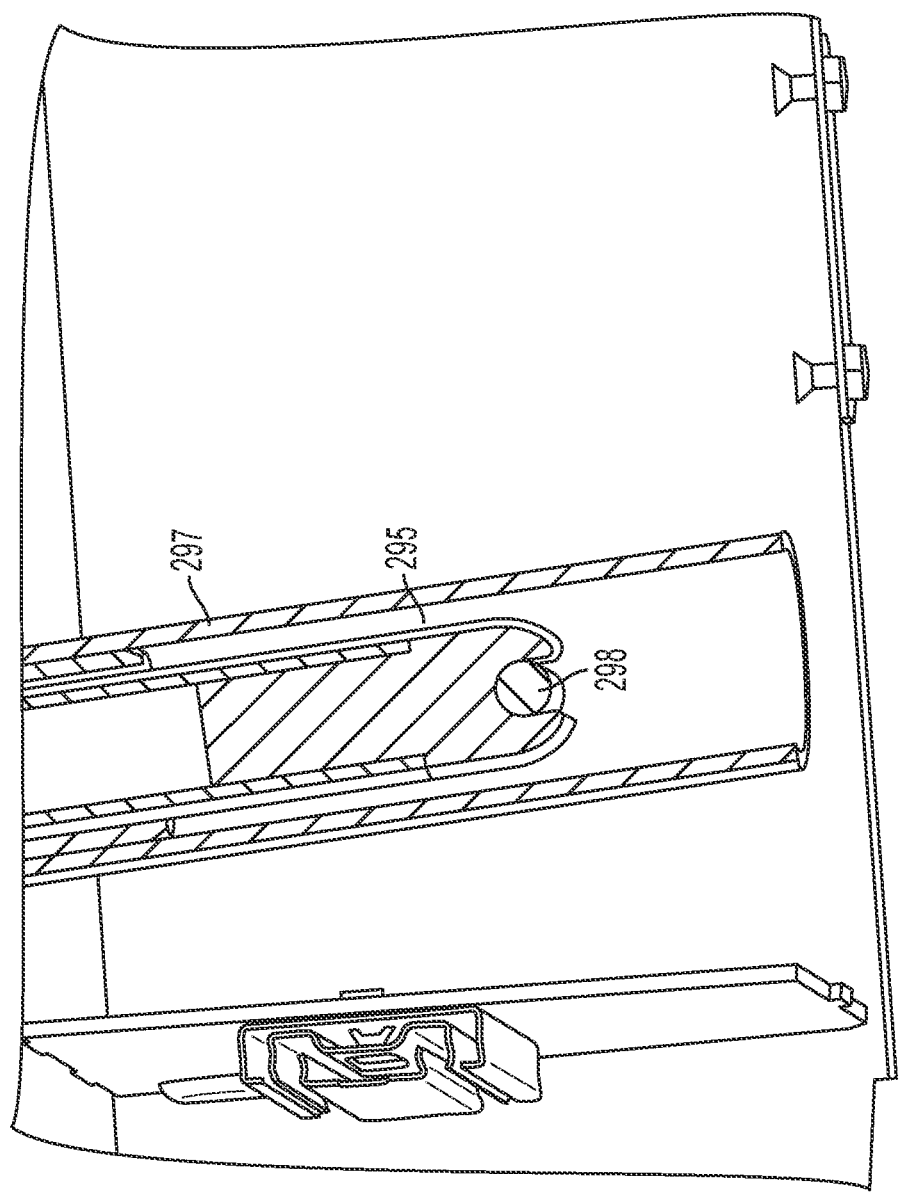
FIG. 2N depicts an example mechanism including a receiving member that receives a pole of a projector screen.

FIGS. 2M-2N depict an example projector screen including a pole 295 that fixes to a vehicle 105. Pole 295 can be inserted through an opening 296 of the entertainment apparatus 175. The pole 295 can be inserted through the compartment 245 of the entertainment apparatus 175. The pole 295 can be inserted into an opening of a receiving member 297. The pole 295 and the receiving member 297 can be telescoping members. The receiving member 297 can include a pin 298. The pin 298 and an end of the pole 295 can form a pin in slot connection. The end of the pole 295 can include a slot. The pin 298 can support the pole 295. Furthermore, the pin 298 can limit the pole 295 from rotating along a longitudinal axis of the receiving member 297.

Figure 3A:
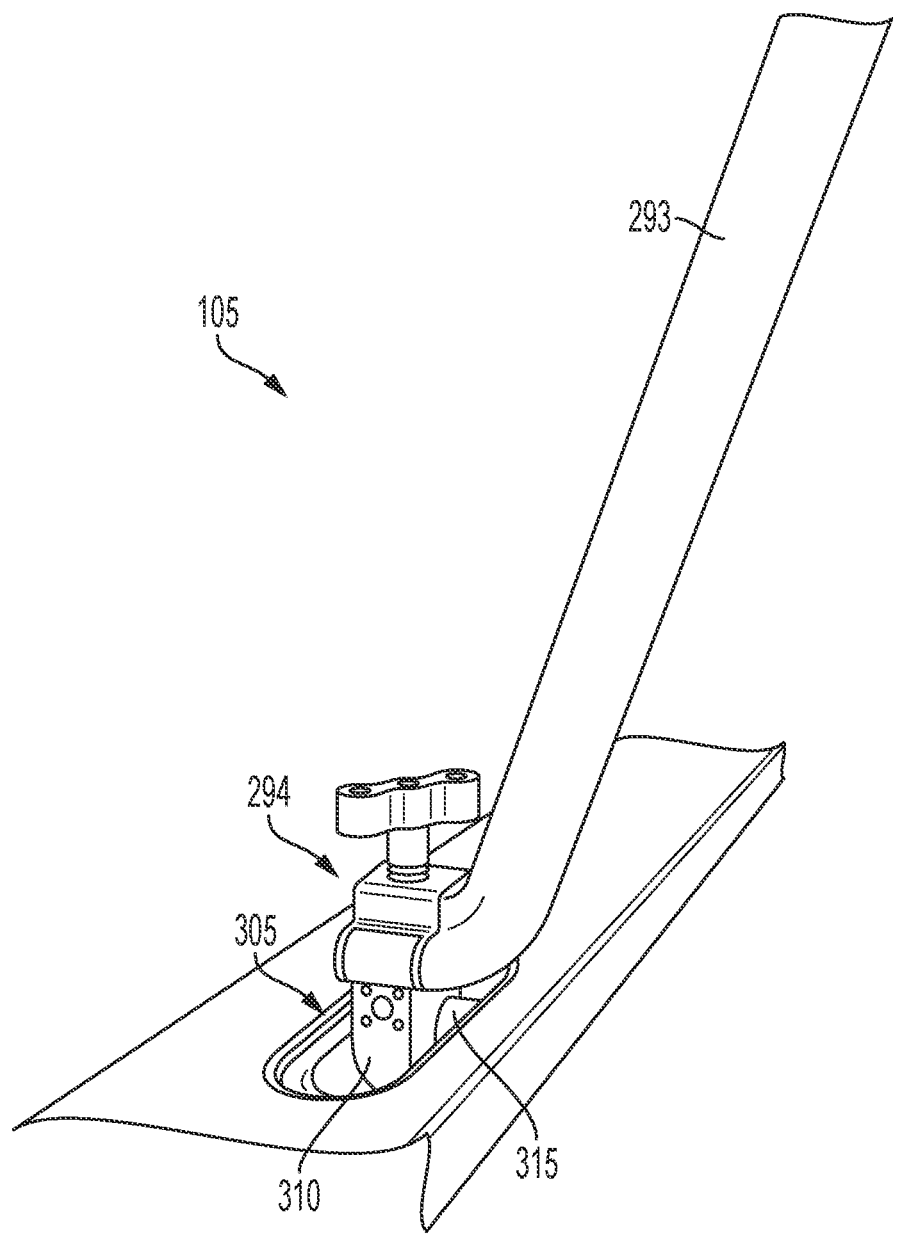
FIG. 3A depicts an example vehicle where a support member of a projector screen is fixed to a frame of the vehicle.

FIG. 3A depicts an example vehicle 105 where at least one support member 293 of a projector screen is fixed to a frame 299 of the vehicle 105. The frame 299 can include at least one apparatus 305, such as at least one receiving apparatus. The receiving apparatus 305 can be a portion of the frame 299 or can be fixed to the frame 299. The receiving apparatus 305 can be located on a top surface of the frame 299. One or more receiving apparatus 305 can be located on a wall of a truck bed or a roof of a cab of the vehicle 105.

The receiving apparatus 305 can include at least a portion, such as a cylindrical portion 315. The cylindrical portion 315 can include at least one side that is exposed. The receiving apparatus 305 can include at least one open portion 310 that exposes a side of the cylindrical portion 315. The connector 294 of the support member 293 can connect to the receiving apparatus 305. Ends of a camp of the connector 294 can be inserted into the open portions 310. A portion of the connector 294 can be operated by a user to close the clamp around the cylindrical portion 315. Closing the clamp around the cylindrical portion 315 can secure the connector 294 and the support member 293 to the receiving apparatus 305.

Figure 3B:
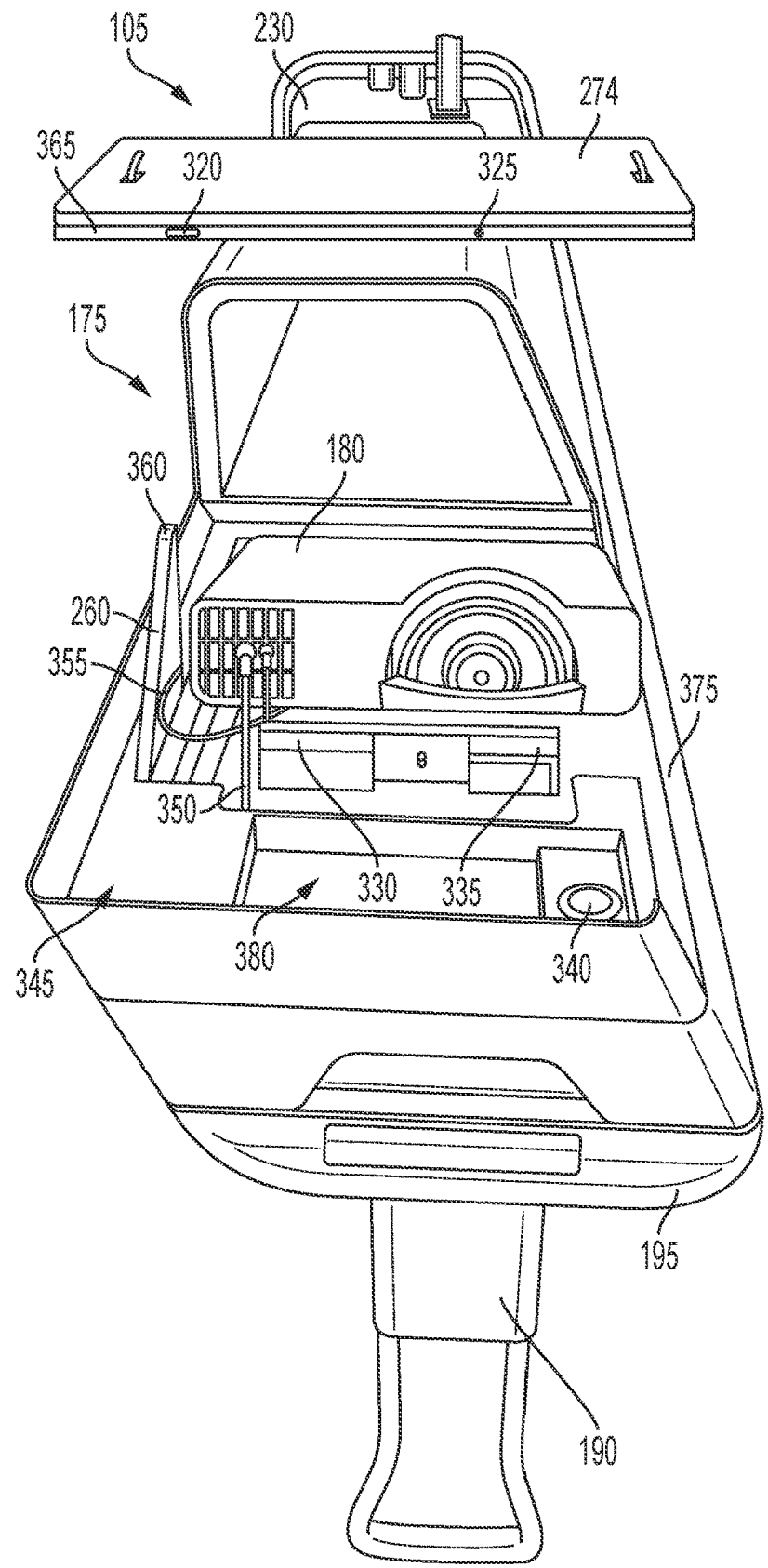
FIG. 3B depicts an example entertainment apparatus where a cover is removed to expose a projector.
Figure 3C:
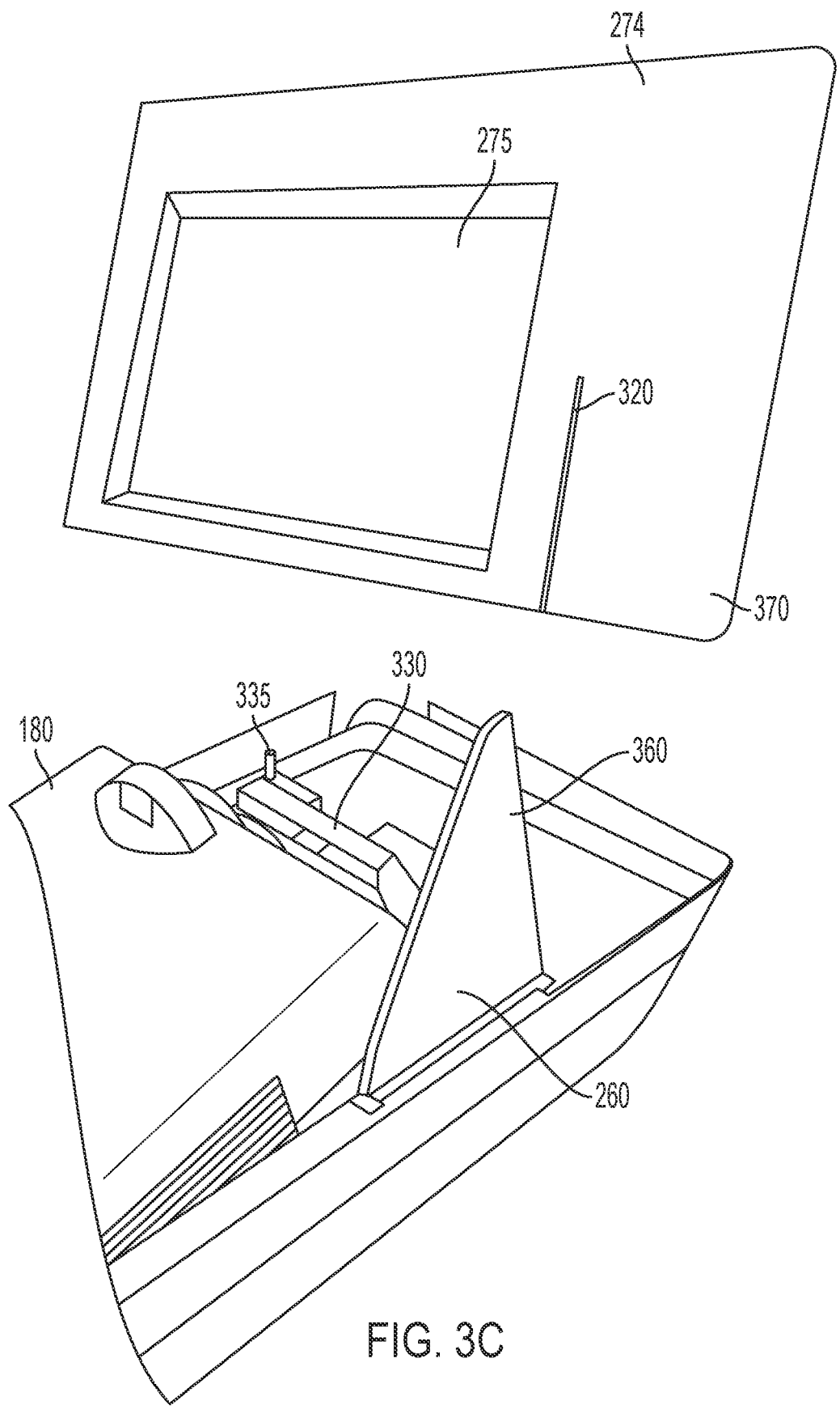
FIG. 3C depicts an example entertainment apparatus where a cover including a mirror is fixed to a portion of the entertainment apparatus to fix the mirror to the portion.

FIGS. 3B-3C depicts an example entertainment apparatus 175 where a cover 274 is removed to expose a projector 180. The projector 180 can be stored within a compartment 345. The compartment 345 can be a cavity, opening, or interior of the entertainment apparatus 175. The compartment 345 can be formed by a bottom side, a first lateral wall, a second lateral wall, a third lateral wall, and a fourth lateral. The cover 274 can be laid across an opening of the compartment 345 to enclose the compartment 345 and cover the projector 180. The cover 274 can be removed from the entertainment apparatus 175 to expose the compartment 345.

The cover 274 can include a slot 320. The slot 320 can include an opening on an edge 365 of the cover 274. The slot 320 can be a rectangular opening, a circular opening, a triangular opening, a diamond opening. The size of the slot 320 can be sized such that an edge 360 of the portion 260 attached to the portion can fit into the slot 320. The edge 360 can be an "I" or "T" shaped edge. A surface 370 of the cover 274 can include a cut out portion for the slot 320. The cut out portion can be a width less than a width of the edge 360 but wide enough that a member between the portion 260 and the edge 360 can fit within the cut out portion. The cover 274 can be fixed to the portion 260 by fitting a top of the edge 360 into the slot 320 and sliding the cover 274 from the top of the edge 360 to a bottom or lower portion of the edge 360. The cover 274 can include at least spring steel inside the slot 320 that acts as a holding force between the cover 274 and the triangular support 260.

The edge 365 of the cover 274 can include a hole 325. The hole 325 can include a circular opening, a rectangular opening, a triangular opening. The hole 325 can form a cavity within the cover 274, such as a cylindrical cavity. When the cover 274 is fixed to the portion 260, a pin 335 can insert into the hole 325. The pin 335 can be a cylindrical shape, a rectangular solid shape. The pin 335 can limit rotation of the cover 274. The pin 335 can be mounted to a bracket 330. The bracket 330 can be fixed to an end of the platform 265 and can raise or lower with the platform 265. The bracket 330 can be fixed to a piston 350. The piston 350 can be a compressed spring piston, a compressed gas piston.

The compartment 345 can include at least one tray 380. The tray 380 can store at least one remote control device for the projector 180 or a streaming box for the projector 180. The compartment 345 can include at least one button 340. Responsive to a user interacting with the button 340, the projector 180 can be rotated from a horizontal orientation that is horizontal to a top surface of a housing 199 of the entertainment apparatus 175 to an angled position that is angled relative to a top surface of the entertainment apparatus 175. The platform 265 can rotate on the hinging component 270 responsive to the button 340 being pushed. A compressed spring, piston, or other member (e.g., the piston 350) can be unlocked by the button 240 allowing the platform 265 to rotate to move the projector 180 between the horizontal orientation to the angled position. Responsive to the button 340 being pressed, the piston 350 can push the bracket 330 and the platform 265 upwards from the horizontal orientation to the angled orientation. The entertainment apparatus 175 can include a side flap 375. The side flap 375 can hinge or flex responsive to the button 340 being pressed. For example, a spring, compressed piston, or a motor can push the flap 375 outwards to make space for the projector 180.

A user can press down on the projector 180, pushing the platform 265 and the bracket 330 down from the angled position to the horizontal position. The piston 350 can become compressed by the motion of the bracket 330 and be reloaded for the projector 180 to be deployed again. Furthermore, a connector 355 can connect the portion 260 to the bracket 330. The connector 355 can be a string, a wire, a cable or another connector. The connector 355 can exert a force on the portion 260 causing the portion 260 to move from a vertical orientation relative to an opening of the compartment 345 to a horizontal orientation relative to the opening of the compartment 345. Furthermore, the platform 265 can connect with the flap 375. When the platform 265 transports to the horizontal orientation, the flap 375 can be pulled inwards to be flat with an outer surface of a housing 199 of the entertainment apparatus 175.

Figure 3D:
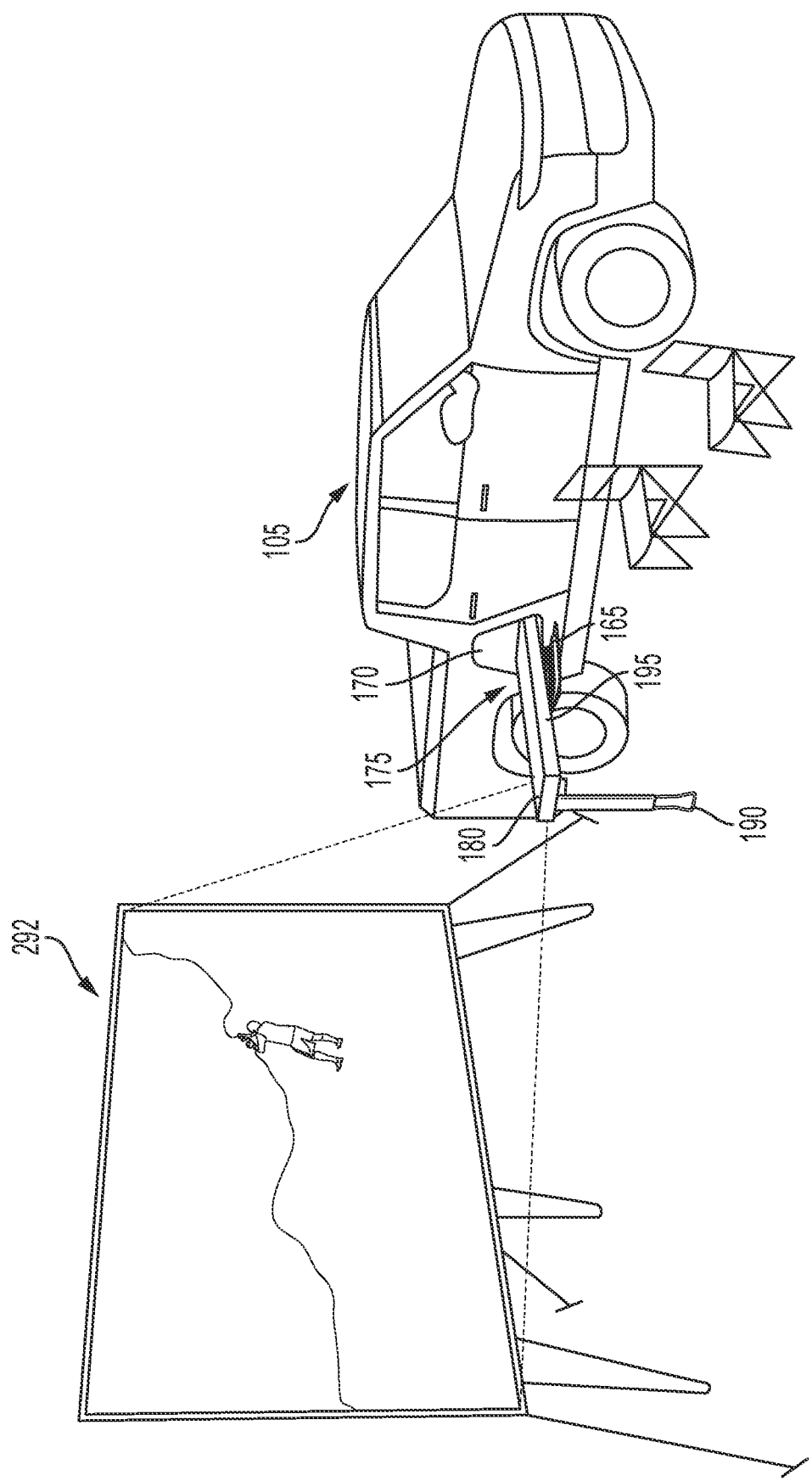
FIG. 3D depicts an example vehicle including an entertainment apparatus and a projector that projects light onto a projector screen separate from the vehicle.

FIG. 3D depicts an example vehicle 105 including the entertainment apparatus 175 and the projector 180. The vehicle 105 can be oriented, e.g., driven and parked, next to a projector screen 292. The vehicle 105 can be oriented such that the shuttle and the projector 180 are in front of the projector screen 292 such that the projector 180 can project light onto the projector screen 292. The projector screen 292 can be a flat surface supported above the ground by one or more legs. The projector screen 292 can include one or more anchoring cables that keep the projector screen 292 upright.

Figure 4:
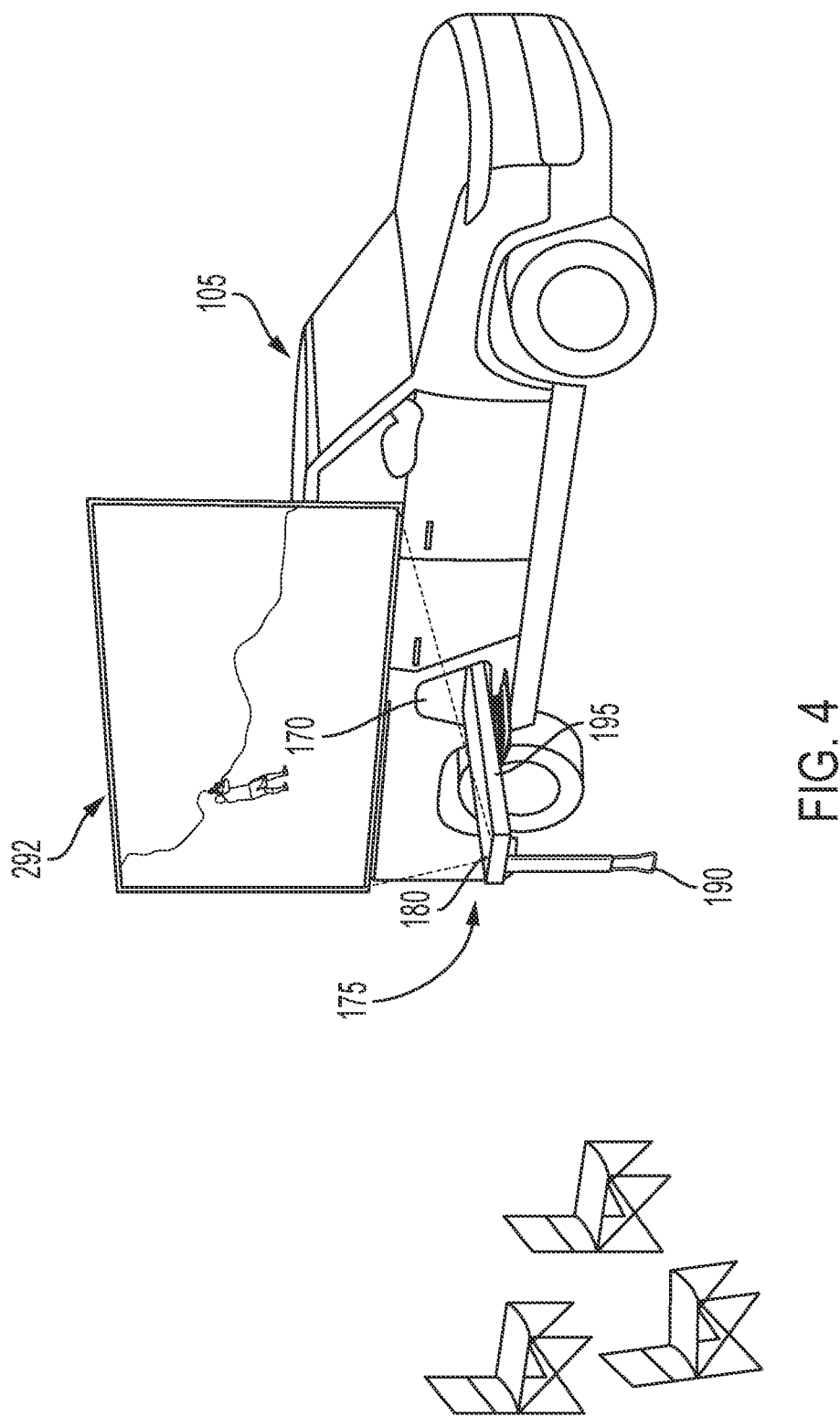
FIG. 4 depicts an example vehicle including a projector and a projector screen.

FIG. 4 depicts an example vehicle 105 including a projector 180 and a projector screen 292. The projector screen 292 can be fixed to the vehicle 105. The projector 180 can be oriented on the shuttle 195 to project light at the projector screen 292. For example, the projector 180 can be oriented to project light at a position extended away from the vehicle 105 back towards the vehicle 105. The projector screen 292 can be fixed to the vehicle via one or more poles, connectors, snaps, buckles, straps. The projector screen 292 can be fixed to a mounting portion that is fixed to a bed of the vehicle 105, a roof of the vehicle 105, a side of the vehicle 105.

Figure 5:
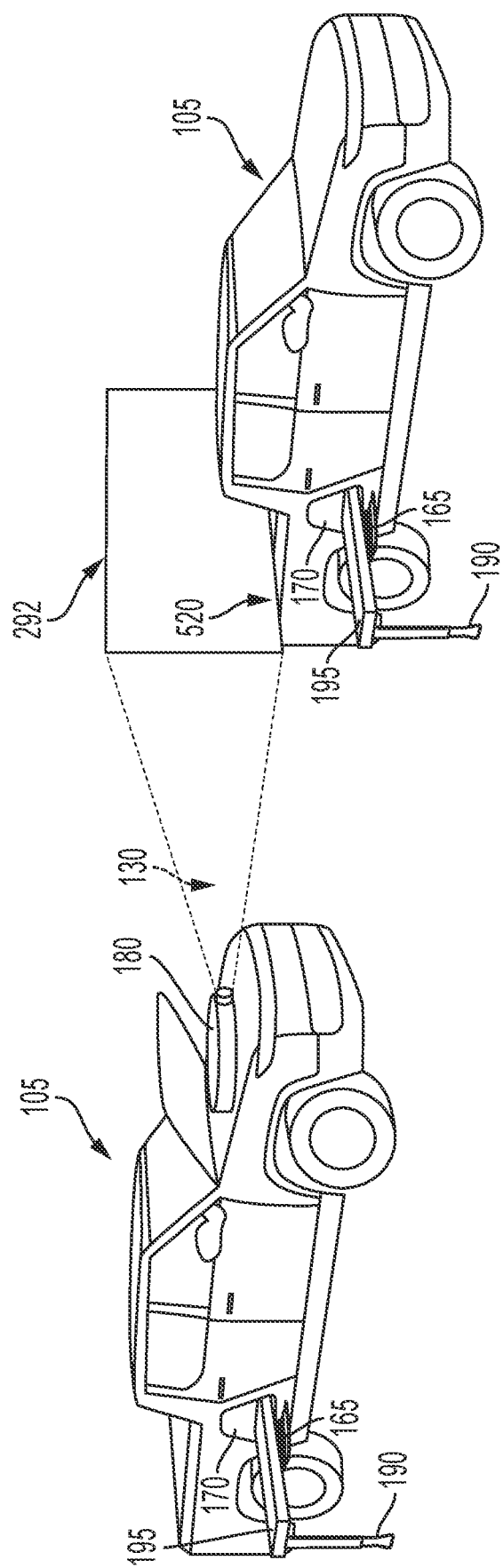
FIG. 5 depicts an example vehicle including a projector and a second example vehicle including a projector screen.

FIG. 5 depicts an example vehicle 105 including a projector 180 and a second example vehicle 105 including a projector screen 292. The projector 180 can be stored or mounted within a front trunk 130 of the vehicle 105. The vehicle 105 can include front portion 130, such as a hood, that rotates on hinges between a closed position closing the front trunk of the front portion 130 and an open position. The hood can be locked in the open position. The projector 180 can be stored within the front trunk. The projector 180 can be stored within the gear tunnel 170 of the vehicle 105 or the gear tunnel 170 of the vehicle 105.

The projector 180 can be mounted on top of a holding device, e.g., a tripod, a pole, a quad-pod, a box within the trunk. The projector screen 292 can be mounted on a bed 520 of the vehicle 105. The projector screen 292 can rest on lateral walls of the bed 520. The projector screen 292 can rest against a back of a cab of the vehicle 105. The projector screen 292 can be fixed to the back of the cab or the lateral walls of the bed 520 via a snap, connector, strap, pole, bolt, wing nut. The projector screen 292 can be collapsible, e.g., a set of connectable poles and a screen material. The projector screen 292, when collapsed, can be stored in the gear tunnel 170 of the vehicle 105, in the gear tunnel 170 of the vehicle 105, in the bed 520 of the vehicle 105, or in the front trunk of the vehicle 105.

Figure 6:
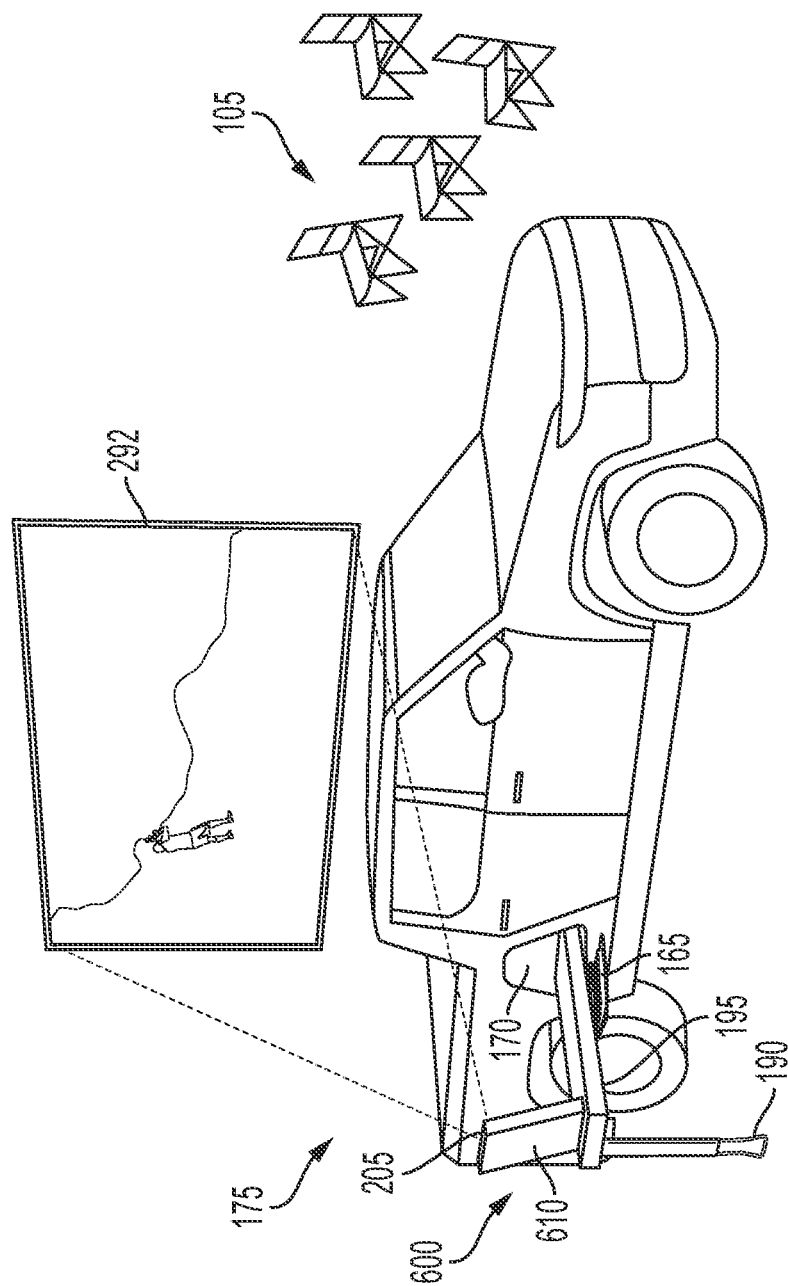
FIG. 6 depicts an example vehicle including a fold out projector assembly.

FIG. 6 depicts an example vehicle 105 including a fold out projector assembly 600. The fold out projector assembly 600 can include a projector 180 that projects light. The fold out projector assembly 600 can include an arm 610. The arm 610 can be fixed to an end of the shuttle 195 via a hinge. The arm 610 can lay flat against a surface of the shuttle 195. The arm 610 can rotate on the hinge front horizontal position to a vertical position. When in the vertical position, the arm 610 can position the projector 180 to project onto the projector screen 292. The arm 610 can be locked into a variety of positions such that the projector 180 projects at a variety of angles. The positions can be discrete locking positions, e.g., the arm 610 can lock at 60 degrees, 70 degrees, 80 degrees, 90 degrees, 100 degrees, 110 degrees. The arm 610 can be locked in any location, e.g., there may not be any discrete locking positions and the arm 610 can be locked into any angled position.

Figure 7:
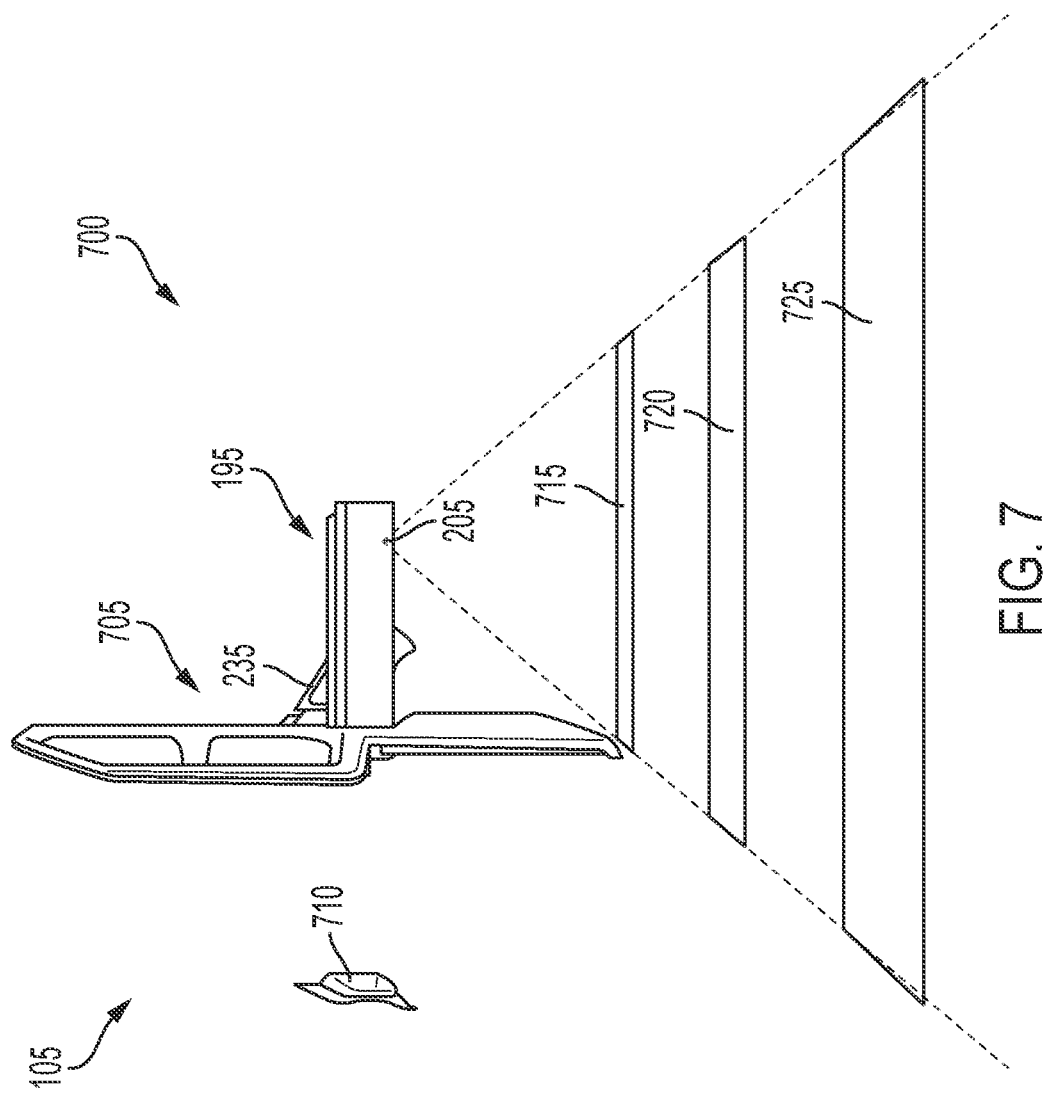
FIG. 7 depicts a top view of an example vehicle including a projector.

FIG. 7 depicts a top view 700 of a portion 705 of an example vehicle 105 including a projector 180. The portion 705 can be a frame of the vehicle 105. The portion 705 can be a side frame of the vehicle 105 that includes doors, windows, wheel wells. The portion 705 can include at least one end piece 710 of the gear tunnel 170. The end piece 710 can be located on either end of the gear tunnel 170 of the example vehicle 105. The shuttle 195, when in a retracted position, can be located between the two end pieces 710 on either end of the gear tunnel 170. The projector 180 can project onto projector screens of various sizes. An image 715-725 created by the projector 180 can be of various sizes. For example, the further the light travels from the projector 180, the larger the image may be. The projector 180 can include lenses that adjust the projector image between the various sizes of images 715-725. The sizes can be set sizes. The sizes can be a continuous range of sizes between a minimum size and a maximum size. The size of the image 715 can be 9-10 feet, greater than 10 feet, or less than 9 feet. The images 720 can be 13-15 feet, greater than 15 feet, or less than 13 feet. The image 725 can be 19-21 feet, greater than 21 feet, or less than 19 feet.

Figure 8:
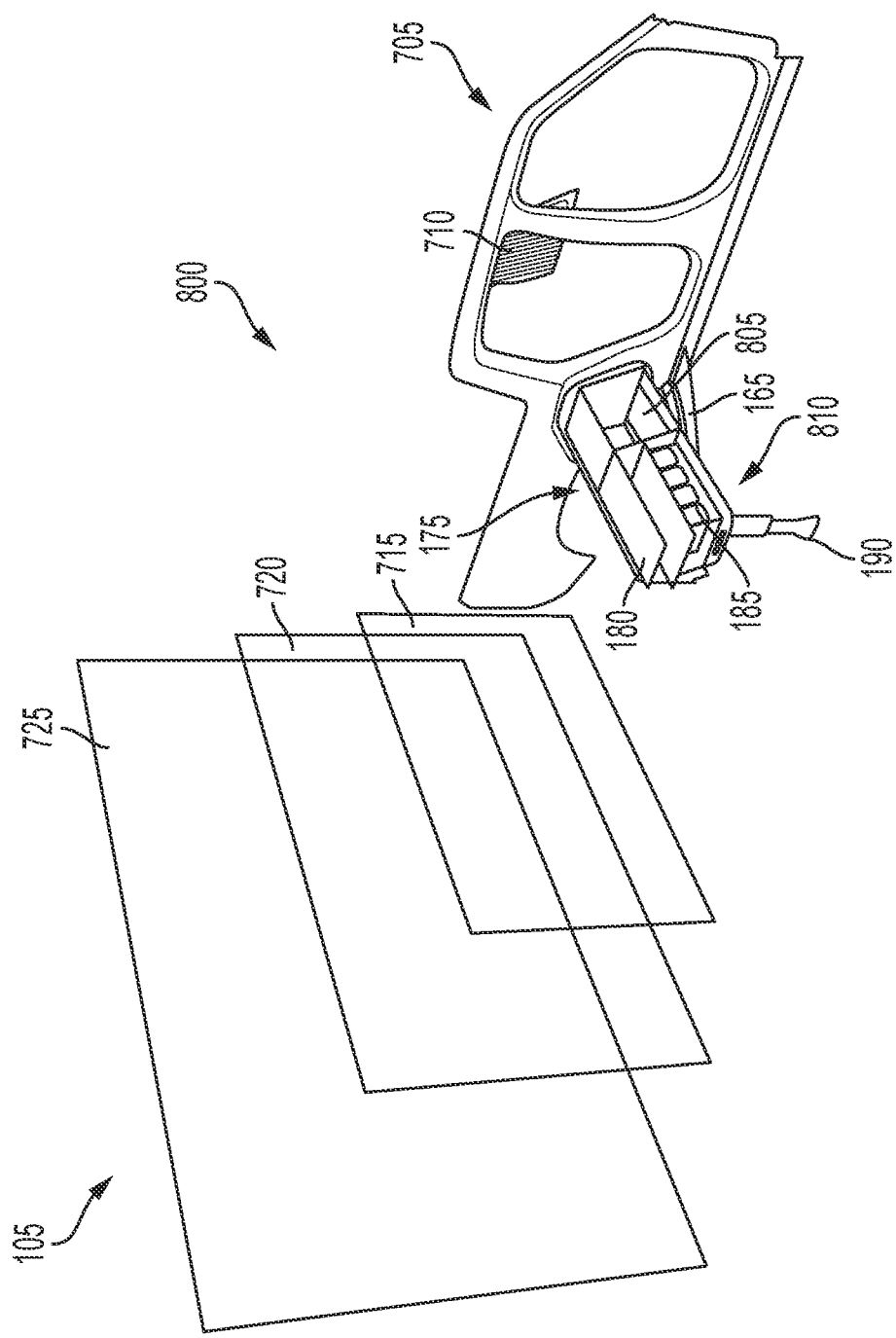
FIG. 8 depicts an angled side view of an example vehicle including a projector that projects to different sized projector screens.

FIG. 8 depicts an angled side view 800 of the portion 705 of the example vehicle 105 including the projector 180. The projector 180 can project light over a horizontal or vertical angle. The angle can be 70-90 degrees, 60-100 degrees, greater than 100 degrees, or less than 60 degrees. The entertainment apparatus 175 can be an apparatus that houses the projector 180 or the speakers 185. The entertainment apparatus 175 can include a compartment 810. The compartment 810 can store the speakers 185. The compartment 810 can include a bottom portion, a top portion, a first lateral wall, a second lateral wall, a third lateral wall, and a fourth lateral wall. At least one wall or portion of a wall can open exposing the speakers 185. The entertainment apparatus 175 can include a compartment 805. The compartment 805 can include a bottom portion, a top portion, a first lateral wall, a second lateral wall, a third lateral wall, and a fourth lateral wall. At least one wall or portion of a wall can open exposing components stored within the compartment 805. For example, a projector screen could be collapsed and stored within the compartment 805.

Figure 9:
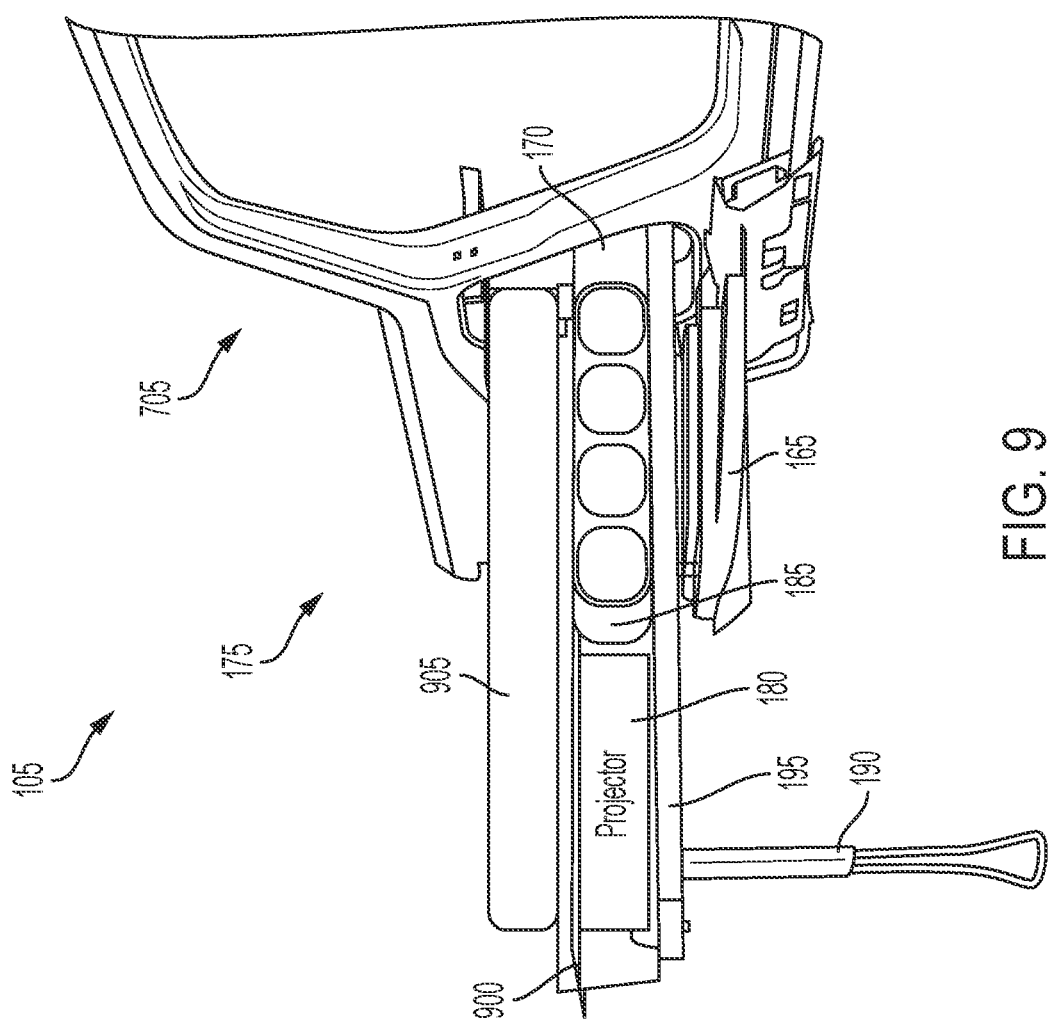
FIG. 9 depicts an example vehicle including an entertainment apparatus resting on a shuttle extracted from a gear tunnel.

FIG. 9 depicts an example vehicle 105 including the entertainment apparatus 175 resting on the shuttle 195 extracted from the gear tunnel 170. The entertainment apparatus 175 can include at least one compartment. The compartments can include bottoms, first lateral walls, second lateral walls, third lateral walls, fourth lateral walls, doors, windows, openings. The projector 180 or the speakers 185 can be disposed within at least one compartment of the entertainment apparatus 175. The compartment, or another portion of the entertainment apparatus 175, can include a horizontal portion 900. The portion 900 can be horizontal and run across a length of at least a portion of the shuttle 195. The portion 900 can form a shelf for components to be stored. For example, a rolled up or collapsed projector screen can be located on the portion 900. The projector screen 905 can be stowed within the gear tunnel 170 on top of the portion 900.

Figure 10:
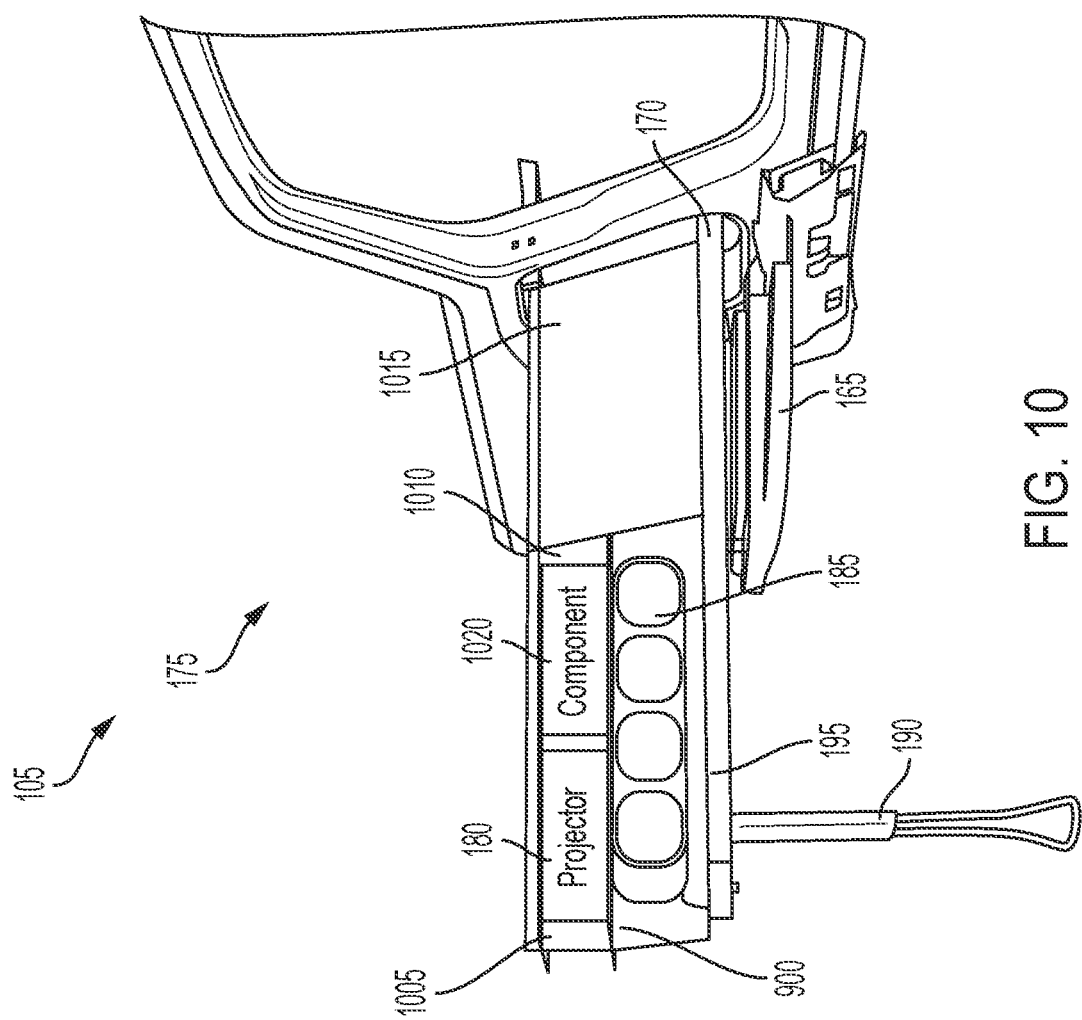
FIG. 10 depicts another example vehicle including an entertainment apparatus resting on a shuttle extracted from a gear tunnel.

FIG. 10 depicts another example vehicle 105 including an entertainment apparatus 175 resting on a shuttle 195 extracted from a gear tunnel 170. The entertainment apparatus 175 includes a top portion 1005. The top portion 1005 can be parallel with the portion 900. The top portion 1005 and the portion 900 can be oblique or slightly oblique (e.g., 0.5-10 degrees oblique). The entertainment apparatus 175 can include a lateral wall 1010. The entertainment apparatus 175 can include a lateral wall 1015. The lateral wall 1010, the portion 900, and the portion 1005 can form a compartment. The compartment can store a projector 180. The compartment can store other components 1020. The other components 1020 can include food, groceries, blankets, clothing, tools, comping supplies, cooking supplies, camping supplies.

The lateral wall 1010, the lateral wall 1015, and a top surface of the shuttle 195 (or another horizontal portion) can form another compartment. The compartment can store a projector screen. The projector screen may be stuffed or folded up in the compartment. The lateral wall 1010, the portion 900, a top surface of the shuttle 195 (or another horizontal portion) can form another compartment. The speakers 185 can be stored within the compartment. The compartment can include at least one charging contact for charging the speakers 185. The compartment can include a docking station or other device that the speakers 185 connect to.

Figure 11:
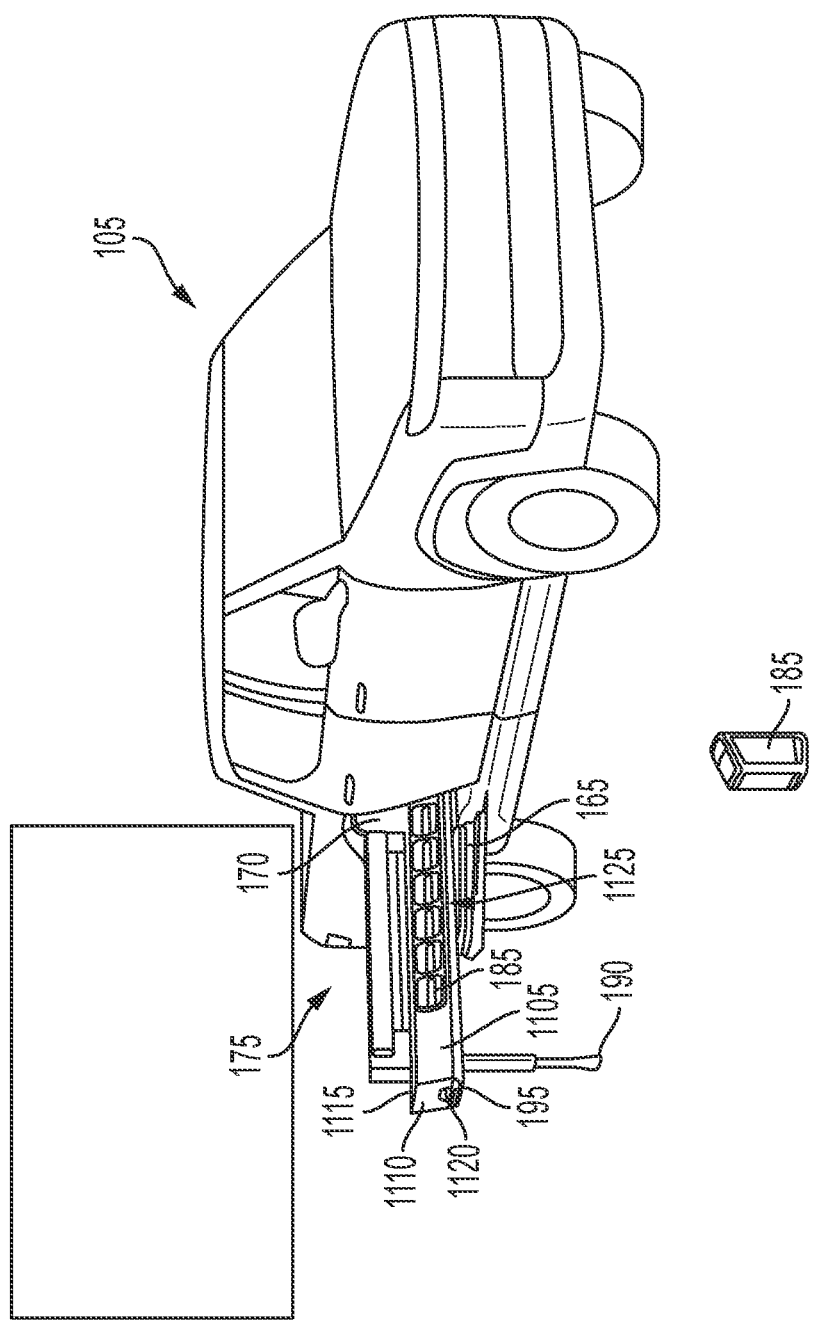
FIG. 11 depicts an example vehicle including an entertainment apparatus and a wireless speaker.

FIG. 11 depicts an example vehicle 105 including the entertainment apparatus 175 and a wireless speaker 185. The entertainment apparatus 175 can include a bottom portion, a first lateral side 1105, a second lateral side 1110, a third lateral side, and a top side 1115. The first lateral side 1105 can be perpendicular with a bottom side of the entertainment apparatus 175 or a top surface of the shuttle 195. The second lateral side 1110 can oblique to the bottom side of the entertainment apparatus 175, the top surface of the shuttle 195, or the top side 1115. The second lateral side 1110 can include an opening 1120.

Figure 12:
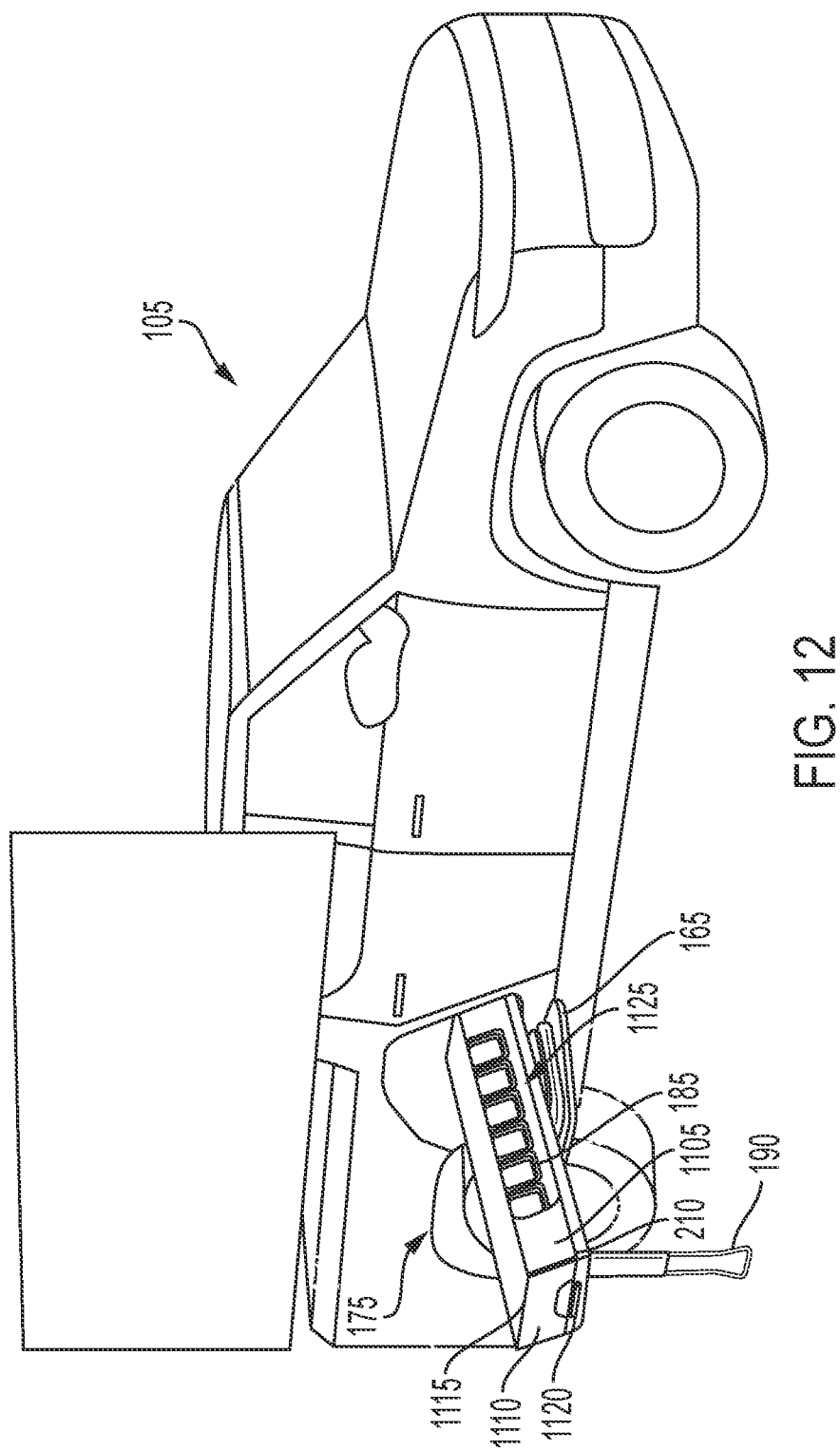
FIG. 12 depicts an example vehicle including a projector and a projector screen.

The opening 1120 can be or include a handle that a user can use to lift the entertainment apparatus 175 and push the entertainment apparatus 175 into the gear tunnel 170 or pull the entertainment apparatus 175 out of the gear tunnel 170. The first lateral side 1105 can include an opening to a cavity 1125. The cavity 1125 can include a bottom, a top, and lateral walls. The speakers 185 can be stored, charged, or docked with a docking element of the cavity 1125. A user can remove a speaker 185 from the cavity 1125 and place the speaker 185 outside the cavity 1125. The speaker 185 can be a wireless speaker that communicates with the vehicle 105, e.g., the network manager 197, or communicate with the projector 180. Various components, e.g., a projector screen, boxes, supplies, tools, equipment, food, camping equipment can be stored on the top side 1115 of the entertainment apparatus 175. In FIG. 11, the projector screen is shown separate from the vehicle 105. In FIG. 12, the projector screen is shown attached to the vehicle 105.

Figure 13:
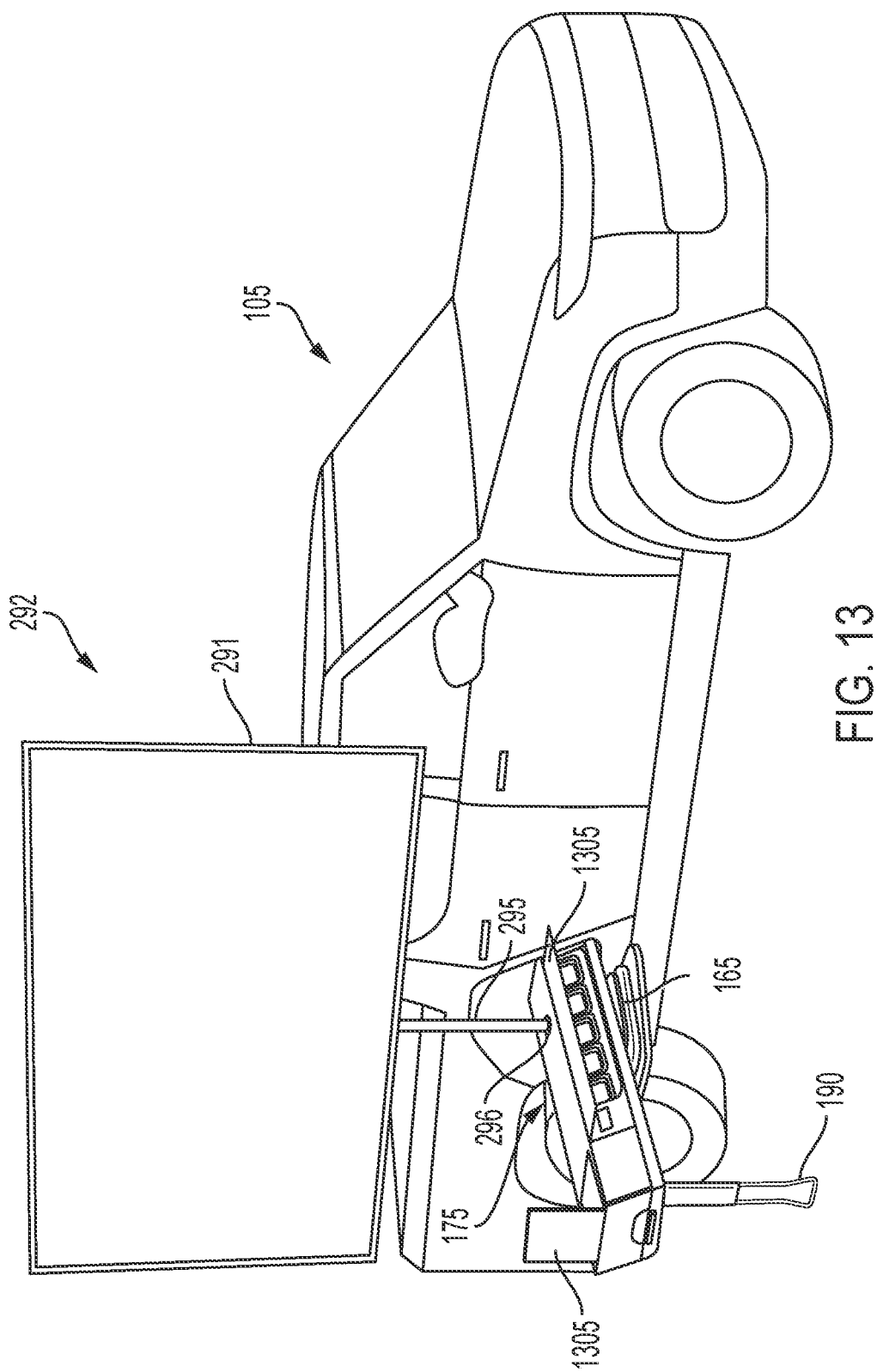
FIG. 13 depicts an example vehicle including an entertainment apparatus with hinging flaps and a projector screen.

FIG. 13 depicts an example vehicle 105 including the entertainment apparatus 175 including hinging flaps 1305 and a projector screen 292. The entertainment apparatus 175 includes hinging flaps 1305 that open to expose a compartment. For example, one hinging flap 1305 may hinging on a first side to expose the projector 180. The hinging flap 1305 can hinge via a hinge member to open vertically. Another hinging flap 1305 can expose a compartment that stores the speakers 185. The hinging flaps 1305 can lock closed via locking members. The hinging flaps 1305 can lock open via the locking members. For example, a hinging flap 1305 can be opened and locked open so that the projector 180 can project from the entertainment apparatus 175 without being removed from the entertainment apparatus 175. The hinging flap 1305 can include a mirror that reflects light of the projector onto the projector screen 292.

The entertainment apparatus 175 can include at least one opening 296 in a top surface of the entertainment apparatus 175. A pole 295 of the projector screen 292 can be inserted into the opening 296. The pole 295 can extend an inch, a foot, two feet, into through the opening 296 into the entertainment apparatus 175. A pipe can be included below the opening 296. The pole 1235 can be inserted into the pipe. The pipe can hold the pole 295 in an upright position. A frame 291 can be supported by the pole 295. The frame 291 can include at least one side, e.g., a top side, a bottom side, lateral sides. A projector screen material can be stretched by the frame 291. The projector screen material can be snapped, locked, latched, or connected to the frame 291. The screen material can be connected to the frame 291 via a reusable snap, via a belt latch, via a rivet, via an adhesive, via a bolt, nut, screw, or nail for example.

Figure 14:
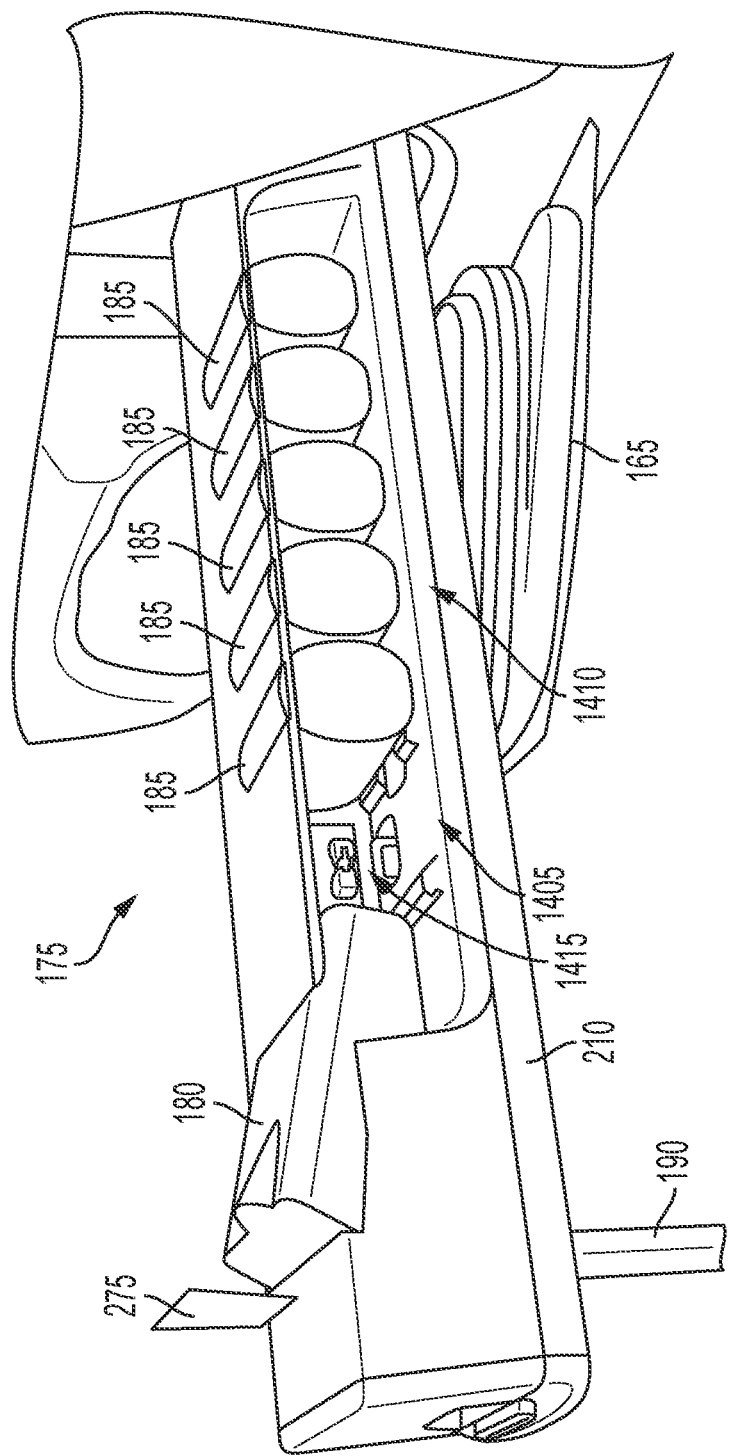
FIG. 14 depicts an example entertainment apparatus including a projector and speakers.

FIG. 14 depicts an example entertainment apparatus 175 including a projector 180 and speakers 185. The entertainment apparatus 175 includes a cavity 1405. The cavity 1405 can include a bottom surface, a top surface, a first lateral wall, a second lateral wall, a fourth lateral wall. The cavity 1405 can be open on one side. The opening of the cavity can be covered by a door. The speakers 185 can be disposed within the cavity 1405. The cavity 1405 can include a docking connection 1410. The speakers 185 can clip or snap into the docking connection 1410. The docking connection 1410 can make one or more electrical connections with the speakers 185 via pins, plugs, wires, connectors. The electrical connections can provide power from the battery pack 110 to the speakers 185. The speakers 185 can charge batteries of the speakers 185 via the power. A spring latch can hold the speakers into the docking connection 1410. A user can remove the speakers from the docking connection 1410. For example, a user could pull the speaker 185. The user could press the speaker 185 in, activating the spring latch which causes the spring latch to push the speaker 185 out of the cavity 1405.

The projector 180 can be included within the cavity 1415. The projector 180 can slide between a contained location under a top surface of the entertainment apparatus 175 and an exposed location where at least a portion of the projector 180 (e.g., the lens or lamp output portion) can be exposed. The projector 180 can connect to a docking connection of the cavity 1415. The docking connection of the cavity 1415 can lock or latch the projector 180. The docking connection of the cavity 1415 can include one or more electrical pins, plugs, connections, wires. The projector 180 can be powered or charge batteries of the projector 180 via the power provided by the docketing connection.

Figure 15:
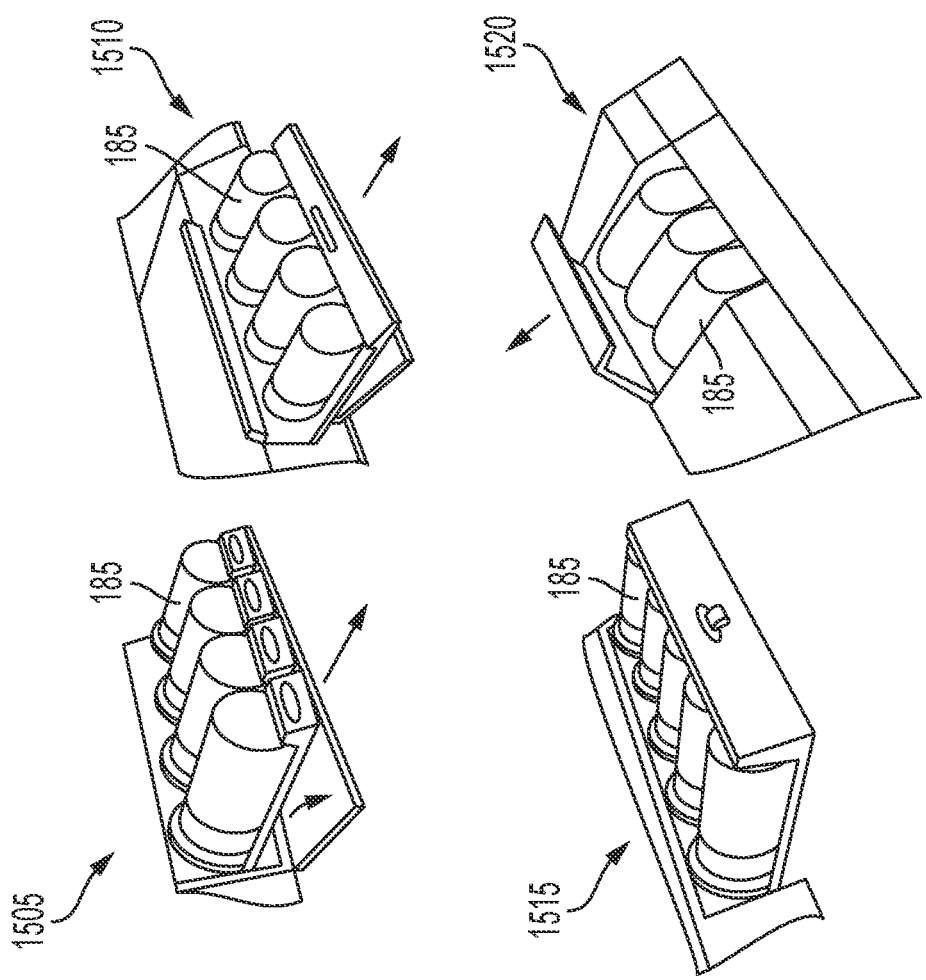
FIG. 15 depicts example storage compartments for speakers.

FIG. 15 depicts example storage compartments 1505-1520 for speakers 185. The compartments 1505-1520 can be compartments of the entertainment apparatus 175. The compartment 1505 can include a flap that flips down and an individual trays that extends out and hold each apparatus. The compartment 1510 can include a single tray that holds all of the speakers 185 and extends out. The compartment 1515 includes a drawer that holds the speakers and pulls out of the entertainment apparatus 175. The compartment 1520 includes a lid that lifts up exposing the speakers 185.

Figure 16:
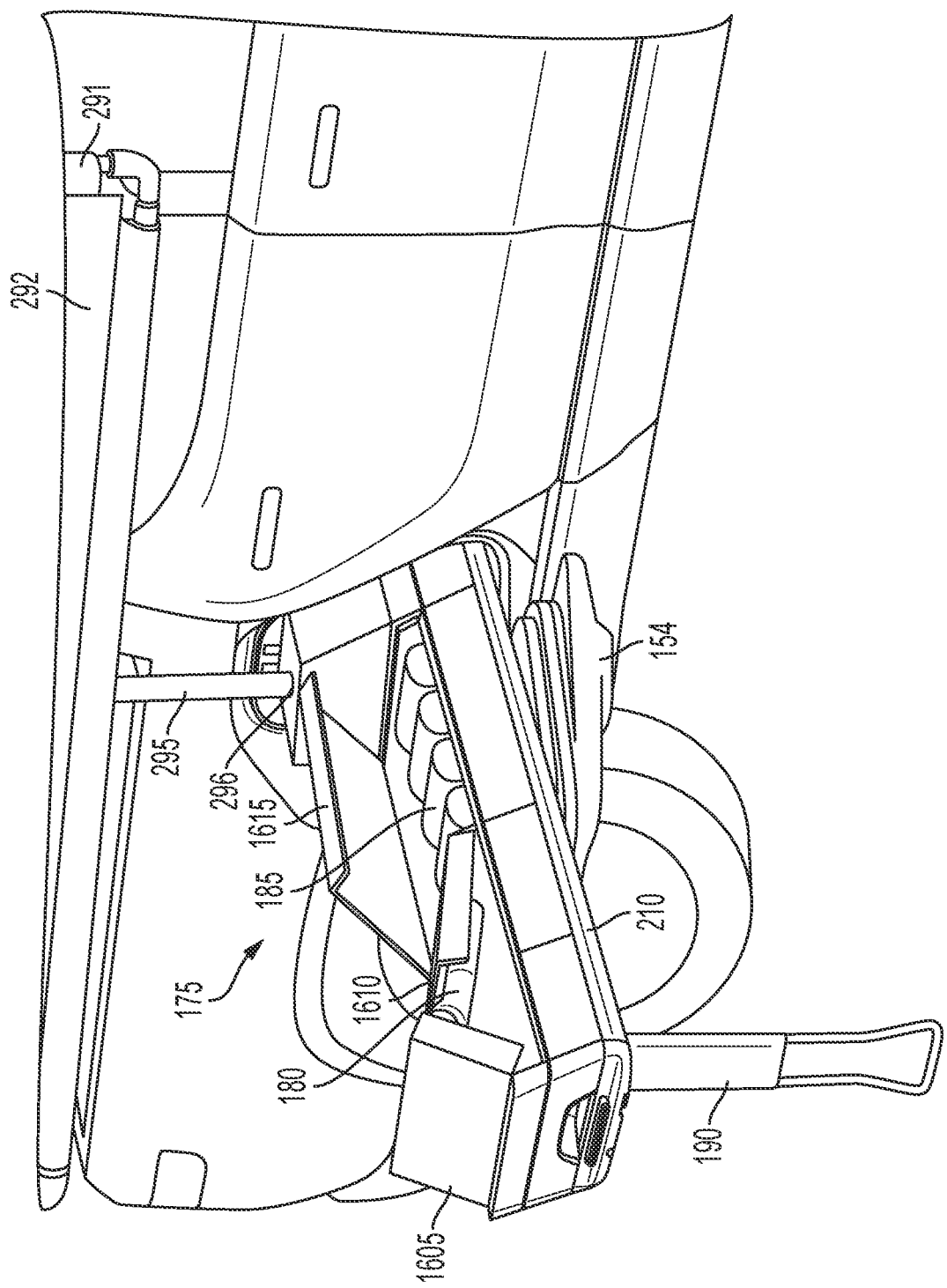
FIG. 16 depicts an example vehicle including an entertainment apparatus including a fold out projector and a speaker compartment with a lid that opens upwards.
Figure 17:
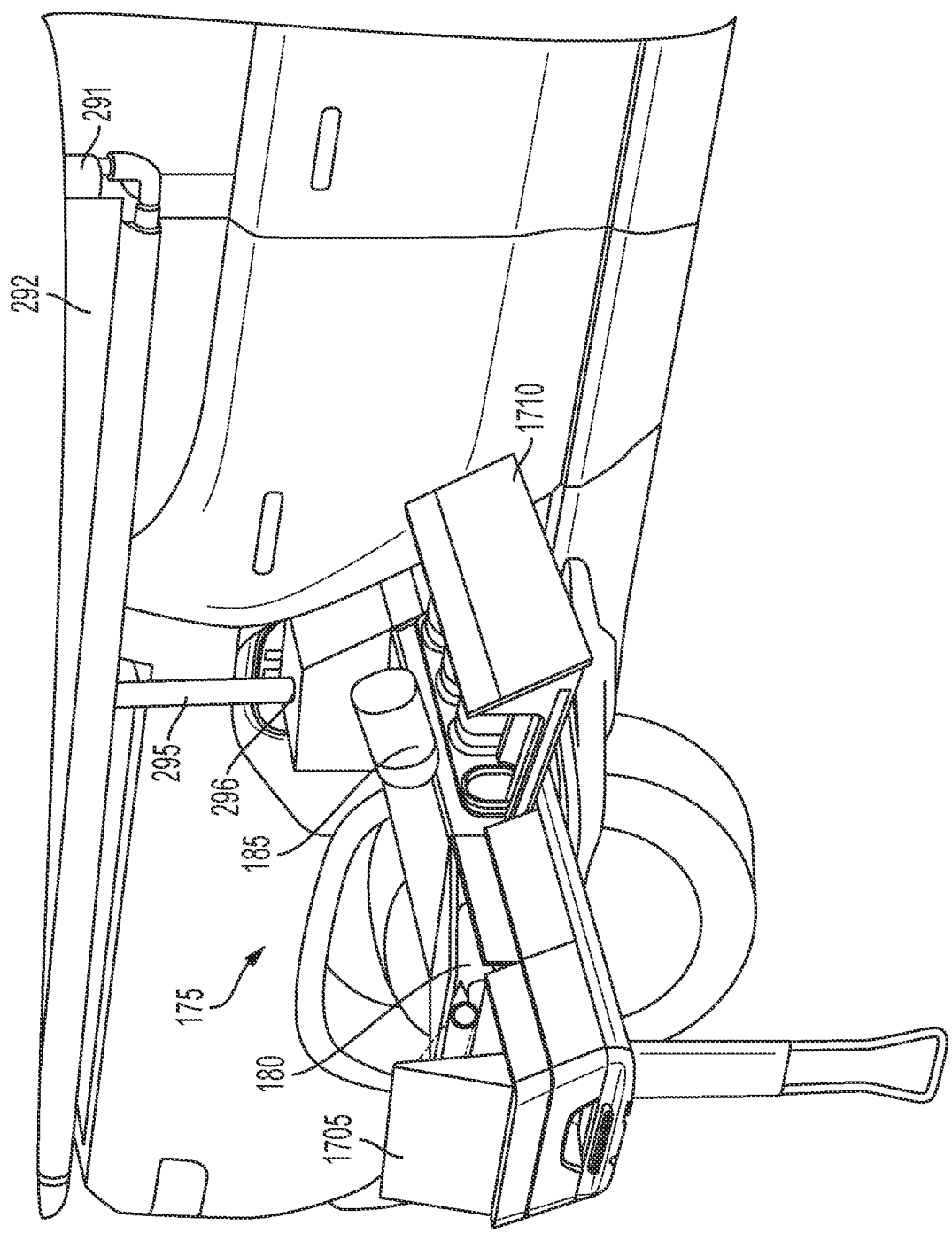
FIG. 17 depicts an example vehicle including an entertainment apparatus including a fold out projector and a speaker compartment that slides out.
Figure 18:
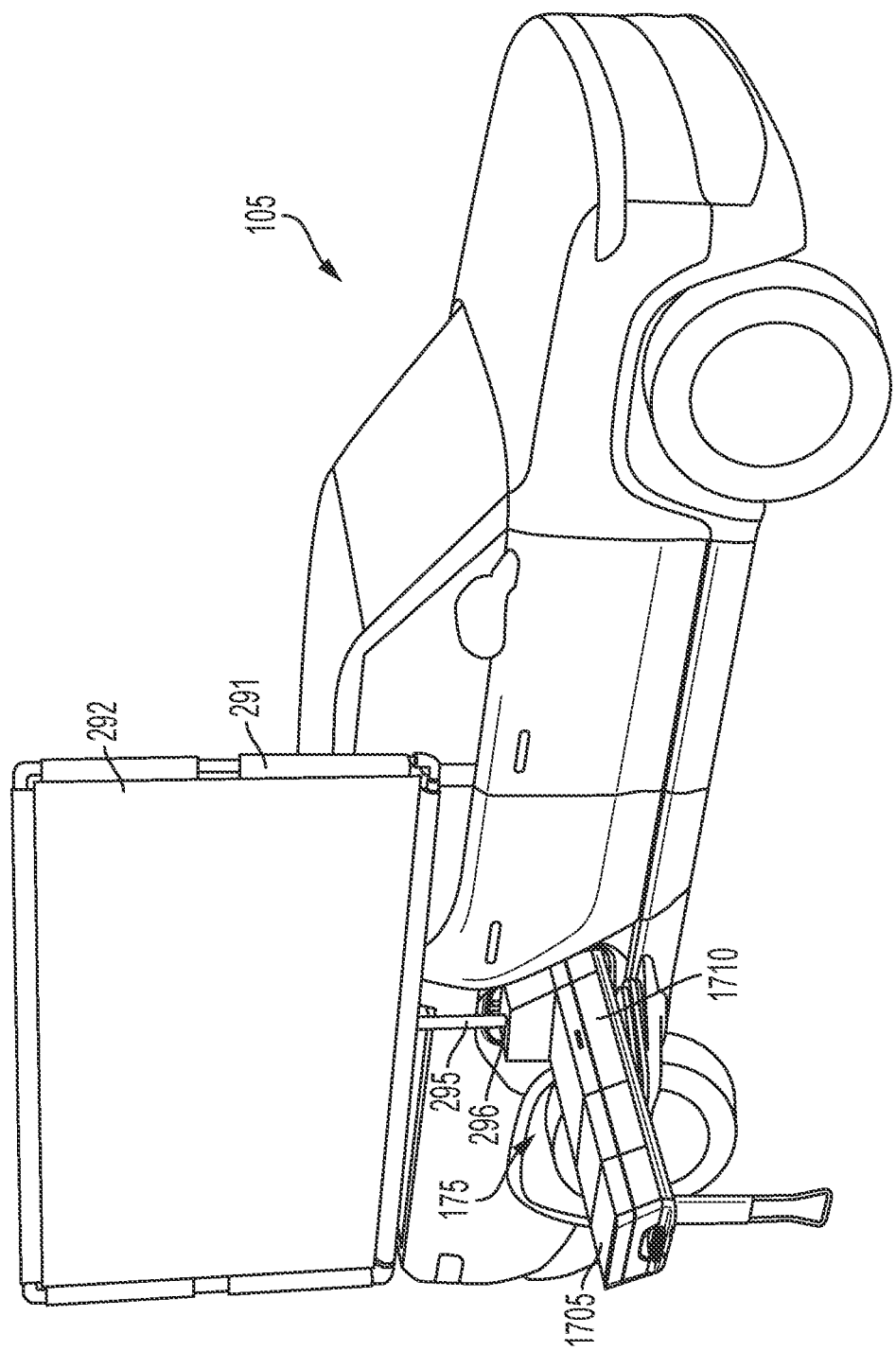
FIG. 18 depicts an example vehicle including an entertainment apparatus with closed compartments.

FIGS. 16-18 depicts an example vehicle 105 including an entertainment apparatus 175 including a fold out projector 180 and a side folding speaker compartment. The compartment can include a lid 1615 that opens upwards to expose the speakers 185. The entertainment apparatus 175 includes lids 1605 and 1610 that can flip up allowing the projector 180 to be raised out of the entertainment apparatus 175.

In FIG. 17, the projector 180 projects towards an extended flap 1705. The extended flap 1705 can include a mirror or reflecting device that reflects light of the projector onto a screen. The mirror can extend an optical path of the projector 180. The length of the optical path can define the size of the image projected onto the projector screen. The longer the optical path, the greater the size of the projected image. A drawer 1710 can store the speakers 185 and include docking connections for charging the speakers 185. FIG. 18 illustrates an example of the entertainment apparatus where the flap 1705 is closed covering the projector 180 and the drawer 1710 is in a closed position within the entertainment apparatus 175.

Figure 19:
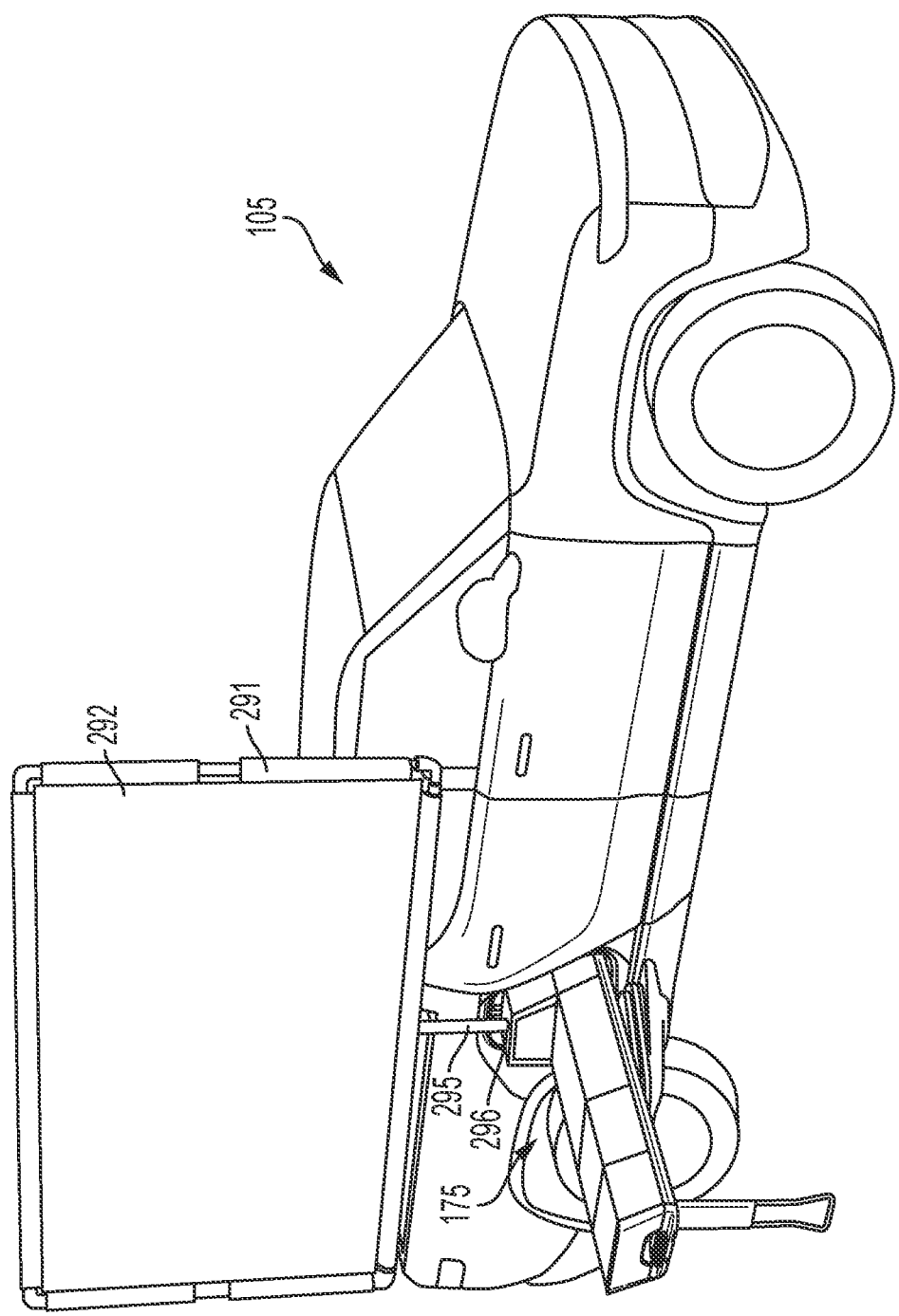
FIG. 19 depicts an example vehicle including an entertainment apparatus with an enclosure including lateral portions.
Figure 20:
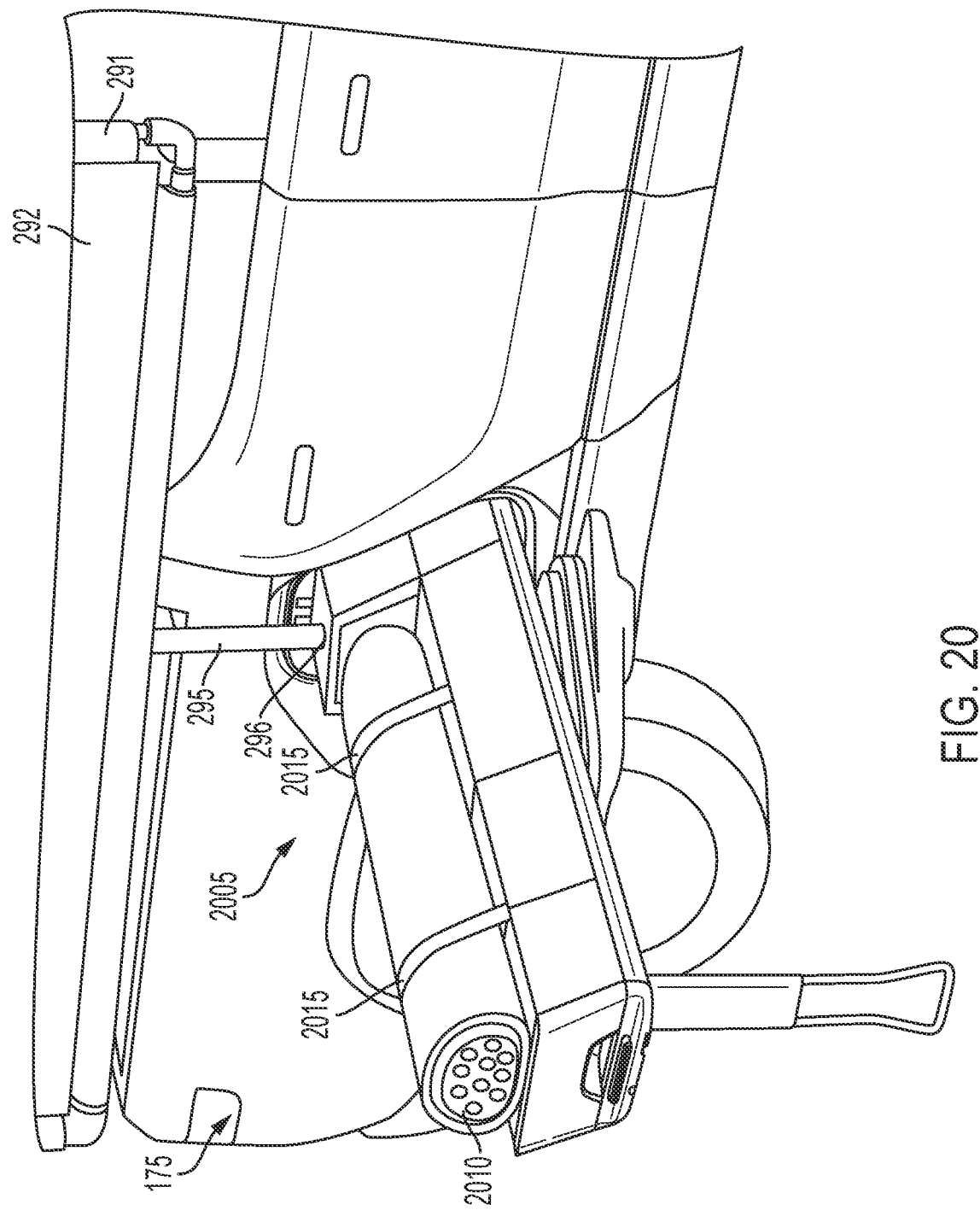
FIG. 20 depicts an example vehicle including a storage location for a projector screen.

FIG. 19 depicts an example vehicle 105 including an entertainment apparatus 175 with an enclosure or housing including lateral portions. The lateral portions can be wood, plastic, metal, or another material. FIG. 20 depicts an example vehicle 105 including a storage location 2005 for a projector screen 2010. The projector screen 2010 can be rolled up. For example, a frame for a projector screen can be collapsed into individual poles. The projector screen 2010 can be rolled up around the individual poles. The storage location 2005 can include at least one strap 2015. The strap 2015 can fix the projector screen 2010 to a top surface of the entertainment apparatus 175 in the storage location 2005.

Figure 21:
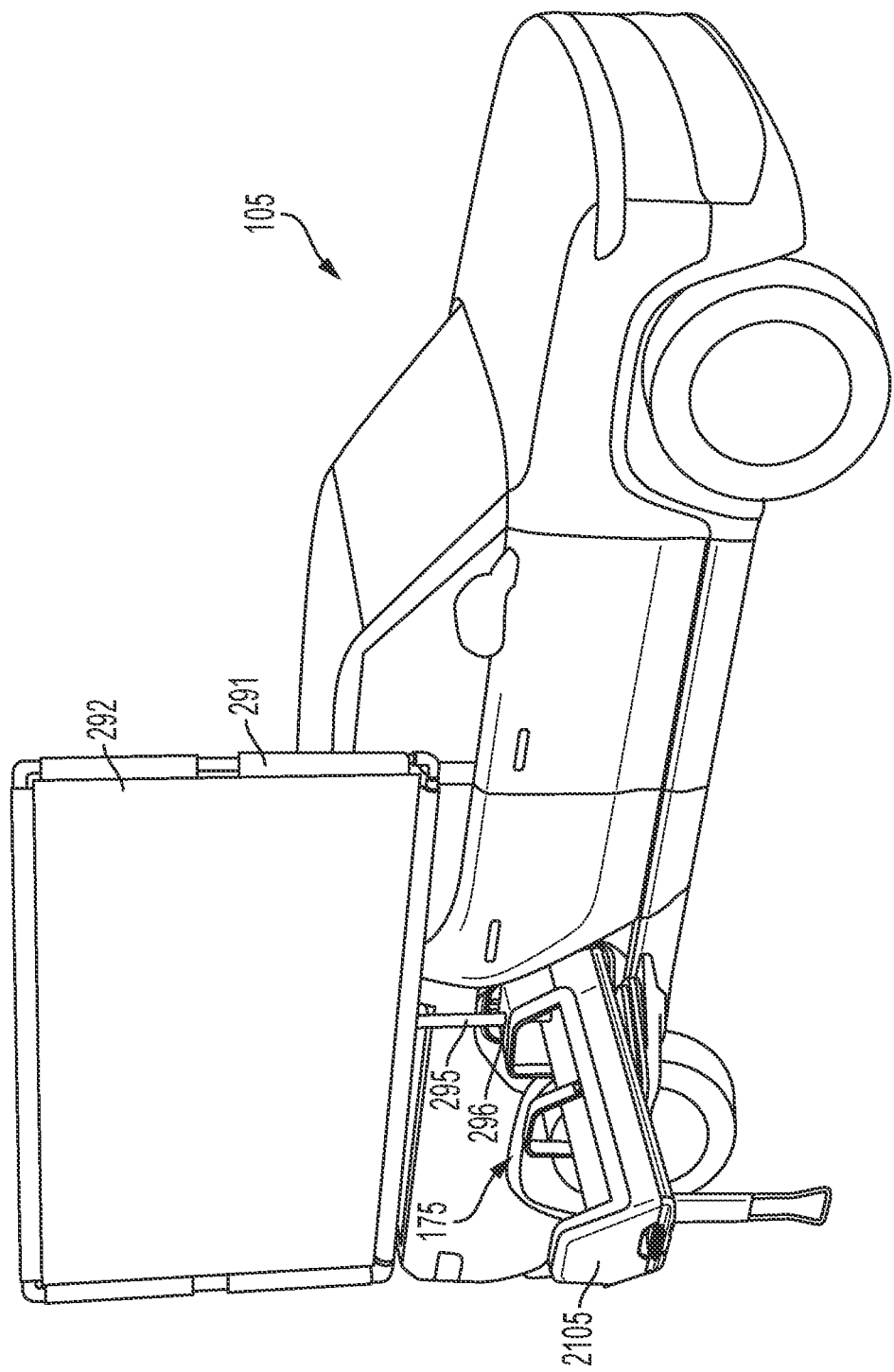
FIG. 21 depicts an example vehicle including a transparent storage compartment for a projector screen.

FIG. 21 depicts an example vehicle 105 including a transparent storage compartment 2105 for a projector screen. For example, the projector screen 2010 can be contained within the transparent storage compartment 2105. The compartment 2105 can be a compartment that includes one or more flaps, a removable end, or other portions that open allowing a user to place components within the compartment 2105 or remove components from the compartment 2105. The compartment 2105 can be a compartment formed with a bottom surface, one or more lateral sides, and a top side. At least a portion of the compartment 2105 can be a transparent material such as plastic or glass.

Figure 22:
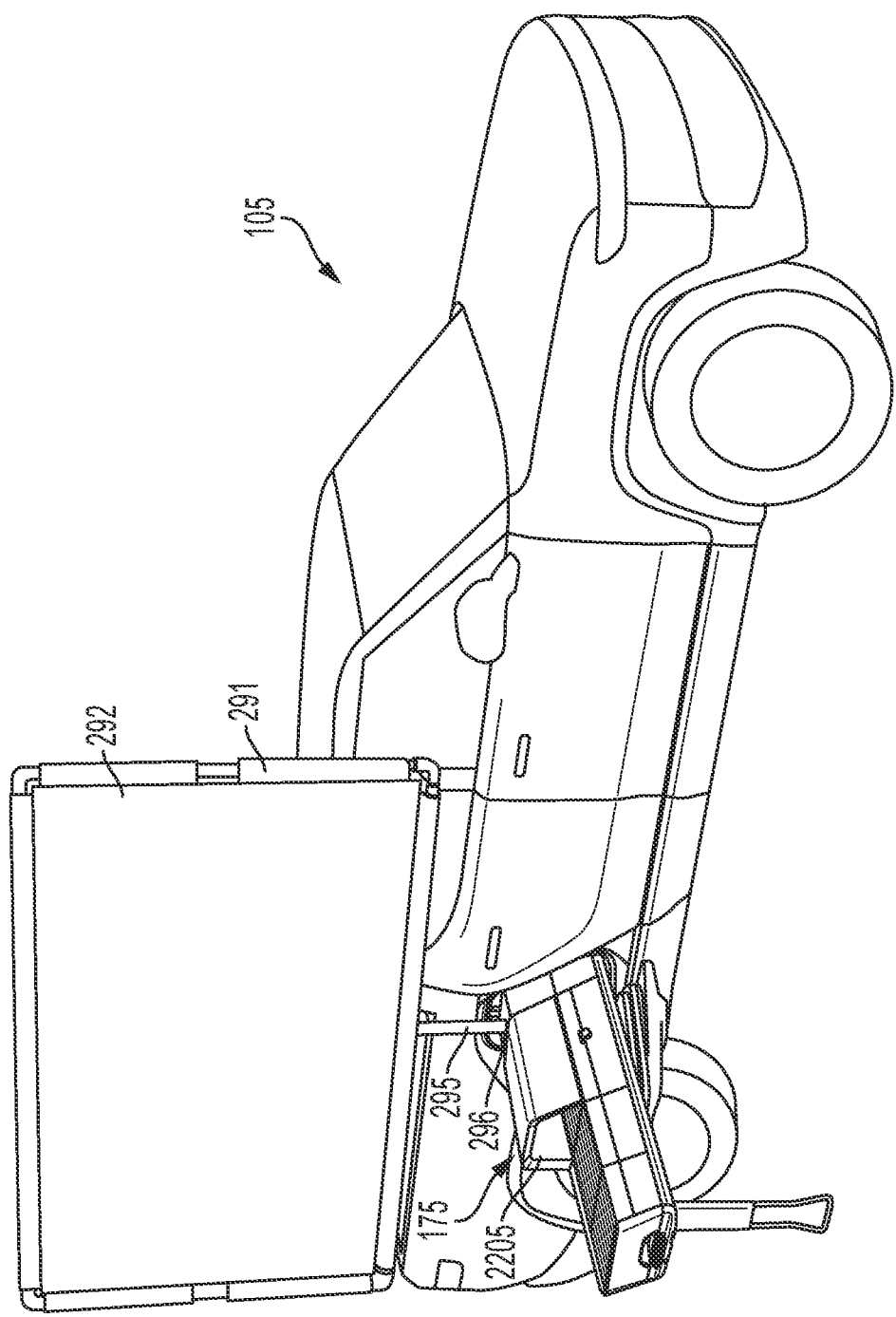
FIG. 22 depict an example vehicle including a storage location for a projector screen.
Figure 23:
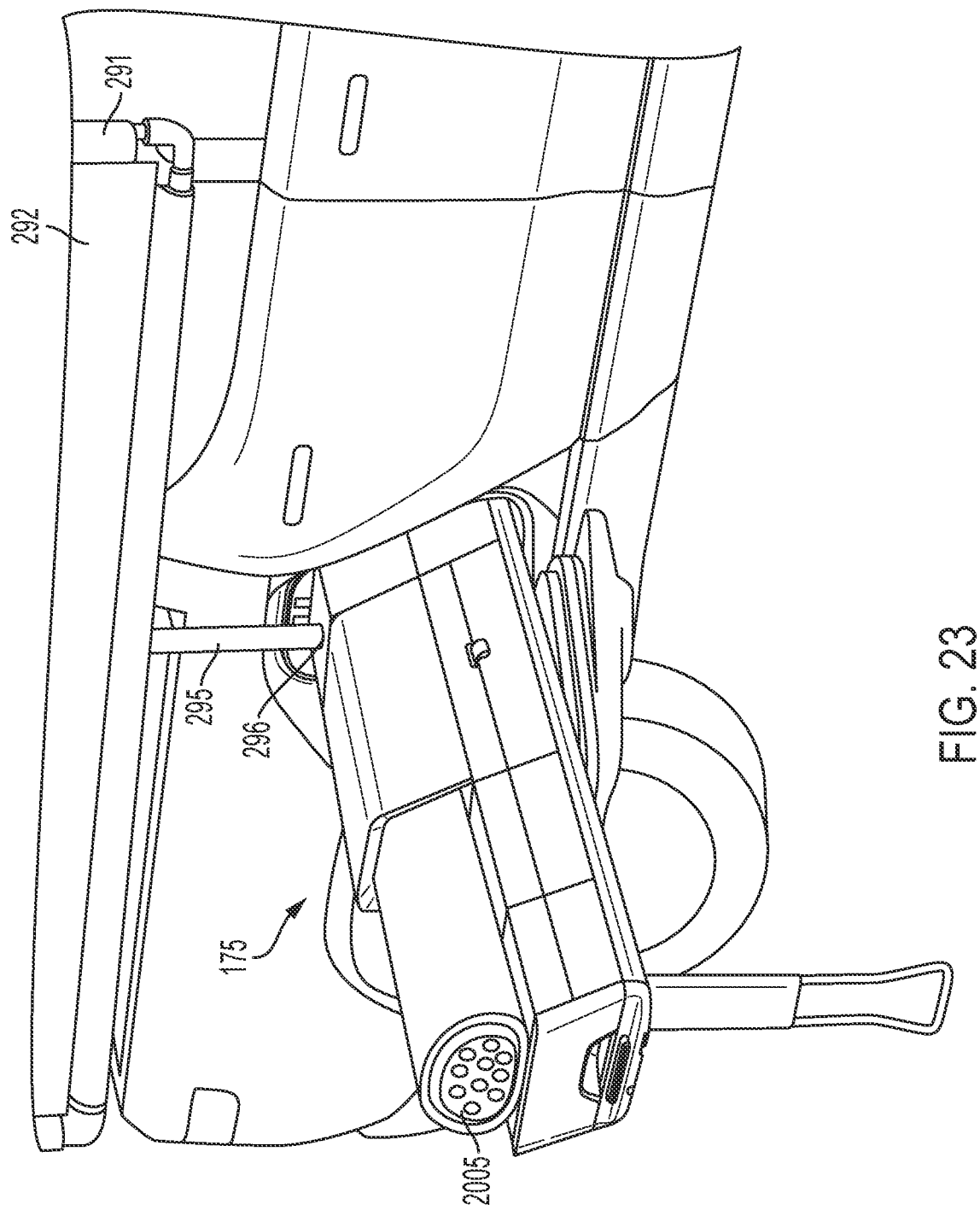
FIG. 23 depicts an example vehicle including a storage location with a projector screen stowed in the storage location.
Figure 24:
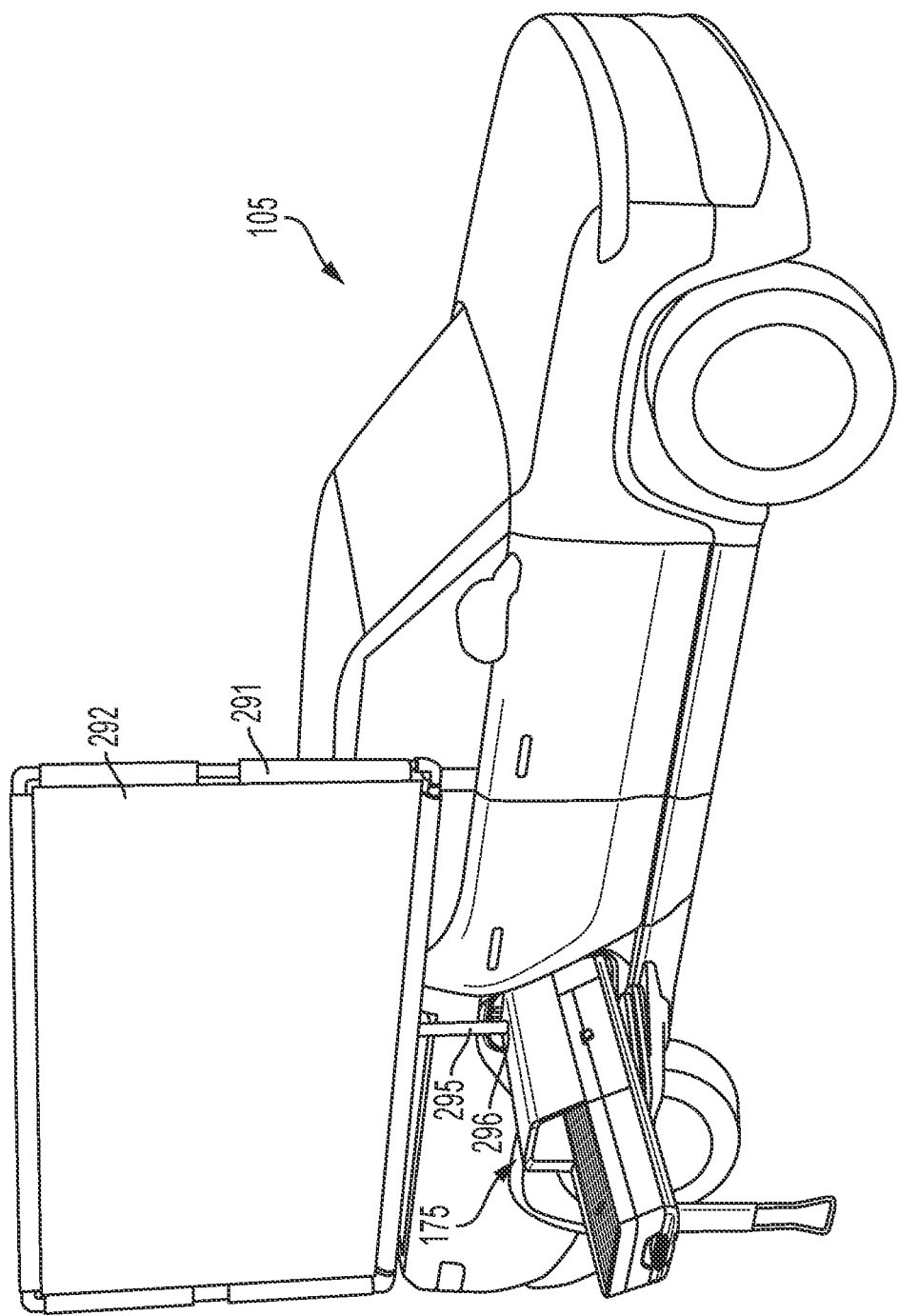
FIG. 24 depicts an example vehicle including an entertainment apparatus including an outer surface including a single material.
Figure 25:
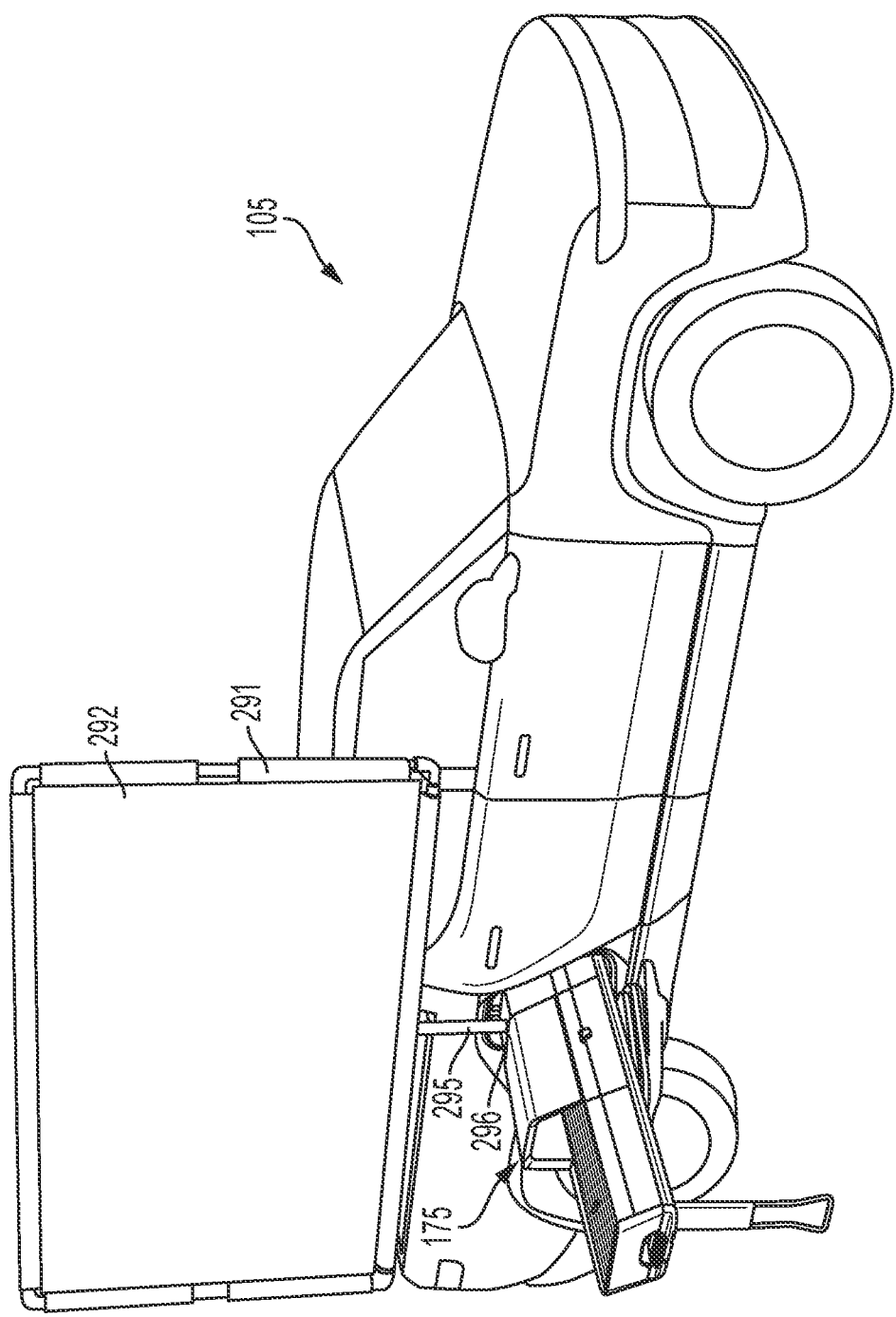
FIG. 25 depicts an example vehicle including an entertainment apparatus including an outer surface including a first material and a second material that forms a stripe through the first material.
Figure 26:
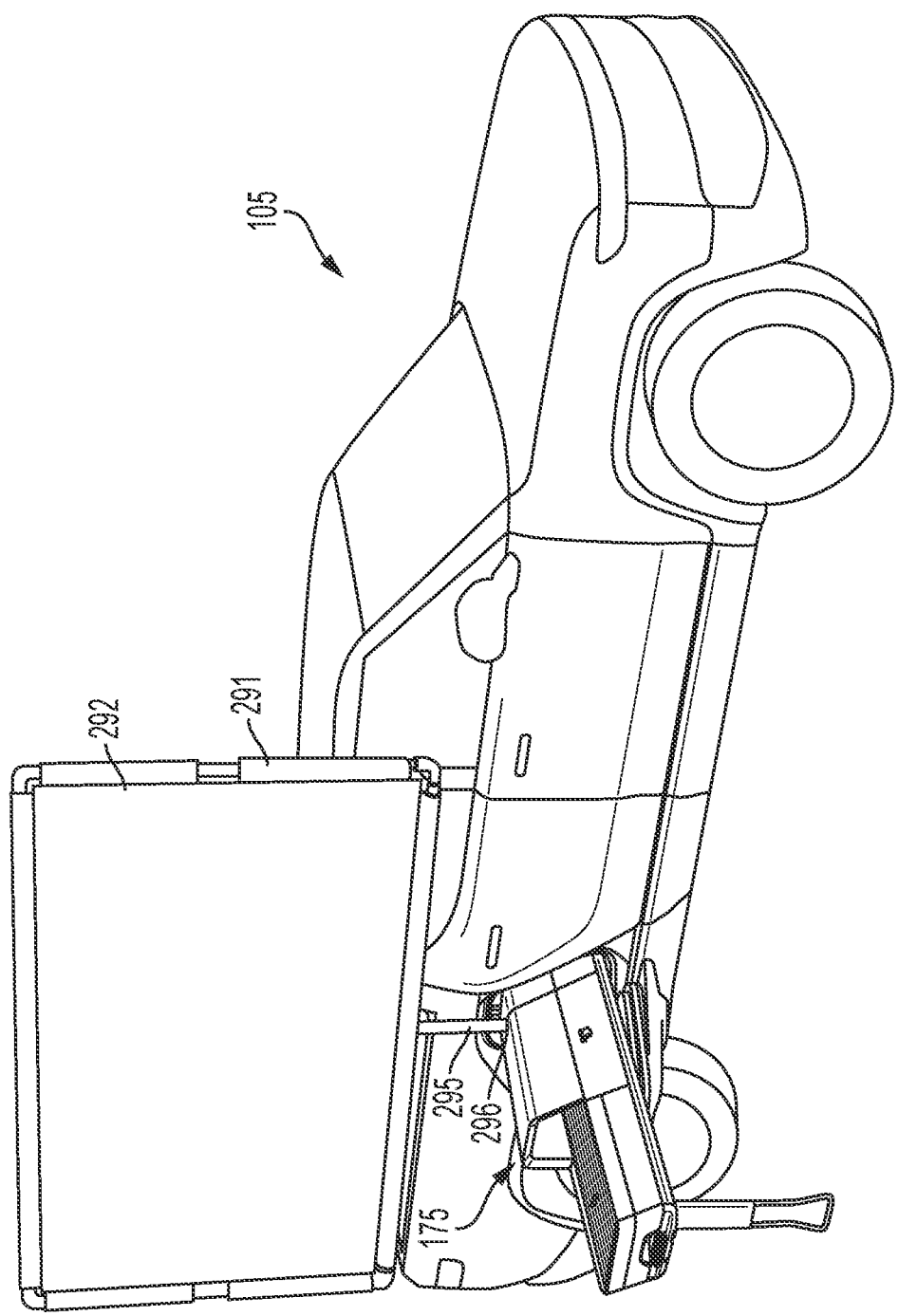
FIG. 26 depicts an example vehicle including an entertainment apparatus including an outer surface including a first material on a top half and a second material on a bottom half.
Figure 27:
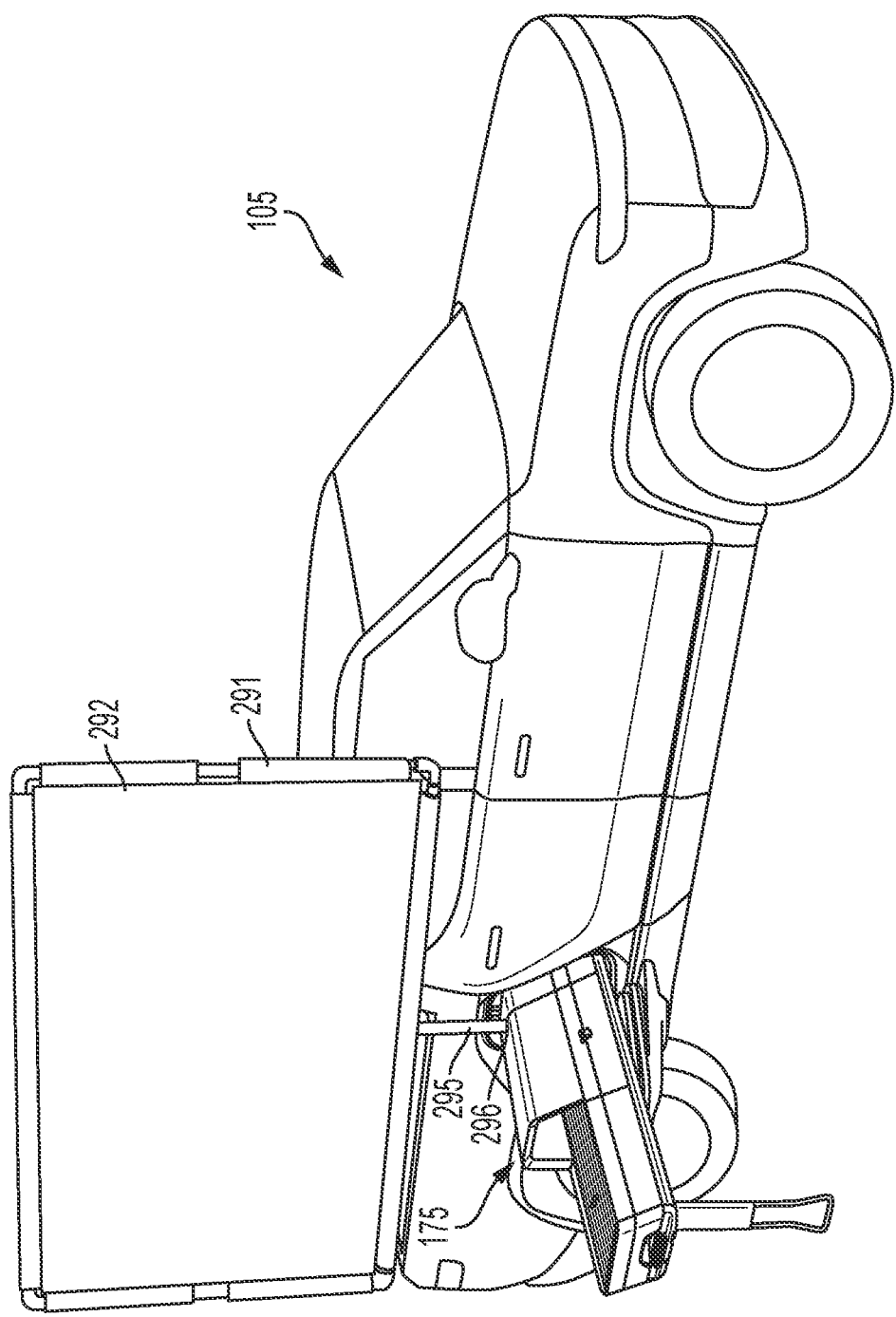
FIG. 27 depicts an example vehicle including an entertainment apparatus including an outer surface including a first material on a top portion, the first material on a middle portion, and a second material on a bottom portion.

FIGS. 22-23 depict an example vehicle 105 including a storage location 2205 for a projector screen 292. The storage location 2205 can be a compartment, cavity, or tunnel. The compartment can include an open side, a bottom, a first lateral side, a second lateral side, and a top. The projector screen 292 can be inserted into the storage location 2205 through the open side. The other sides can hold the projector screen 292 within the storage location 2205. FIGS. 24-27 depict examples vehicles 105 including an enclosure or housing for an entertainment apparatus in a variety of colors and configurations. The enclosures or housings can be black, red, white, tan, grey, or other color. The enclosures or housings can be or include plastic, metal, wood. Various portions of the enclosures or housings can be a first color or a first material while another portion of the enclosure or housing can be a second color or a second material. In FIG. 24, the entertainment apparatus 175 can include an outer surface including a single material. The single material can be a solid color. In FIG. 25, the entertainment apparatus 175 can include an outer surface including a first material and a second material that forms a stripe through the first material. In FIG. 26, the entertainment apparatus 175 can an outer surface including a first material on a top half and a second material on a bottom half. In FIG. 27, the entertainment apparatus 175 can include an outer surface including a first material on a top portion, the first material on a middle portion, and a second material on a bottom portion.

Figure 28:
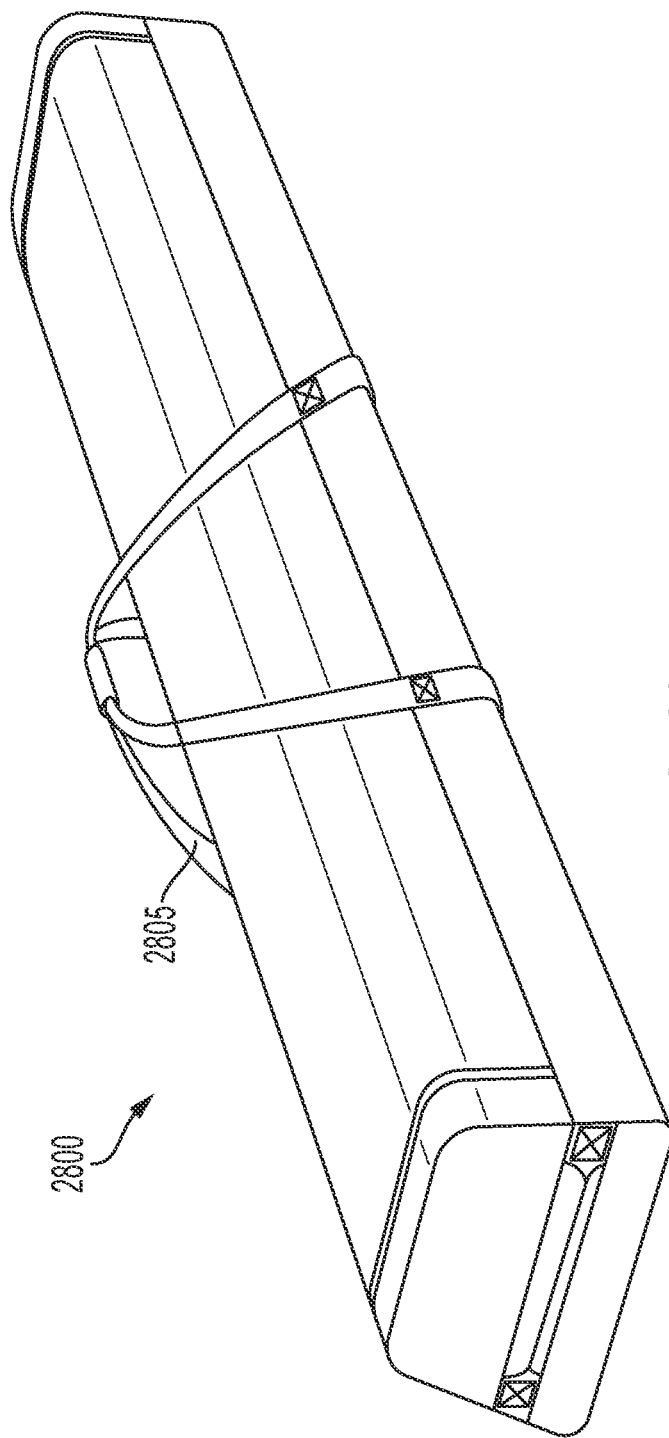
FIG. 28 depicts an example bag for holding a projector screen.
Figure 29:
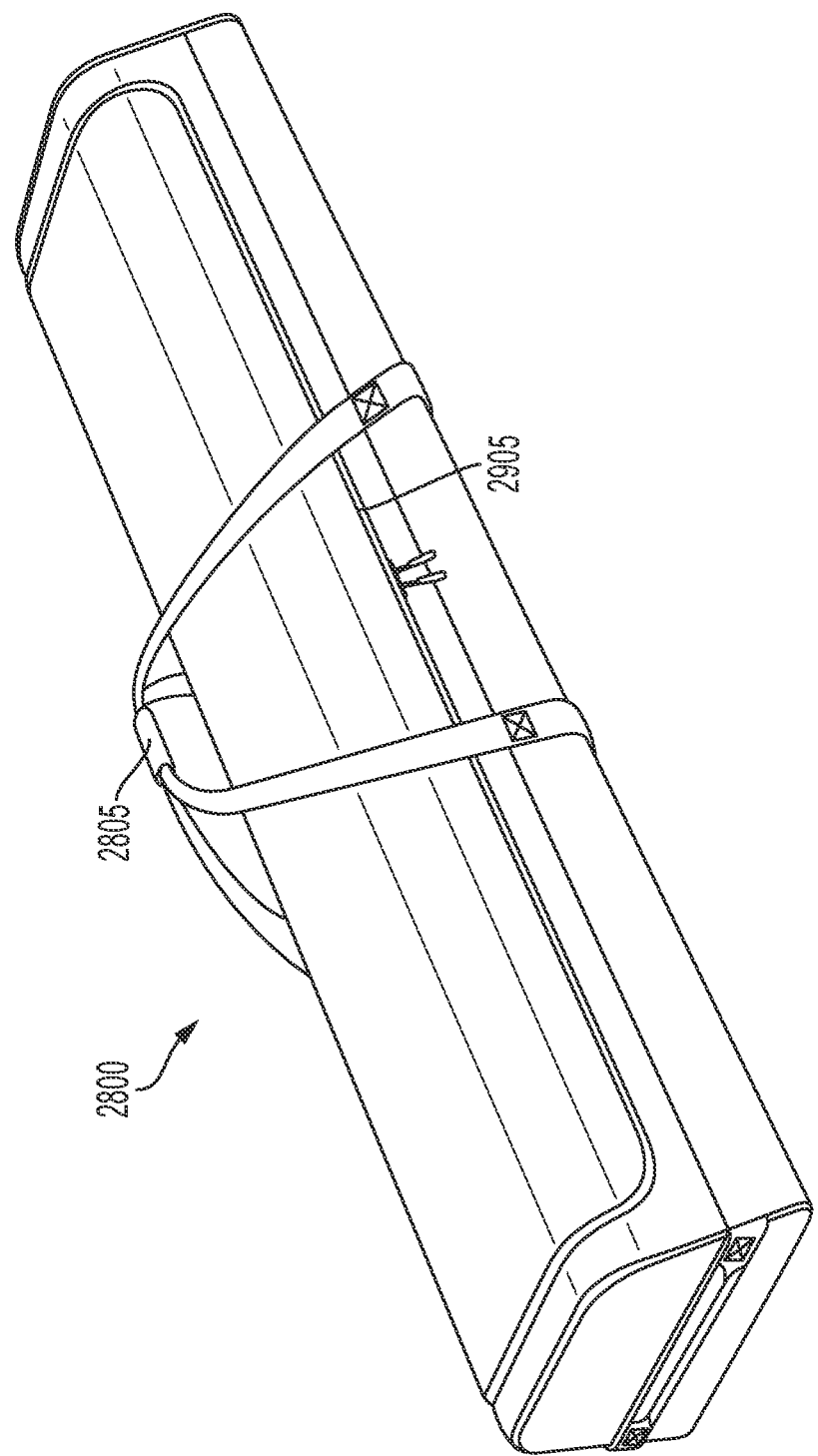
FIG. 29 depicts an example bag for holding a projector screen including a zipper.

FIGS. 28-29 depict an example bag 2800 for holding a projector screen. The bag 2800 can include a handle for carrying the bag 2800. A projector screen can be folded up or rolled up to fit within the bag 2800. A projector screen frame can be broken down to fit within the bag 2800. The bag 2800 can have a perpendicular side, an oblique side, front and back sides, a bottom side, and a top side. The bag 2800 can include a zipper 2905 that allows a user to open the bag 2800. The bag 2800 can include an end handle 3305.

Figure 30A:
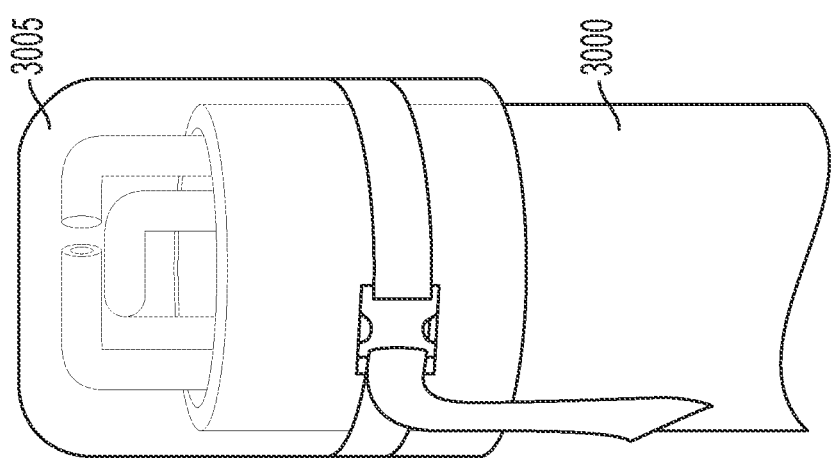
FIG. 30A depicts an example cap for holding a rolled up projector screen.
Figure 30B:
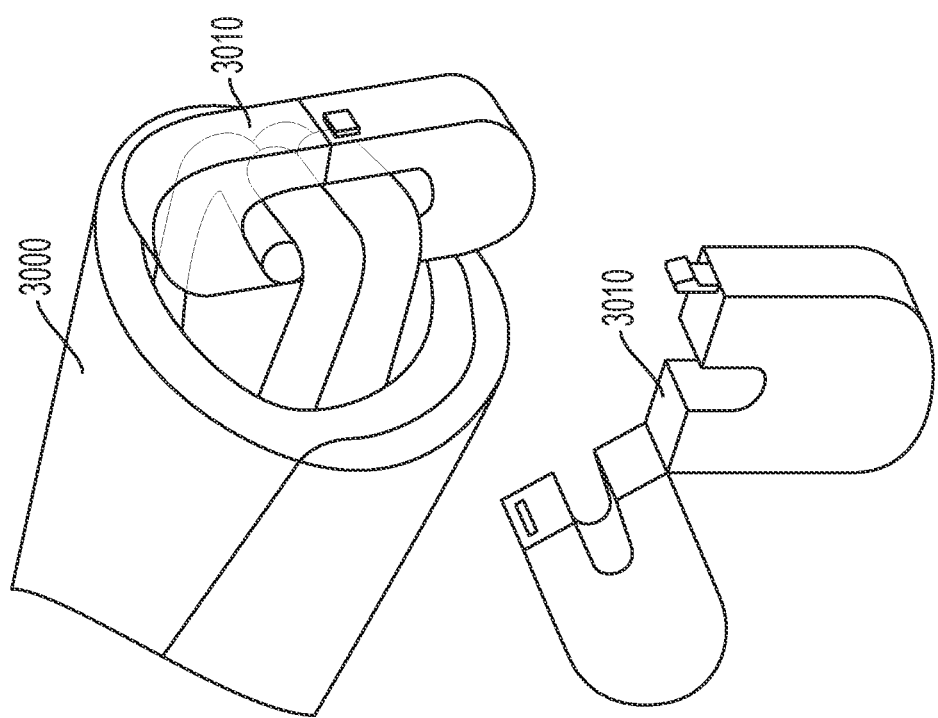
FIG. 30B depicts an example lock for locking poles of a projector screen.

FIG. 30A depicts an example cap 3005 for holding a rolled up projector screen 3000. A cap 3005 can be placed over at least one end of the rolled up projector screen 300 to keep the projector screen 300 rolled up. The cap 3005 can be fixed with a strap. Poles of a frame of the projector screen 300 can be included within a center of the projector screen material. FIG. 30B depicts an example lock 3010 for locking poles of a projector screen 3000. The lock 3010 can lock the poles of the frame together. The lock 3010 can be a soft or rubberized material that does not scratch a top surface of the entertainment apparatus 175. The lock 3010 can be rubber. The lock 3010 can lift the poles off of the surface of the entertainment apparatus 175 to prevent the surface from being scratched by the poles.

Figure 31B:
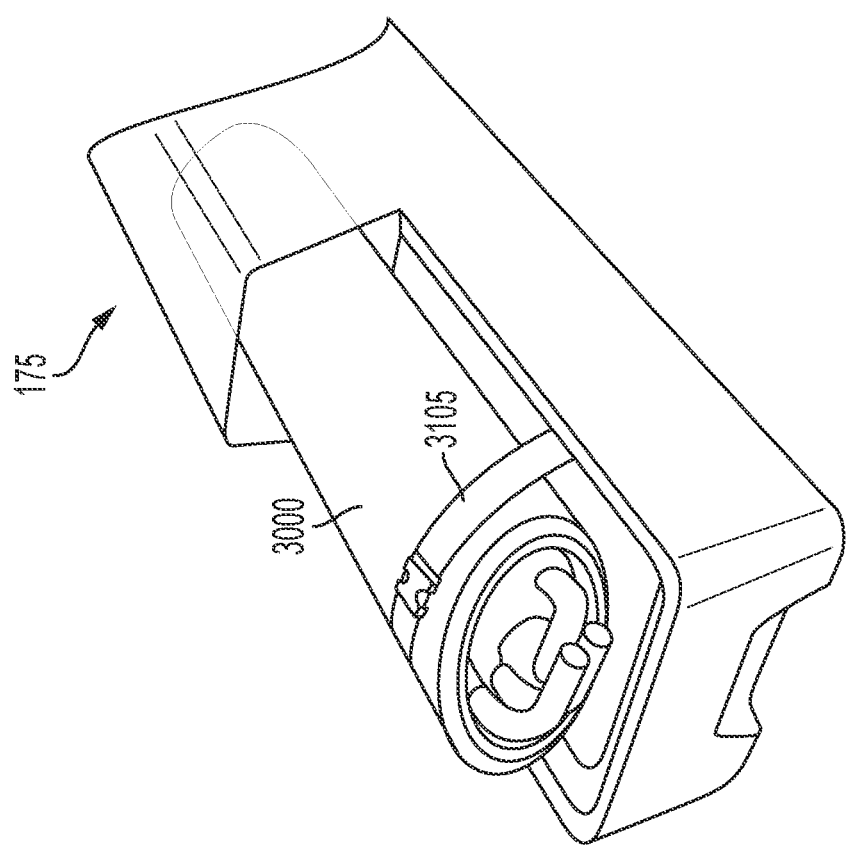
FIG. 31B depicts an example entertainment apparatus including a strap to secure a projector screen.
Figure 31C:
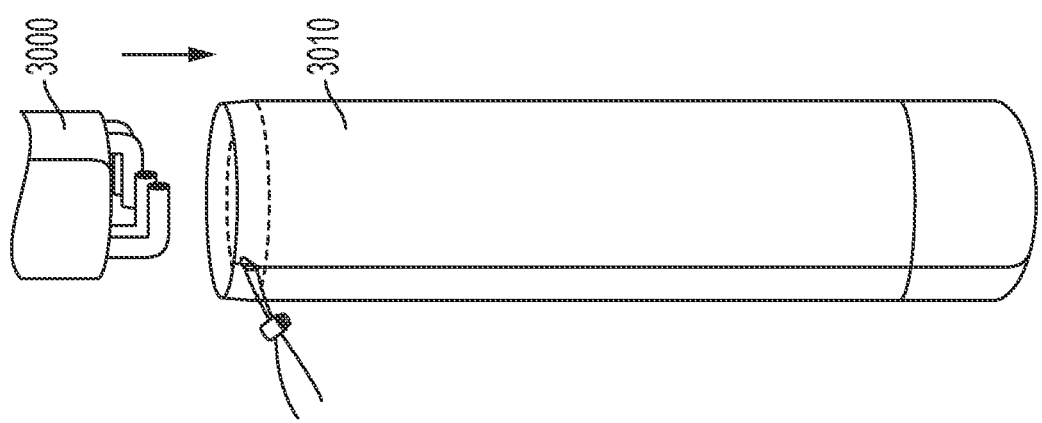
FIG. 31C depicts an example bag including a draw string for holding a rolled up projector screen.
Figure 32:
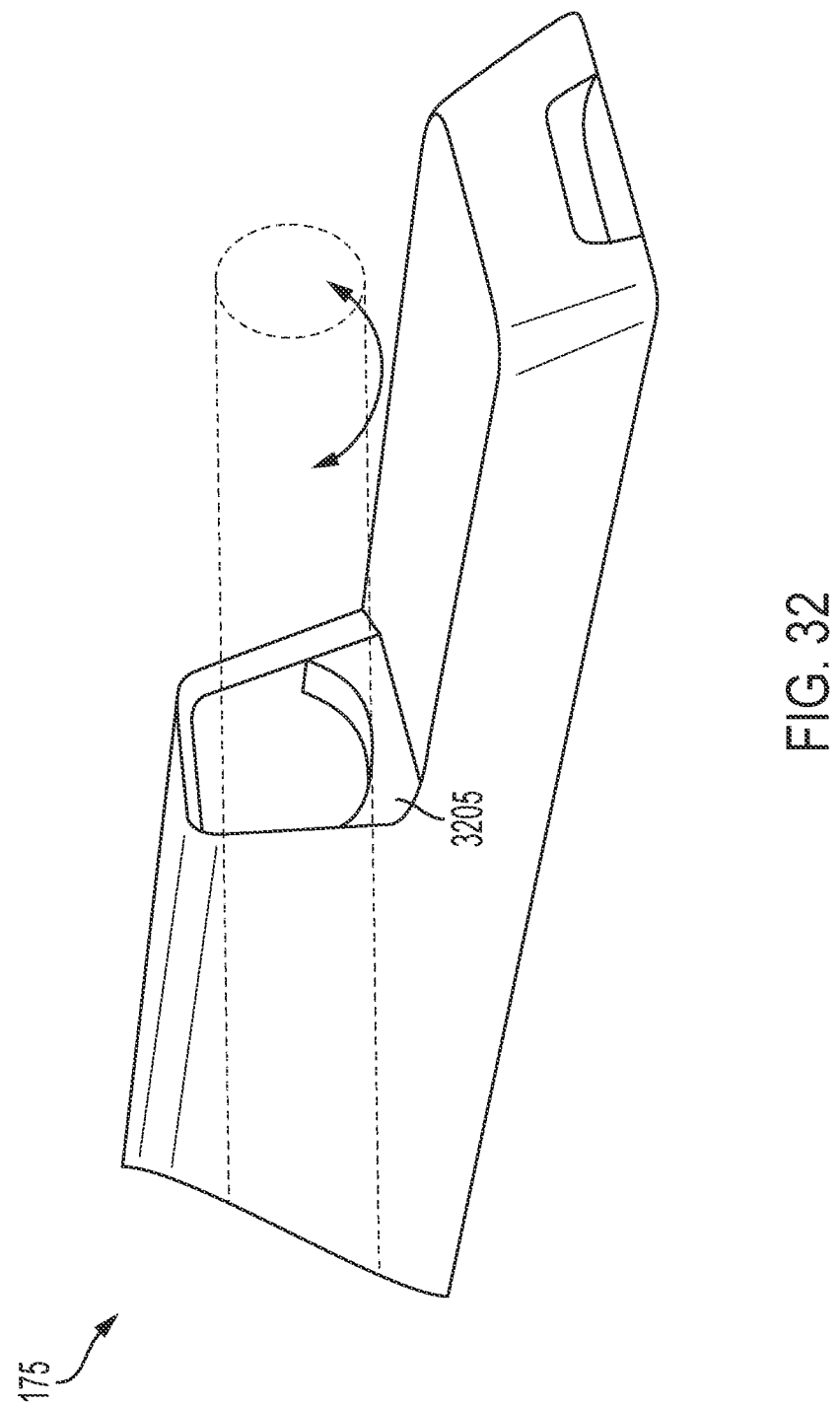
FIG. 32 depicts an example entertainment apparatus including a cradle for a projector screen.
Figure 33:
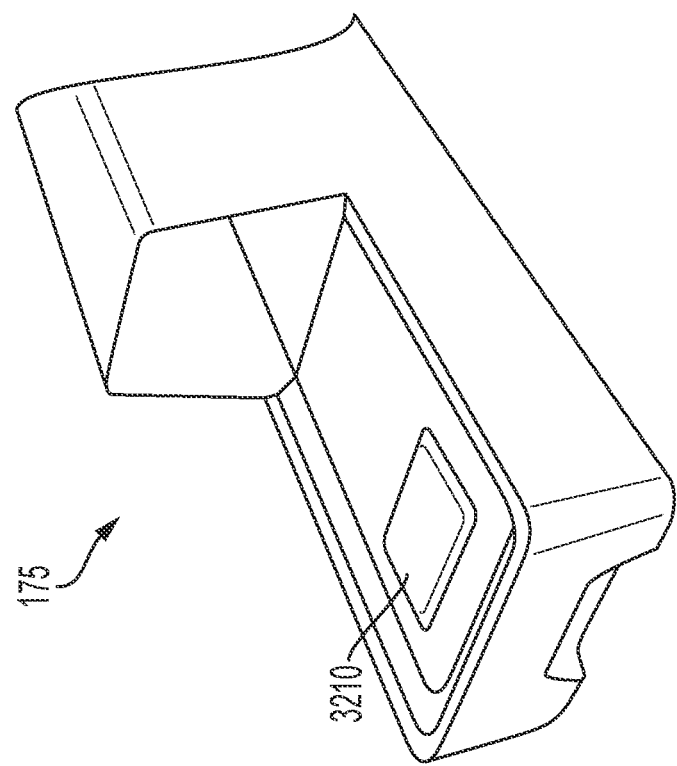
FIG. 33 depicts an example entertainment apparatus including a protective mat.
Figure 34:
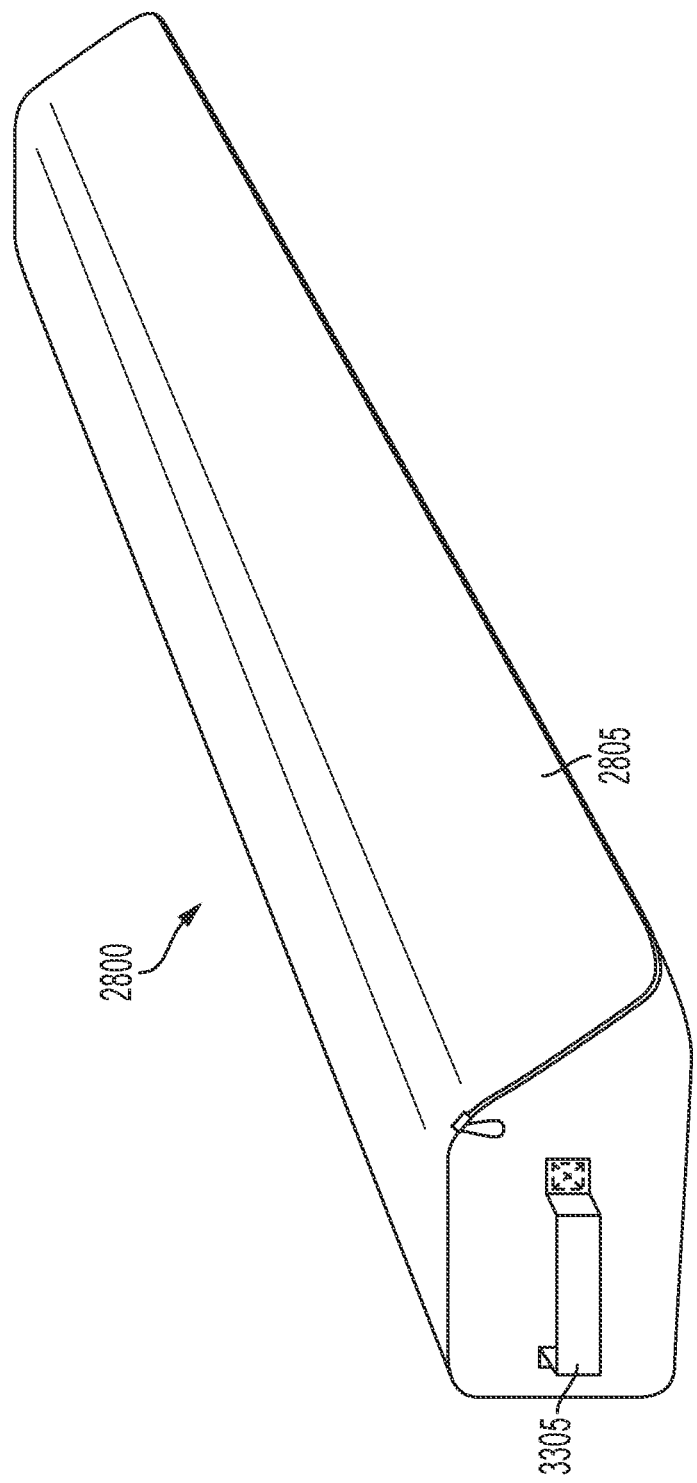
FIG. 34 depicts an example bag including a zipper to hold a projector screen.

FIG. 31A depicts an example entertainment apparatus 175 including a protection mat 3115. The surface of the entertainment apparatus 175 can include the protection mat 3115 to prevent the poles of the projector screen from scratching the entertainment apparatus 175. The mat 3115 can be a rubber mat. The mat 3115 can be a removable mat that is molded to fit a curved surface of the entertainment apparatus 175. FIG. 31B depicts an example entertainment apparatus 175 including at least one strap 3105 to secure a projector screen 3000. The strap 2305 can fix the projector screen 3000 to a surface of the entertainment apparatus 175. FIG. 31C depicts an example bag 3110 including a draw string for holding a rolled up projector screen. The projector screen 3000 could be inserted into a bag 3110 and the draw string can be pulled to secure the projector screen 3000. FIG. 32 depicts an example entertainment apparatus 2000 including a cradle 3205 for a projector screen. The cradle 3205 can hold the projector screen off a surface of the entertainment apparatus 175 preventing poles of the projector screen from scratching the surface. FIG. 33 depicts an example entertainment apparatus including a protective mat 3210. The mat 3210 can be a protective mat that protects a surface of the entertainment apparatus 175 from being scratched. FIG. 34 depicts an example bag 2800 including a zipper 2805 to hold a projector screen.

Figure 35A:
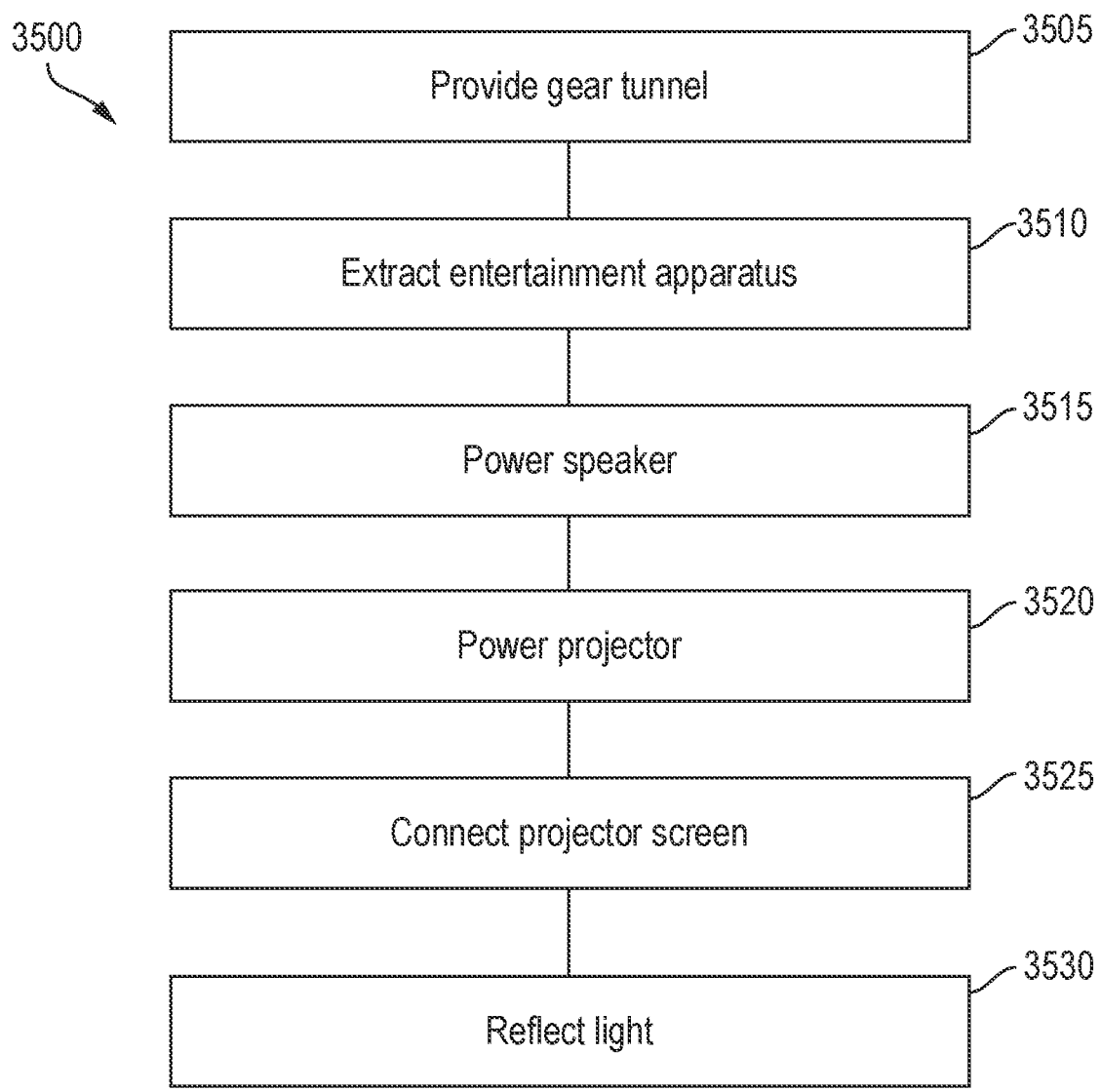
FIG. 35A depicts an example method of an entertainment apparatus of a vehicle.

FIG. 35A depicts an example method 3500 of providing an entertainment apparatus 175 of a vehicle 105. At least one ACT of the method 3500 can be performed by the vehicle 105. At least one ACT of the method 3500 can be performed by the apparatus 175. At least one ACT of the method 3500 can be performed by a user, such as an owner or passenger of the vehicle 105. The method 3500 can include an ACT 3505 of providing a gear tunnel. The method 3500 can include an ACT 3510 of extracting an entertainment apparatus. The method 3500 can include an ACT 3515 of powering a speaker. The method 3500 can include an ACT 3520 of powering a projector. The method 3500 can include an ACT 3525 of connecting a projector screen. The method 3500 can include an ACT 3530 of reflecting light.

The method 3500 can include an ACT 3505 of providing a gear tunnel 170. The gear tunnel 170 can include an opening, compartment, chamber, or other area internal to the vehicle 105 that can store the entertainment apparatus 175 on a shuttle 195. The gear tunnel 170 can extend fully across the vehicle 105. The gear tunnel 170 can extend into the vehicle 105 but not fully across the vehicle 105. The gear tunnel 170 can include at least one top portion, at least one bottom portion, at least one first side portion, and at least one second side portion.

The method can include an ACT 3510 of extracting the entertainment apparatus 175. The entertainment apparatus 175 can be extracted out of the gear tunnel 170. For example, a user can pull on a handle of the entertainment apparatus 175 or the shuttle 195 to pull the entertainment apparatus 175 partially or completely out of the gear tunnel 170. A motor, compressed spring, compressed piston, or other actuating component can extract the entertainment apparatus 175 from the gear tunnel 170.

The method can include an ACT 3515 of powering the speaker 185. For example, the battery pack 110 can power the speaker 185. The battery pack 110 can power the speaker 185 or charge a battery of the speaker 185. The battery pack 110 can provide power to the speaker 185 via electrical connections included within the shuttle 195 or entertainment apparatus 175. The speaker 185 can receive power from the battery pack 110 when the entertainment apparatus 175 is included within the gear tunnel 170 or when the entertainment apparatus 175 is extended out of the gear tunnel 170.

The method can include an ACT 3520 of powering the projector 180. For example, the battery pack 110 can power the projector 180. The battery pack 110 can power the projector 180 or charge a battery of the projector 180. The battery pack 110 can provide power to the projector 180 via electrical connections included within the shuttle 195 or entertainment apparatus 175. The projector 180 can receive power from the battery pack 110 when the entertainment apparatus 175 is included within the gear tunnel 170 or when the entertainment apparatus 175 is extended out of the gear tunnel 170.

The method can include an ACT 3525 of connecting a projector screen 292. The projector screen 292 can be connected to the entertainment apparatus 175 or the shuttle

195. A pole 295 of the projector screen 292 can support a frame 291 of the projector screen 292. The frame 291 can support the projector screen 292. The pole 295 can be inserted into an opening 296 of the entertainment apparatus 175. The pole 295 can connect to a pin 298 of the receiving member 297 of the entertainment apparatus 175. The pin 298 or the receiving member 297 can support the pole 295 and prevent the pole 295 from rotating.

The method can include an ACT 3530 of reflecting light. The projector 180 can project light that is reflected by a mirror 275. The mirror 275 can reflect the light onto the projector screen 292. The projector 180 can project the light away from the projector screen 292. For example, the projector 180 can project the light away from the projector screen 292 at an angle perpendicular to the surface of the projector screen 292. The projector 180 can project the light at the mirror 275. The mirror 275 can reflect the light back onto the projector screen 292. By projecting the light away from the screen and then reflecting the light back to the projector screen, a path of travel of light can be extended as compared to the projector 180 projecting light directly onto the projector screen 292. By increasing the path of travel, the resulting size of the projected image can be increased.

Figure 35B:
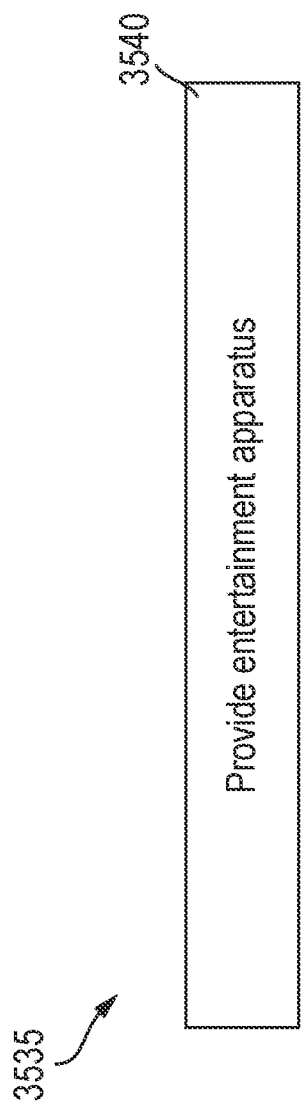
FIG. 35B depicts an example method of providing an entertainment apparatus of a vehicle.

FIG. 35B depicts an example method 3535 of providing an entertainment apparatus. The method 3535 can include an ACT 3540 of providing the entertainment apparatus 175. The entertainment apparatus 175 can be fixed to a top surface of a shuttle 195. The shuttle 195 and the entertainment apparatus 175 can be disposed within the tunnel 170. The tunnel 170 can extend from an opening on a side of the vehicle into the vehicle. The tunnel 170 can extend from a first opening on a first side of the vehicle to a second opening on a second side of the vehicle. The openings of the tunnel 170 can be covered by doors 165 that can unlock and rotate between a position covering the openings to a position exposing the openings. The shuttle 195 can be transported out of the tunnel 170 along with the entertainment apparatus 175.

When the entertainment apparatus 175 is transported out of the tunnel 170, various entertainment components of the entertainment apparatus 175 can be deployed or operated. For example, a pole 295 of a projector screen can be inserted through an opening 296 in a housing of the entertainment apparatus into the receiving member 297 of the entertainment apparatus 175. The receiving member 297, or a pin 298 that an end of the pole 295 is fixed to, can limit rotation of the pole 295 about a longitudinal axis of the receiving member 297.

The entertainment apparatus 175 can include the projector 180. The projector 180 can be stored within a compartment of the entertainment apparatus 175. The projector 180 can be fixed to the platform 265. The platform 265 can rotate via the hinging component 270. The platform 265 can rotate from a position horizontal to a top surface of the entertainment apparatus 175 to a position angled relative to the top surface of the entertainment apparatus. A portion 260 can secure the projector 180 within the compartment of the entertainment apparatus 175 can limit the rotation of the hinging component 270 or allow the hinging component 270 to rotate the platform 265. The portion 260 can be fixed to an edge of the compartment and can rotate from a position horizontal to the top surface of the entertainment apparatus over an opening of the compartment to a vertical position. In the horizontal position, the portion 260 can lock. In the horizontal position, the portion 260 can fix the projector 180 in the horizontal position on the platform 265. For example, because the portion 260 is fixed over a top surface of the projector 180, the platform 265 cannot rotate. A bottom side of the portion 260 can be in physical contact with a top surface of the projector 180.

The opening of the compartment that stores the projector 180 can be covered by a cover 274 including the mirror 275. The cover 274 can include the mirror 275 on one side of the cover 274. The cover 274 can include a hole 325, such as a pin hole. The cover 274 can include a slot, for example a t-shaped slot. The cover 274 can be removed from covering the opening of the compartment and fixed in a vertical position. The position can angle the mirror 275 to reflect light of the projector 180 located in the angled position on the platform 265 towards the projector screen 292. The cover 274 can be fixed to the portion 260. For example, an edge of the portion 260 can fit into the slot of the cover 274. For example, when the portion 260 is positioned vertically, the cover 274, via the slot, can be slid from a top of the edge of the portion 260 to a bottom of the edge of the portion 260, fixing the cover 274 to the portion 260. A pin located on a surface of the entertainment apparatus 175 can enter the hole 325 on the bottom side of the cover 274 fixing the cover 274 to the entertainment apparatus 175.

Figure 36:
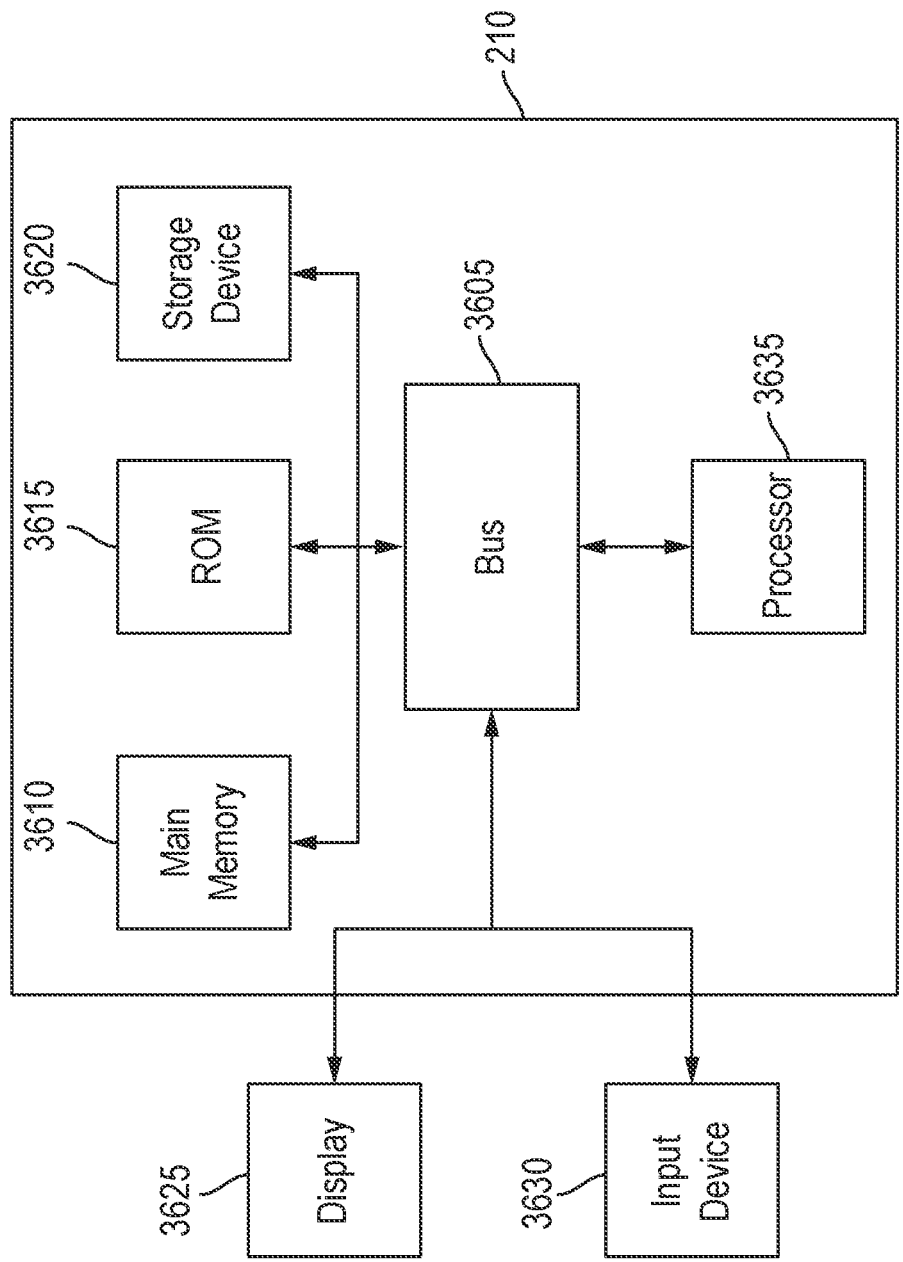
FIG. 36 is a block diagram depicting an architecture for a computer system that can be employed to implement elements of the systems and methods described and illustrated herein.

FIG. 36 depicts an example block diagram of a data processing system 210. The data processing system 210 can be a data processing system 210 of the vehicle 105. The data processing system 210 can be a data processing system of the battery pack 110 or the network manager 197. The data processing system 210 can be a system that transmits audio to the speaker 185 or images or video to the projector 180. The data processing system 210 can be a component of a vehicle, a component of a smartphone, a component of a tablet, a component of a laptop computer, a component of a video streaming box.

The data processing system 210 can include or be used to implement a data processing system or its components. The data processing system 210 can include at least one bus 3605 or other communication component for communicating information and at least one processor 3635 or processing circuit coupled to the bus 3605 for processing information. The data processing system 210 can include one or more processors 3635 or processing circuits coupled to the bus 3605 for processing information. The data processing system 210 can include at least one main memory 3610, such as a random access memory (RAM) or other dynamic storage device, coupled to the bus 3605 for storing information, and instructions to be executed by the processor 3635. The main memory 3610 can be used for storing information during execution of instructions by the processor 3635. The data processing system 210 can further include at least one read only memory (ROM) 3615 or other static storage device coupled to the bus 3605 for storing static information and instructions for the processor 3635. A storage device 3620, such as a solid state device, magnetic disk or optical disk, can be coupled to the bus 3605 to persistently store information and instructions.

The data processing system 210 can be coupled via the bus 3605 to a display 3625, such as a liquid crystal display, or active matrix display. The display 3625 can display information to a user such as a driver of the first vehicle 105 or other end user. An input device 3630, such as a keyboard or voice interface can be coupled to the bus 3605 for communicating information and commands to the processor 3635. The input device 3630 can include a touch screen of the display 3625. The input device 3630 can include a cursor control, such as a mouse, a trackball, or cursor direction keys, for communicating direction information and command selections to the processor 3635 and for controlling cursor movement on the display 3625.

The processes, systems and methods described herein can be implemented by the data processing system 210 in response to the processor 3635 executing an arrangement of instructions contained in main memory 3610. Such instructions can be read into main memory 3610 from another computer-readable medium, such as the storage device 3620. Execution of the arrangement of instructions contained in main memory 3610 causes the data processing system 210 to perform the illustrative processes described herein. One or more processors in a multi-processing arrangement can be employed to execute the instructions contained in main memory 3610. Hard-wired circuitry can be used in place of or in combination with software instructions together with the systems and methods described herein. Systems and methods described herein are not limited to any specific combination of hardware circuitry and software.

Although an example computing system has been described in FIG. 36, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and 'B' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the vehicles described herein can be various types of vehicles, e.g., internal combustion engine vehicles, hybrid vehicles, or electric vehicles. For example, the vehicles described herein and shown in the figures can be the same type of vehicle or different types of vehicles. For example, the systems and methods described herein can be implemented on internal combustion engine vehicles, hybrid vehicles, electric vehicles or various combinations thereof. The entertainment apparatus described herein can be fully detachable from the vehicle. For example, the entertainment apparatus can be stored within the vehicle and completely removed from the vehicle for use. One end of the shuttle holding the entertainment apparatus can be connected to a wall of a building, a garage door, a tree. The shuttle can include two, three, or four feet and can support itself. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A vehicle, comprising:
a compartment;
a shuttle; and
a projector module configured to extend from the compartment to provide light to a projector screen;
wherein the projector module is configured to move on the shuttle over a door of the compartment, the door comprising a hinge fixed to a bottom side of the door configured to rotate a top of the door from a closed position down towards a surface under the vehicle to open the door; and
wherein the projector module is configured to stow into and extend out from the compartment of the vehicle based at least on the movement on the shuttle.

2. The vehicle of claim 1, comprising:
the projector module comprising a speaker compartment, wherein the speaker compartment is configured to stow into and extend out from the compartment of the vehicle based on movement on the shuttle.

3. The vehicle of claim 1, comprising:
the projector module comprising:
a compartment to store a projector;
a removable cover, wherein the removable cover includes a mirror to reflect the light onto the projector screen; and
a portion configured to hinge from a first position above the projector to a second position to hold the removable cover removed from an opening of the compartment of the projector module.

4. The vehicle of claim 1, comprising:
the projector module comprising:
a projector disposed on a platform within the projector module under a top surface of the projector module; and
a rotational member to rotate the platform from a first position to a second position to expose at least a portion of the projector through an opening of the top surface of the projector module.

5. The vehicle of claim 1, comprising:
the projector module comprising:
a top surface;
a projector disposed on a platform within the projector module under the top surface of the projector module;
the platform to rotate from a first position horizontal with the top surface of the projector module to a second position angled relative to the top surface of the projector module to expose at least a portion of the projector through an opening of the top surface of the projector module; and
a portion fixed to the top surface of the projector module to rotate on a hinge from a first position horizontal to the top surface of the projector module to a second position to allow the platform to rotate to the second position angled relative to the top surface.

6. The vehicle of claim 1, comprising:
the projector module comprising:
a projector configured to direct the light towards a mirror;
the mirror configured to reflect the light onto the projector screen;
wherein an optical path of the light from the projector to the mirror and from the mirror to the projector screen is longer than a distance between the projector and the projector screen.

7. The vehicle of claim 1, comprising:
the shuttle disposed within the compartment of the vehicle that extends out of the compartment of the vehicle, the shuttle comprising a support to extend from a bottom surface of the shuttle to a surface below the vehicle with the shuttle extended out of the compartment of the vehicle; and
the projector module configured to extend out of the compartment of the vehicle over the shuttle.

8. The vehicle of claim 1, comprising:
the projector screen comprising:
a frame;
a screen fixed to the frame; and
a support member, a first end of the support member fixed to the frame of the projector screen and a second end of the support member fixed to a frame of the vehicle.

9. The vehicle of claim 1, comprising:
the projector module comprising:
a compartment that stores a speaker, the compartment of the projector module comprising an electrical connection to provide power to the speaker and a dock that holds the speaker.

10. The vehicle of claim 1, comprising:
the projector module comprising:
a drawer, the drawer comprising:
a cord that extends through an opening of the drawer, the cord connected to a latch, the latch configured to actuate responsive to a force applied to the cord to cause the drawer to transport out of the projector module.

11. The vehicle of claim 1, comprising:
the projector module comprising:
a top surface including an opening;
a pole of the projector screen configured to extend through the opening into the projector module; and
a member to receive an end of the pole and fix the pole within the member.

12. The vehicle of claim 1, comprising:
the projector module comprising:
a member to receive an end of a pole of the projector screen, the member including a pin that fixes a slot shaped end of the pole within the member; and
the pin configured to limit rotation of the pole along a longitudinal axis of the member.

13. The vehicle of claim 1, comprising:
the projector module, comprising:
a surface; and
a compartment fixed to the surface to store the projector screen, the compartment of the projector module comprising:
a first lateral side to extend from the surface to a top surface of the compartment of the projector module;
a second lateral side to extend from the surface to the top surface of the compartment of the projector module; and
ends of the first lateral side, the second lateral side, and the top surface of the compartment of the projector module form an opening to insert the projector screen into the compartment for storage.

14. The vehicle of claim 1, comprising:
a battery pack;
the shuttle disposed within the compartment of the vehicle to extend out of the compartment of the vehicle, the shuttle comprising:
an electrical connection that connects the shuttle with the battery pack;
the projector module fixed to a top surface of the shuttle, the projector module comprising an electrical connection between a projector of the projector module and the shuttle; and
the battery pack configured to power the projector via the electrical connection that connects the shuttle with the battery pack and the electrical connection between the projector and the shuttle.

15. A method, comprising:
disposing a projector module within a compartment of a vehicle;
moving the projector module from the compartment of the vehicle to provide light to a projector screen;
receiving, via a member of the projector module, an end of a pole of the projector screen, the member including a pin that fixes a slot shaped end of the pole within the member; and
limiting, by the pin, rotation of the pole along a longitudinal axis of the member.

16. The method of claim 15, comprising:
rotating, via a first hinge, a portion fixed to a top surface of the projector module from a first position horizontal to the top surface of the projector module to a second position to allow a platform to rotate to a position angled relative to the top surface of the projector module; and
rotating, via a second hinge, the platform from a first position horizontal with the top surface of the projector module to the position angled relative to the top surface of the projector module to expose at least a portion of a projector fixed to a top surface of the platform through an opening of the top surface of the projector module.

17. An apparatus, comprising;
a housing fixed to a shuttle configured to extend the apparatus from a compartment of a vehicle;
a projector to provide light to a projector screen, the projector disposed on a platform within the housing under a top surface of the housing; and
a rotational member to rotate the platform from a first position to a second position to expose at least a portion of the projector through an opening of the top surface of the housing.

18. The apparatus of claim 17, comprising:
a compartment to store the projector;
a removable cover that extends across an opening of the compartment of the apparatus, a side of the removable cover including a mirror; and
a portion to actuate from a first position above the projector to a second position to hold the removable cover removed from the opening of the compartment of the apparatus.

19. The apparatus of claim 17, comprising:
the housing comprising a speaker compartment, wherein the speaker compartment is configured to stow into and extend out from the compartment of the vehicle based on movement on the shuttle.

20. The apparatus of claim 17, comprising:
the housing comprising:
a member to receive an end of a pole of the projector screen, the member including a pin that fixes a slot shaped end of the pole within the member; and
the pin configured to limit rotation of the pole along a longitudinal axis of the member.

* * * * *